(12) United States Patent
Fukao et al.

(10) Patent No.: US 7,116,338 B2
(45) Date of Patent: Oct. 3, 2006

(54) COLOR INFORMATION PROCESSING APPARATUS AND METHOD

(75) Inventors: Suzuko Fukao, Tokyo (JP); Hirochika Matsuoka, Kanagawa (JP); Kimitaka Arai, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 10/251,792

(22) Filed: Sep. 23, 2002

(65) Prior Publication Data

US 2003/0076336 A1 Apr. 24, 2003

(30) Foreign Application Priority Data

| Sep. 26, 2001 | (JP) | ............... 2001-293852 |
| Sep. 26, 2001 | (JP) | ............... 2001-293853 |
| Sep. 28, 2001 | (JP) | ............... 2001-301215 |
| Jul. 24, 2002 | (JP) | ............... 2002-215439 |

(51) Int. Cl.
*G09G 5/02* (2006.01)

(52) U.S. Cl. .................. 345/593; 345/420; 345/581; 345/589; 345/594; 345/604; 345/619; 345/630; 382/162; 382/282; 715/848; 715/852

(58) Field of Classification Search ............... 345/594, 345/630; 715/852
See application file for complete search history.

(56) References Cited

U.S. PATENT DOCUMENTS

| 5,598,516 | A | * | 1/1997 | Mori ...................... 345/426 |
| 5,627,950 | A | * | 5/1997 | Stokes ..................... 345/591 |
| 5,844,542 | A | * | 12/1998 | Inoue et al. .............. 345/594 |
| 6,108,441 | A | * | 8/2000 | Hiratsuka et al. ......... 382/167 |
| 6,337,692 | B1 | * | 1/2002 | Rai et al. ................. 345/594 |
| 6,414,679 | B1 | * | 7/2002 | Miodonski et al. ....... 345/420 |
| 6,522,778 | B1 | * | 2/2003 | Tamagawa ............... 382/167 |
| 6,647,141 | B1 | * | 11/2003 | Li .......................... 382/162 |
| 6,850,249 | B1 | * | 2/2005 | Gu .......................... 345/623 |
| 2002/0054307 | A1 | | 5/2002 | Matsuoka ................. 358/1.9 |
| 2002/0101456 | A1 | | 8/2002 | Matsuoka et al. ......... 345/848 |
| 2002/0126302 | A1 | | 9/2002 | Fukao ...................... 358/1.9 |

FOREIGN PATENT DOCUMENTS

| JP | 2001197326 | * | 7/2001 |
| JP | 2002-222432 | | 8/2002 |

* cited by examiner

*Primary Examiner*—Kee M. Tung
*Assistant Examiner*—Antonio Caschera
(74) *Attorney, Agent, or Firm*—Fitzpatrick, Cella, Harper & Scinto

(57) ABSTRACT

The analysis and evaluation techniques of a gamut mapping technique, which can reflect the determination result of the quality of gamut mapping in the gamut mapping technique, are demanded. Hence, a color distribution information file and image file are loaded, initial 3D object data is generated based on color distribution data, and initial image object data is generated based on image data. The image object data and 3D object data are displayed on a monitor. When the user inputs a message, a process corresponding to the input message is executed, and the updated image object data and 3D object data are displayed on the monitor.

16 Claims, 63 Drawing Sheets

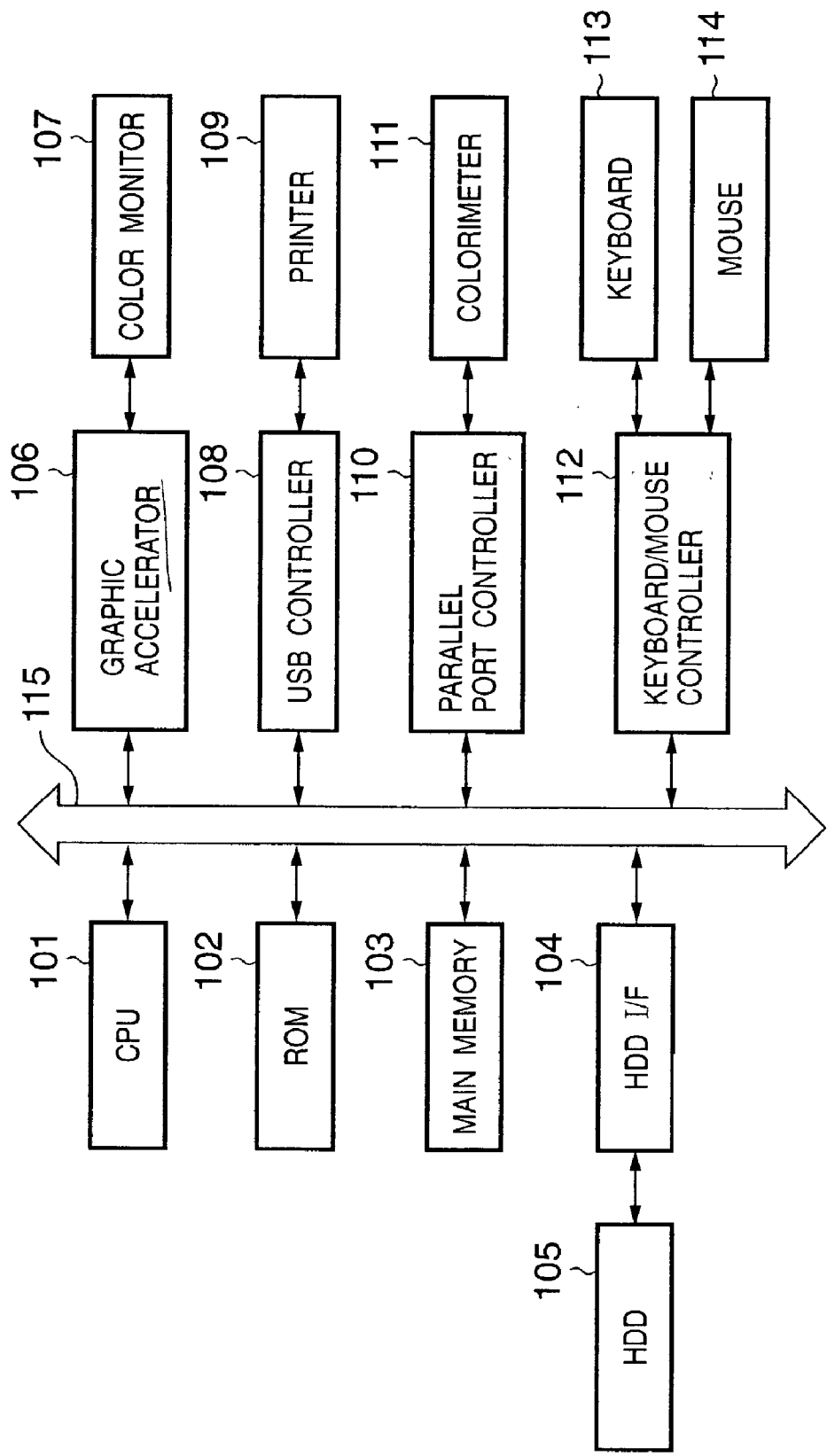

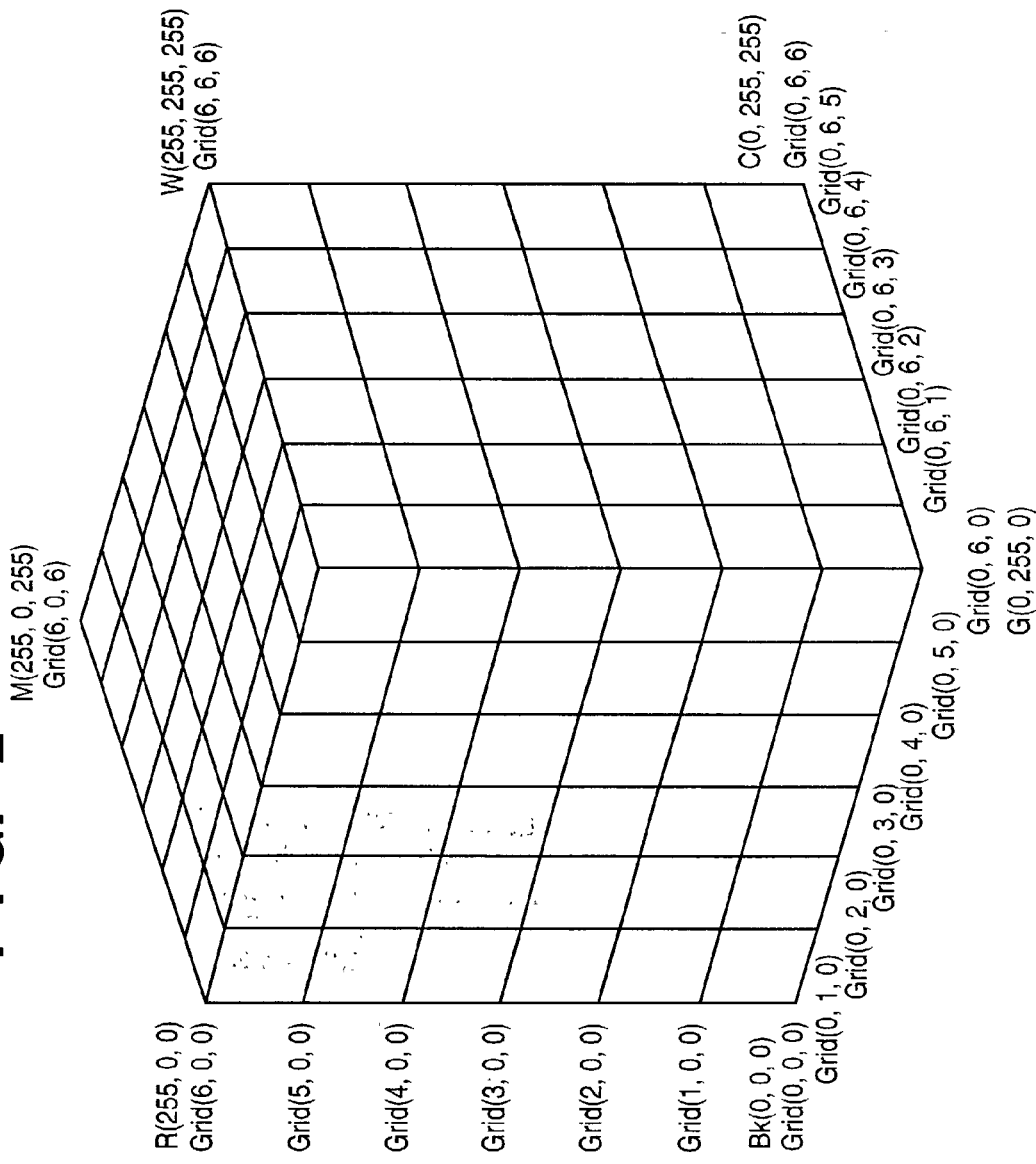

FIG. 3

| |
|---|
| STEP OF R VALUE BEFORE CORRECTION : 0, 43, 85, ..., 212, 255 |
| STEP OF G VALUE BEFORE CORRECTION : 0, 43, 85, ..., 212, 255 |
| STEP OF B VALUE BEFORE CORRECTION : 0, 43, 85, ..., 212, 255 |
| RGB COORDINATE OF Grid(0, 0, 0) AFTER CORRECTION : (0, 0, 0) <br><br> RGB COORDINATE OF Grid(0, 0, 1) AFTER CORRECTION : (0, 3, 45) <br><br> ⋮ <br><br> RGB COORDINATE OF Grid(0, 0, 6) AFTER CORRECTION : (4, 15, 250) <br><br> RGB COORDINATE OF Grid(0, 1, 0) AFTER CORRECTION : (10, 254, 55) <br><br> ⋮ <br><br> RGB COORDINATE OF Grid(6, 6, 5) AFTER CORRECTION : (253, 255, 220) <br><br> RGB COORDINATE OF Grid(6, 6, 6) AFTER CORRECTION : (255, 255, 255) |

FIG. 5

| |
|---|
| STEP OF R VALUE BEFORE CORRECTION : 0, 43, 85, ..., 212, 255 |
| STEP OF G VALUE BEFORE CORRECTION : 0, 43, 85, ..., 212, 255 |
| STEP OF B VALUE BEFORE CORRECTION : 0, 43, 85, ..., 212, 255 |
| L\*a\*b\* COORDINATE OF Grid(0, 0, 0) : (30, 0, −2) <br><br> L\*a\*b\* COORDINATE OF Grid(0, 0, 1) : (31, 2, −9) <br><br> ⋮ <br><br> L\*a\*b\* COORDINATE OF Grid(0, 0, 6) : (34, 18, −33) <br><br> L\*a\*b\* COORDINATE OF Grid(0, 1, 0) : (34, −8, 0) <br><br> ⋮ <br><br> L\*a\*b\* COORDINATE OF Grid(6, 6, 5) : (90, −4, 12) <br><br> L\*a\*b\* COORDINATE OF Grid(6, 6, 6) : (92, 0, 0) |

FIG. 7

3D OBJECT DATA
- DISPLAY GRID RANGE
- TRIANGLE PATCH DATA

IMAGE OBJECT DATA
- FLICKERING DISPLAY AREA
- DISPLAY IMAGE IDENTIFICATION FLAG
- ORIGINAL IMAGE DATA
- COLOR-CORRECTED IMAGE DATA

RANGE DISPLAY OBJECT DATA
- DISPLAY/NON-DISPLAY FLAG
- RGB RANGE DATA
- L*a*b* SEGMENT DATA

FIG. 12

| | | | |
|---|---|---|---|
| DESIGNATE DISPLAY GRID RANGE | | | |
| R AXIS GRID RANGE | 2 | ~ | 5 |
| G AXIS GRID RANGE | 2 | ~ | 4 |
| B AXIS GRID RANGE | 1 | ~ | 4 |

F I G. 13
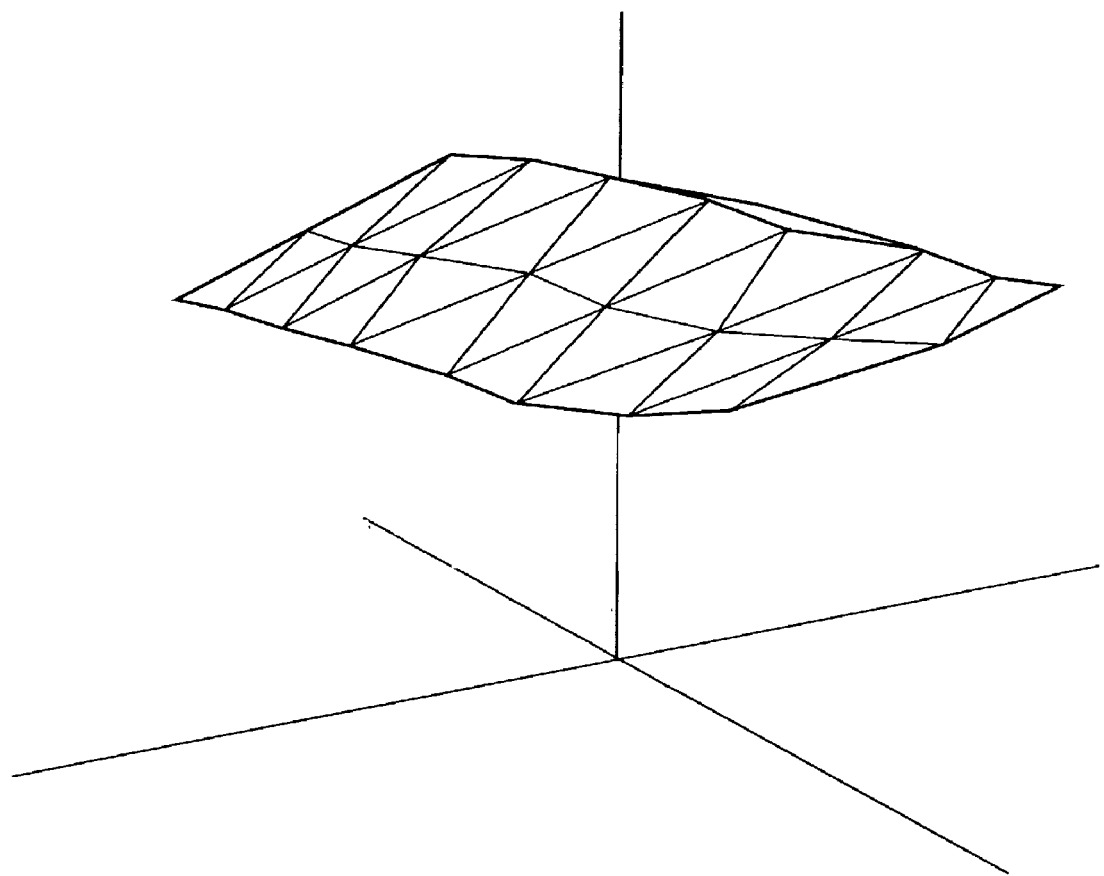

FIG. 15

DESIGNATE IMAGE→COLOR DISTRIBUTION RGB RANGE

DESIGNATE COLOR DISTRIBUTION→IMAGE FLICKERING DISPLAY RANGE

R + 5
  − 5

G + 10
  − 10

B + 15
  − 15

F I G. 25
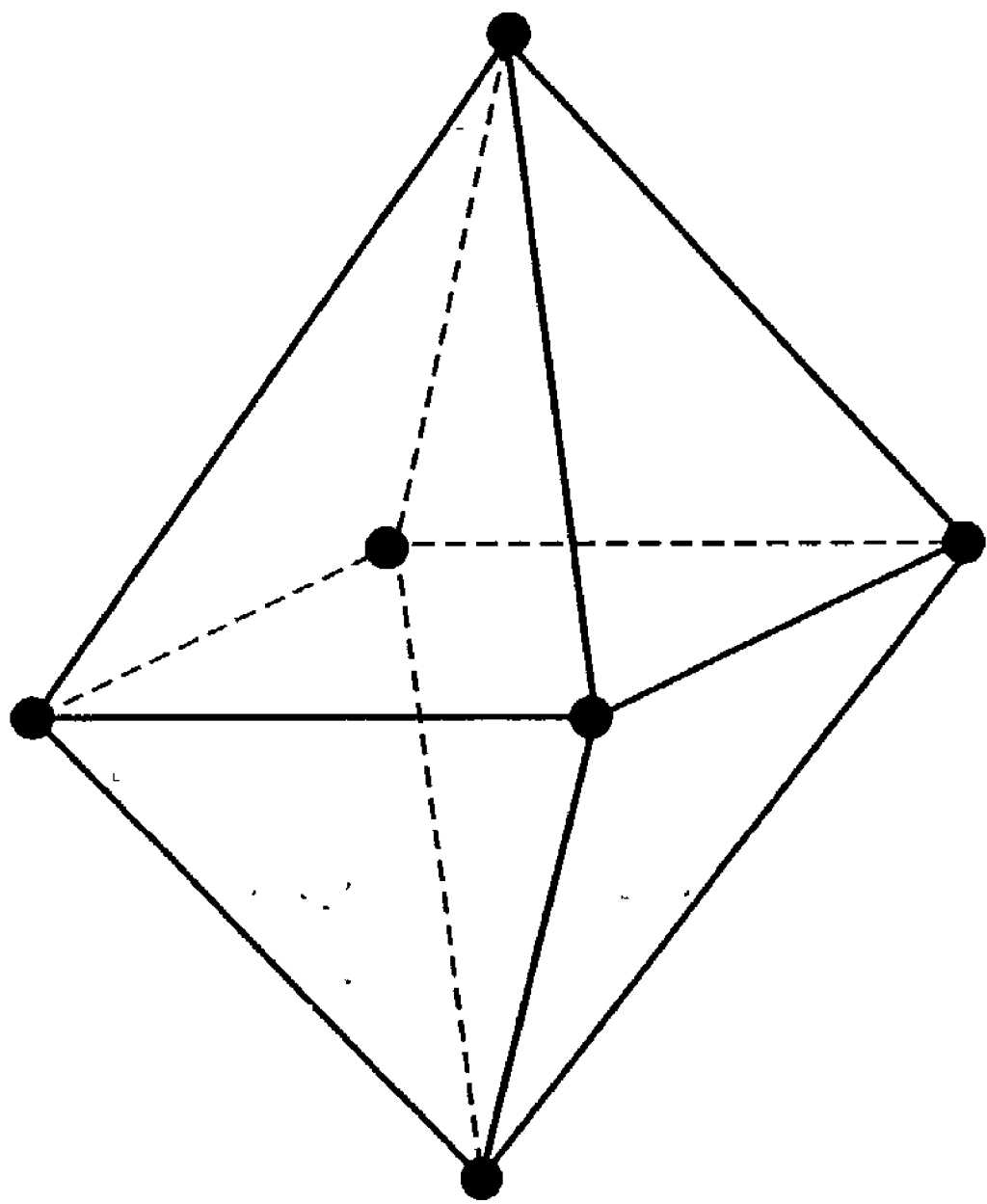

FIG. 27

| STEP OF R VALUE : 0, 32, 64, ..., 224, 255 |
|---|
| STEP OF G VALUE : 0, 32, 64, ..., 224, 255 |
| STEP OF B VALUE : 0, 32, 64, ..., 224, 255 |

L*a*b* COORDINATE OF Grid(0, 0, 0) : (30, 0, −2)

L*a*b* COORDINATE OF Grid(0, 0, 1) : (31, 2, −9)

⋮

L*a*b* COORDINATE OF Grid(0, 0, 8) : (34, 18, −33)

L*a*b* COORDINATE OF Grid(0, 1, 0) : (34, −8, 0)

⋮

L*a*b* COORDINATE OF Grid(8, 8, 7) : (90, −4, 12)

L*a*b* COORDINATE OF Grid(8, 8, 8) : (92, 0, 0)

FIG. 32
SELECT DISPLAY MODE
 WIRE FRAME DISPLAY
 SOLID DISPLAY 1
 SOLID DISPLAY 2

FIG. 38

| SELECT DISPLAY HUE RANGE | |
|---|---|
| ☑ RY AREA | ☐ CB AREA |
| ☐ YG AREA | ☐ BM AREA |
| ☐ GC AREA | ☐ MR AREA |

FIG. 42

SELECT DISPLAY SURFACE

- ☑ WMYR SURFACE
- ☑ WYCG SURFACE
- ☐ WCMB SURFACE
- ☐ HUE SURFACE 1

- ☐ KMYR SURFACE
- ☐ KYCG SURFACE
- ☐ KCMB SURFACE
- ☐ HUE SURFACE 2

FIG. 45

| SELECT COMPARISON CALCULATION METHOD |
|---|
| ■ COMPARE CHANGE AMOUNT |
| ☐ COMPARE DENSITY |
| ☐ COMPARE CHANGE DIRECTION |
| ☐ COMPARE CHANGE DIRECTION+CHANGE AMOUNT |

FIG. 46
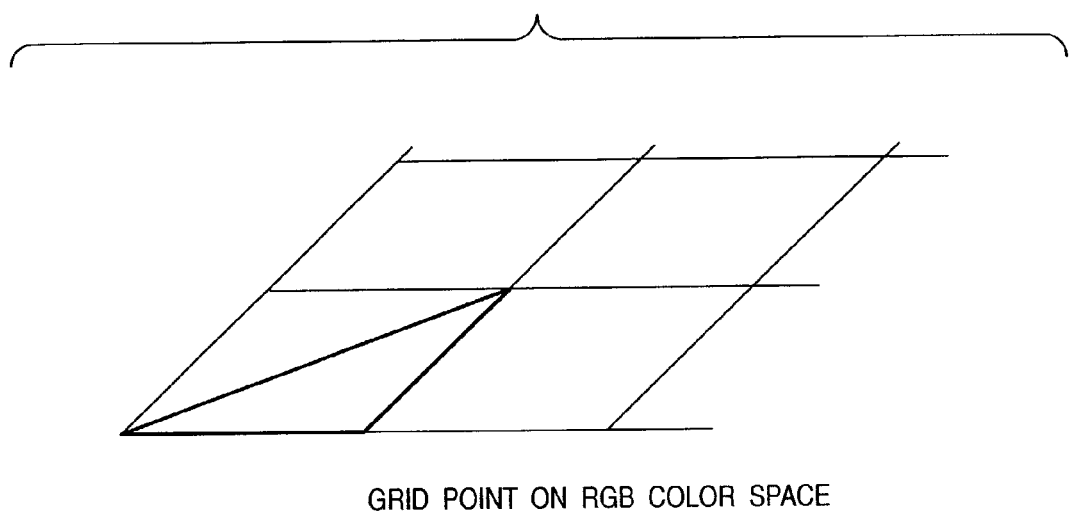
GRID POINT ON RGB COLOR SPACE
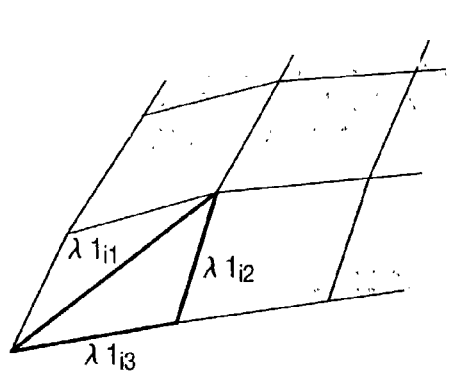
POLYGON MODEL BASED ON
SOURCE COLOR DISTRIBUTION DATA
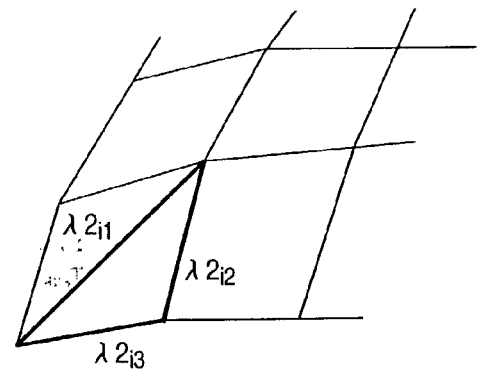
POLYGON MODEL BASED ON
DESTINATION COLOR DISTRIBUTION DATA

FIG. 47
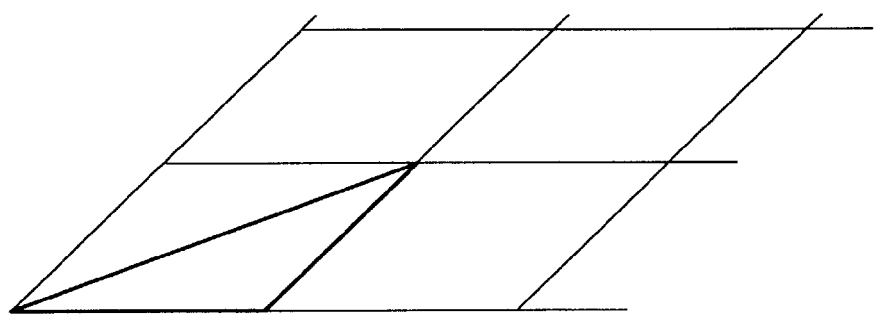
GRID POINT ON RGB COLOR SPACE
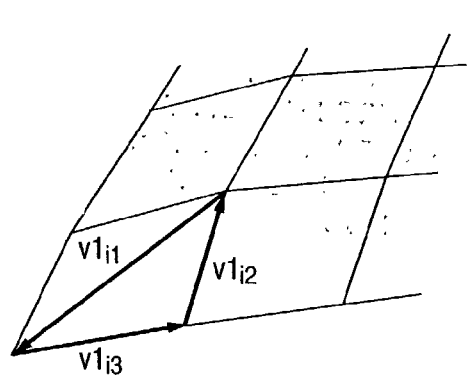
POLYGON MODEL BASED ON
SOURCE COLOR DISTRIBUTION DATA
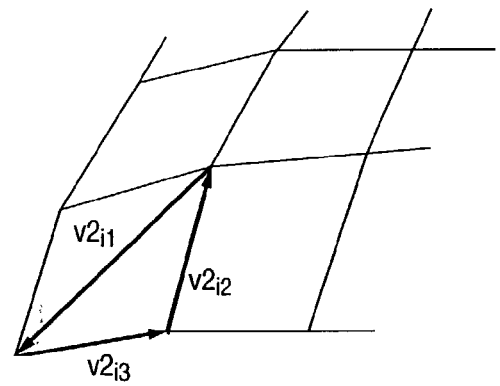
POLYGON MODEL BASED ON
DESTINATION COLOR DISTRIBUTION DATA

FIG. 49

3D OBJECT DATA
├── DISPLAY GRID RANGE
└── TRIANGLE PATCH DATA

IMAGE OBJECT DATA
├── FLICKERING DISPLAY AREA
└── IMAGE DATA

RANGE DISPLAY OBJECT DATA
├── DISPLAY/NON-DISPLAY FLAG
├── RGB RANGE DATA
└── L*a*b* SEGMENT DATA

FIG. 51

| DESIGNATE REFERENCE AREA SIZE |
|---|
| VERTICAL SIZE   ±   1   PIXEL(S)<br><br>HORIZONTAL SIZE ±   1   PIXEL(S) |

FIG. 57

DESIGNATE IMAGE→COLOR DISTRIBUTION L*a*b* RANGE

L*  + [ 10 ]
    − [ 10 ]

a*  + [ 15 ]
    − [ 15 ]

b*  + [ 10 ]
    − [ 10 ]

COLOR INFORMATION PROCESSING APPARATUS AND METHOD

FIELD OF THE INVENTION

The present invention relates to a color information processing apparatus and method and, more particularly, to the analysis of color distribution using pseudo three-dimensional display, pseudo three-dimensional display used to confirm a color correction result, and the qualitative evaluation of color information distributed in a three-dimensional space by variously displaying the three-dimensional distribution of color information.

BACKGROUND OF THE INVENTION

Along with the popularization of personal computers and workstations, desktop publishing (DTP) systems and computer-aided design (CAD) system have prevailed. Under such circumstance, a color reproduction technique that reproduces colors expressed on a computer monitor on a recording sheet using color agents has acquired much importance. For example, in DTP using a computer system having a color monitor and color printer, after a color image is created, edited and processed on the monitor, it is output using the color printer.

The user of such system strongly desires perceptual matching between the image on the monitor and the output from the printer. However, attaining perceptual matching between the image on the monitor and that of the printer comes with difficulty for the following reasons.

The monitor expresses a color image by emitting light components of specific wavelengths using a phosphor and the like. On the other hand, the printer expresses a color image by reflected light components that remain after light components of specific wavelengths are absorbed using inks and the like. Since the monitor and printer have such different image visualization forms, they have large different color reproduction ranges. Furthermore, even within the monitor, a liquid crystal system, a CRT system using electron guns, and a plasma system have different color reproduction ranges. Also, the color reproduction range of a single printer varies depending on paper qualities and inks or toners, and amounts of inks or toners used.

In order to attain perceptual matching between images on media having different color reproduction ranges, various gamut mapping processes that define correspondence between two different color reproduction ranges in a uniform colorimetric system are available. The qualities of such gamut mapping processes are ultimately determined by subjective evaluation for various images. However, subjective evaluation requires huge cost, and it is difficult to reflect the evaluation results upon gamut mapping processes.

Hence, analysis and evaluation techniques for a gamut mapping process, which can determine quality and can reflect the determination result upon the gamut mapping process, are needed.

Some analysis techniques for determining the quality of a gamut mapping process use quantitative evaluation scales (e.g., calculations of the total sum of color differences in all colors, evaluation of color differences of individual colors, and the like). However, an image is a combination of color information and space information, and the quality of a gamut mapping process must be determined in consideration of whether or not space information is reasonably preserved. The aforementioned quantitative evaluation scales do not contain any determination factors for space information and, hence, only one aspect of the gamut mapping process can be evaluated. Furthermore, since color information is distributed in a three-dimensional space, quantitative evaluation information can be quite large, and desired local information can be hard to find.

SUMMARY OF THE INVENTION

The present invention has been made to solve the aforementioned problems individually or together, and has as its object to allow the user to find/determine the quality/difference of gamut mapping, since a plurality of pieces of color information can be qualitatively/intuitively compared by pseudo three-dimensional display of the plurality of pieces of color information.

It is another object of the present invention to allow easy analysis of problems in a gamut mapping process by associating problems that occur when applying a color correction technique to an image with the three-dimensional distribution of color information.

It is another object of the present invention to allow the user to visually compare the results of local color distribution states or that of detailed distribution states using pseudo three-dimensional display.

It is also another object of the present invention to display the three-dimensional distribution of color information in various forms.

The foregoing objects are achieved by a color information processing apparatus that has an acquisition section, arranged to acquire color image data, and color distribution information which indicates a relationship between sample point values in a first colorimetric system, and color coordinate values in a second colorimetric system. A constructor constructs surface information of a first three-dimensional object, on the basis of the color distribution information, and a display section displays a first image based on the surface information, and a color image based on the input color image data. An input section inputs a user's designation of a part of the displayed color image, and a generator generates three-dimensional object data, representing a second three-dimensional object and based on color image data corresponding to the part of the color image designated by the user's designation. The display section displays a second image corresponding to the second three-dimensional object superimposed on the first three-dimensional object.

The invention also encompasses a method comprising acquiring color image data, and color distribution information which indicates a relationship between sample point values in a first colorimetric system, and color coordinate values in a second colorimetric system, and constructing surface information of a first three-dimensional object on the basis of the color distribution information. A first image is displayed, based on the surface information, as is a color image based on the input color image data, and a user inputs a designation of a part of the displayed color image. Three-dimensional object data, representing a second three-dimensional object and based on color image data corresponding to the part of the color image designated by the user's designation, is generated, and a second image corresponding to the second three-dimensional object superimposed on the first three-dimensional object is displayed.

The invention also includes carrying out this method by means of a computer, and a program product for that purpose.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the system arrangement of a color information analysis apparatus according to an embodiment of the present invention;

FIG. 2 illustrates the layout of grid points in an RGB color space before a color correction process;

FIG. 3 is a view for explaining an example of the format of a color correction information file;

FIG. 5 is a view for explaining color distribution data stored in a color distribution information file;

FIG. 7 shows the structure of object data used in the first embodiment;

FIG. 12 shows a user interface used to designate a display grid range;

FIG. 13 shows a display example of 3D object data;

FIG. 15 shows a user interface used to designate the RGB range of range display object data;

FIG. 20 shows a user interface used to designate a flickering display range;

FIG. 25 shows another shape of a range display object;

FIG. 27 shows an example of the format of a color distribution information file;

FIG. 32 shows a user interface used to select a display mode;

FIG. 38 shows a user interface used to select a display hue range;

FIG. 42 shows a user interface used to select a display surface;

FIG. 45 shows a user interface used to select a comparison calculation method;

FIG. 46 is a view for explaining the lengths of sides of a polygon;

FIG. 47 is a view for explaining the vectors of sides of a polygon;

FIG. 49 shows an example of the structure of object data used in an embodiment;

FIG. 51 shows a user interface used to designate the sizes of a surrounding area;

FIG. 57 shows a user interface used to designate an L*a*b* range of a range display object;

DETAILED DESCRIPTION OF THE PREFERRED EMBODIMENTS

Figure 4:
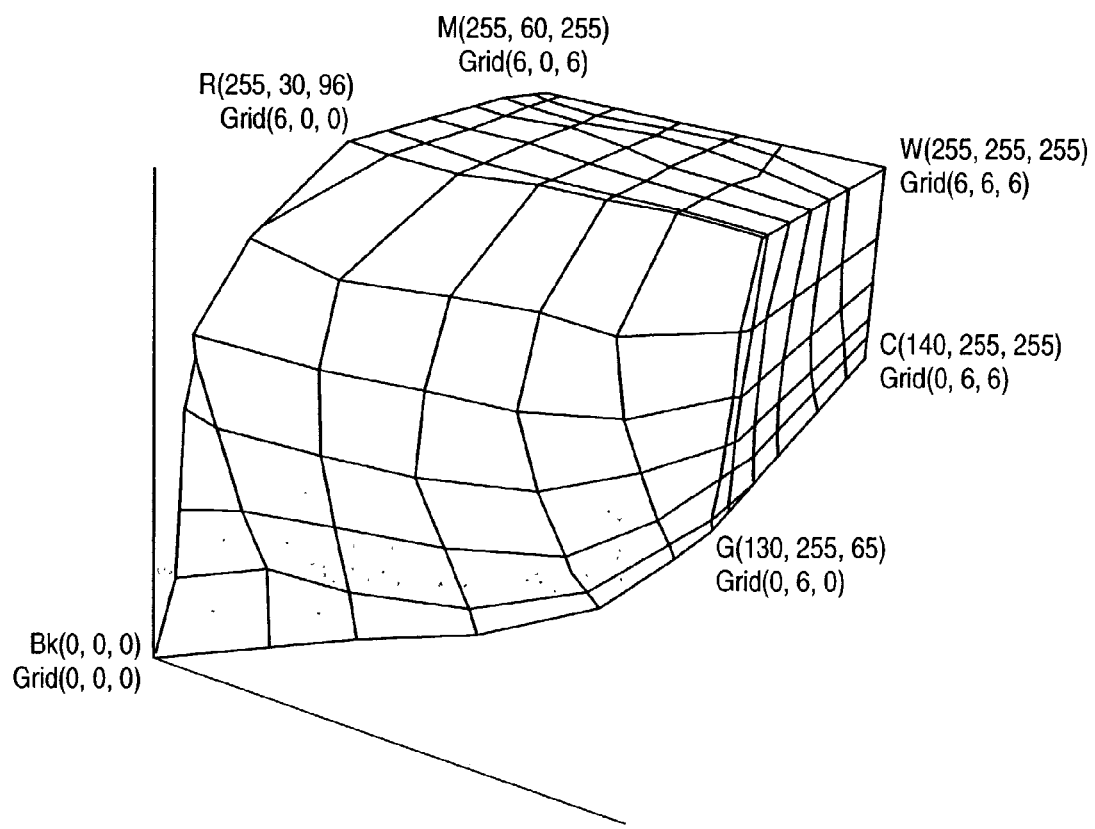
FIG. 4 shows an example of grid points after color correction.

A color information processing apparatus according to an embodiment of the present invention will be described in detail hereinafter with reference to the accompanying drawings.

An embodiment to be described hereinafter relates to a color information (color distribution) analysis apparatus which can variously display the three-dimensional (3D) distribution of color information so as to implement qualitative/intuitive determination/evaluation. This apparatus acquires color distribution information indicating color coordinate positions that regularly spaced out sample points in an RGB colorimetric system take on in an L*a*b* colorimetric system. The apparatus forms surface information of a 3D object on the basis of this color distribution information, and then pseudo-3D displays the surface information of the 3D object. The user can select a display mode of the surface of the 3D object.

According to the embodiment, the user can qualitatively and intuitively determine and evaluate, for example, local or comprehensive information of a gamut mapping process. Furthermore, the user can adequately recognize and determine local problems of the gamut mapping process, and can quickly reflect the determination result upon the gamut mapping process.

[Arrangement]

FIG. 1 is a block diagram showing the system arrangement of a color information processing apparatus of this embodiment.

Referring to FIG. 1, a CPU 101 controls respective blocks connected via a bus 115 and executes various processes including those to be described later in accordance with programs and data, which are stored in a ROM 102 and hard disk drive (HDD) 105, and user's instructions input via a keyboard 113, mouse 114, and keyboard/mouse controller 112.

Note that an interface (HDD I/F) 104 provides a versatile interface such as SCSI, ATA, or the like for connecting the HDD 105. A graphic accelerator 106 provides an interface for displaying an image on a color monitor 107. A USB controller 108 provides an interface for connecting peripheral devices such as a color printer 109 and the like. A parallel port controller 110 provides an interface for connecting a colorimeter 111 and the like. Note that the present invention is not limited to these interfaces, and any other interfaces may be adopted as long as the processes to be described later can be executed.

[Outline of Process]

When the user instructs to launch a color analysis program, the CPU 101 reads out the color analysis program from the HDD 105 or the like, stores it in a main memory 103, and executes the program from a predetermined address.

The color analysis program requests the user to designate a color distribution information file to be analyzed and an image file first. When the user inputs path information indicating the locations of a predetermined color distribution information file and image file based on this request, the color analysis program stores data read out from these files in the main memory 103, initializes various data, and then waits for the next user's input.

After that, the program processes color information distribution data stored in the main memory 103 as needed and displays the processed data on the color monitor 107 in accordance with user's operation instruction.

Note that the process of the color analysis program will be described in detail later.

FIRST EMBODIMENT

[Color Correction Data]

Color correction data to be stored in a color correction information file in the first embodiment will be described below.

Color correction data is used in a color correction process such as gamut mapping, gamma setup change, color tone correction, and the like. The color correction data is expressed in the form of a table that describes correspondence between color coordinate data of grid points which are regularly laid out in an RGB color space, and those after a color correction process.

FIG. 2 illustrates grid points in the RGB color space before a color correction process. In FIG. 2, the number of grid points on each of the R, G, and B axes is "7", and the RGB values of respective sample points corresponding to black (Bk), green (G), red (R), cyan (C), magenta (M), and white (W), and the grid coordinate values of the sample points using grid numbers are illustrated.

FIG. 3 is a view for explaining a data layout example (format) of the color correction information file. Near the head of this file, steps of R, G, and B values before color correction are described. Following this description, data (grid data) of sample points nested in the order of R, G, and B, and corresponding RGB coordinate values after color correction are described.

FIG. 4 shows an example of grid points after color correction using color correction data. Referring to FIG. 4, the RGB values after color correction of sample points corresponding to black (Bk), green (G), red (R), cyan (C), magenta (M), and white (W), and the grid coordinate values of the sample points using grid numbers are described.

FIG. 5 is a view for explaining color distribution data stored in a color distribution information file. As the color distribution data, color coordinate data of grid points, which are regularly laid out in the RGB color space, and L*a*b* coordinate values as a result of color correction of the color coordinate data of the grid points using color correction data are described. At the head of the file, steps of R, G, and B values before color correction are described. Following this description, color distribution data are described while being nested in the order of R, G, and B, and color coordinate values are described in the file in the order of L*, a*, and b* values.

Note that the color distribution information file is generated by generating color patches corresponding to color coordinate values of the grid points after color correction in the RGB color space, displaying them on the monitor or outputting them via the printer, and measuring the patch images using the calorimeter on the computer system.

Alternatively, the color distribution information file may be generated using the following method. Patch images are generated using as color patches color coordinate data of grid points, which do not undergo color correction and are regularly laid out in the RGB color space, and are displayed on the monitor or output via the printer. The output patch images are measured using the calorimeter. Based on this colorimetry result, L*a*b* values corresponding to RGB values of the grid points after color correction are calculated by interpolation.

The color distribution information file generated in this manner is device information indicating the color characteristics of the output device that output the patch images.

The color distribution information file can also be generated by RGB→Lab conversion calculations in consideration of perceptual adaptation specified by CIE CAM97s.

In the first embodiment, image data to be stored in the image file is digital data in which each of pixels that form an image consists of three values R, G, and B. Image data is generated by a digitize process using a digital camera, scanner, or the like, or a computer graphics (CG) technique.

[Color Analysis Program]

Figure 6:
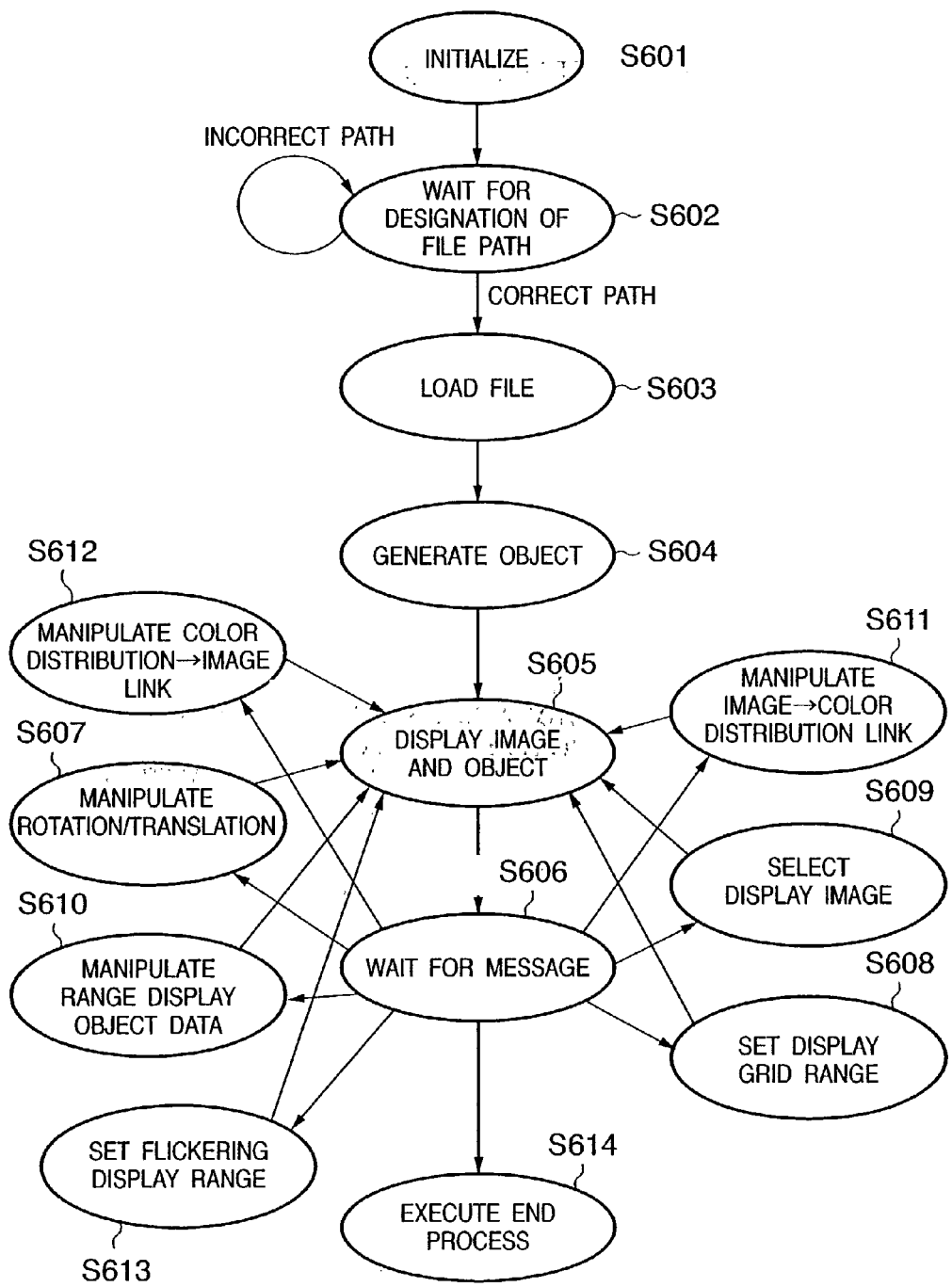
FIG. 6 is a status transition chart for explaining the process of a color analysis process in the first embodiment.

FIG. 6 is a status transition chart for explaining the process of the color analysis program in the first embodiment.

When the color analysis program is launched, it executes initialization (e.g., assures a work heap memory and the like) (S601). Subsequently, the program waits for path information of a color correction information file, color distribution information file, and image file input by the user (S602). If the input path information is incorrect, step S602 is repeated.

If the input path information is correct, the program loads the color correction information file, color distribution information file, and image file on the basis of the path information, and stores them in a heap memory (S603). The program then generates initial 3D object data on the basis of color correction data and color distribution data, also generates initial image object data based on image data, and initializes geometry information upon displaying a 3D object (S604). The generation and display of objects in step S604 will be described later.

Images based on the image object data and 3D object data are appropriately displayed on the monitor on the basis of the geometry information (S605). Note that the geometry information is formed of the position of the 3D object on the world coordinate system, rotational angle of the 3D object, screen coordinate data, screen rotational angle, viewpoint coordinate data, line-of-sight vector data, and the like.

The program waits for a message from the user (S606). By interpreting various input messages, the control advances to an appropriate processing step. Processes corresponding to messages received in step S606 will be explained below. The message list is as follows.

Message List:
{MOVE, CHANGE_RGBAREA1, CHANGE_RGBAREA2, CHANGE_IMAGEAREA, CHANGE_GRIDAREA, LINK_TO_IMAGE, LINK_TO_DIST, CHANGE_IMAGE, PROCESS_END}

MOVE

Upon detection of message MOVE in step S606, a viewpoint translation amount/viewpoint rotation amount attached to the message is extracted, and the viewpoint coordinate data and line-of-sight vector data of the geometry information are updated based on the extracted viewpoint translation amount/viewpoint rotation amount (S607). The flow returns to step S605 to update image display on the basis of the updated geometry information.

CHANGE_GRIDAREA

Upon detection of message CHANGE_GRIDAREA in step S606, selected display grid range attached to the message is extracted, and the 3D object data is updated based on the extracted information of the display grid range (S608). The flow returns to step S605 to update image display on the basis of the updated 3D object data.

CHANGE_RGBAREA1

Upon detection of message CHANGE_RGBAREA1 in step S606, flickering display range attached to the message is extracted, and information indicating the flickering display range of the color analysis program is updated on the basis of the extracted information of the flickering display range (S613). The flow then returns to step S605 to update display.

CHANGE_RGBAREA2

Upon detection of message CHANGE_RGBAREA2 in step S606, displaying range attached to the message is extracted, and range display object data is updated on the basis of the extracted information of displaying range (S610). The flow then returns to step S605 to update display.

LINK_TO_IMAGE

Upon detection of message LINK_TO_IMAGE in step S606, an L*a*b* value, which is to undergo color distribution→image link manipulation and is attached to the message, is extracted, and the color distribution→image link manipulation (to be described later) is executed on the basis of the extracted L*a*b* value which is to undergo color distribution→image link manipulation, thus updating the image object data (S612). The flow returns to step S605 to update image display on the basis of the updated image object data.

LINK_TO_DIST

Upon detection of message LINK_TO_DIST in step S606, an RGB value, which is to undergo image→color distribution link manipulation and is attached to the message, is extracted, and the image→color distribution link manipulation (to be described later) is executed on the basis of the extracted RGB value which is to undergo image→color distribution link manipulation, thus updating the range display object data (S611). The flow returns to step S605 to update the image display.

CHANGE_IMAGE

Upon detection of message CHANGE_IMAGE in step S606, selection information of a display image attached to the message is extracted, and the image object data is updated on the basis of the extracted selection information of the display image (S609). The flow then returns to step S605 to update image display on the basis of the updated image object data.

PROCESS_END

Upon detection of message PROCESS_END in step S606, an end process (e.g., to release the heap memory and the like) is executed (S614), thus ending the color analysis program.

Generation of Initial Object Data

Generation and display of initial object data in step S604 will be explained below.

FIG. 7 shows the structure of object data used in the first embodiment.

Figure 8:
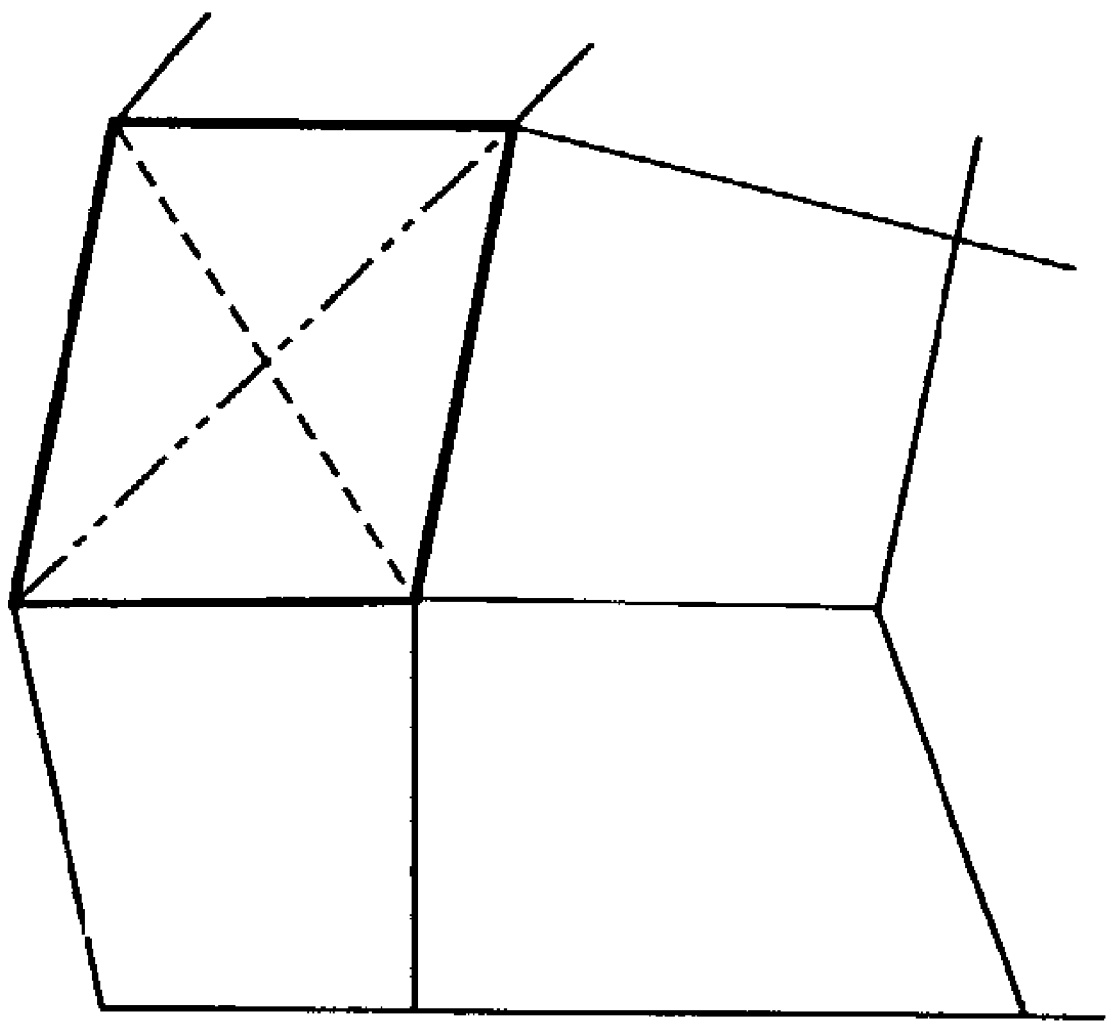
FIG. 8 shows a minimum rectangle formed by grid points.

Upon generating 3D object data, two different combinations of triangles are generated for each of minimum rectangles formed by grid points after color correction, which are obtained by making color correction of a maximum grid area surface in the RGB color space (see FIG. 8).

Referring to FIG. 8, an area bounded by the bold line is a minimum rectangle formed by grid points. In this area, a combination of triangles obtained by dividing the rectangle by the broken line, and a combination of triangles obtained by dividing the rectangle by the two-dashed chain line are generated. The grid point coordinate values of vertices of these triangles are converted into corresponding L*a*b* coordinate values using the color distribution information data, and 3D object data is formed based on combinations of triangles after conversion. In this case, the combinations of triangles are selected to maximize the volume of the 3D object data. Note that the display grid range of 3D object data is reset to a maximum grid area.

Image object data is formed of original image data read in step S603, and color-corrected image data obtained by executing a color correction process of the original image data using the color correction data.

A display image identification flag of the image object data shown in FIG. 7 indicates data to be displayed of one of the original image data and color-corrected image data. Upon generation of initial image object data, the display image identification flag is set to indicate the color-corrected image data. Also, a display/non-display flag of range display object data is reset to a non-display state.

Figure 9:
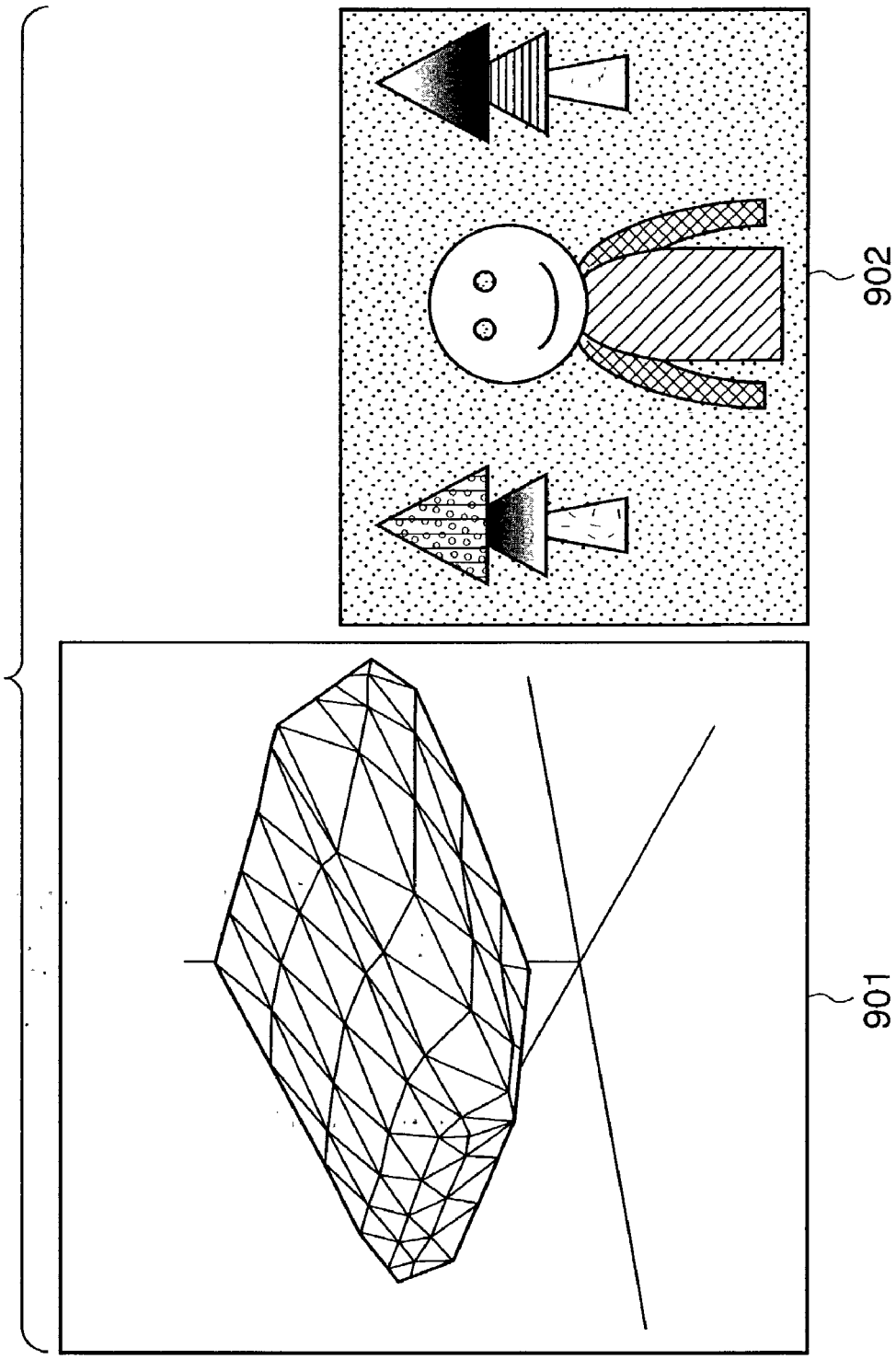
FIG. 9 shows a display example of object data.

FIG. 9 shows a display example on the color monitor 107 in step S605. Reference numeral 901 denotes a display example of an image based on the 3D object data, and 902 denotes a display example of an image based on the image object data.

Select Display Image

Selection and display of a display image in step S609 will be explained below.

Figure 10:
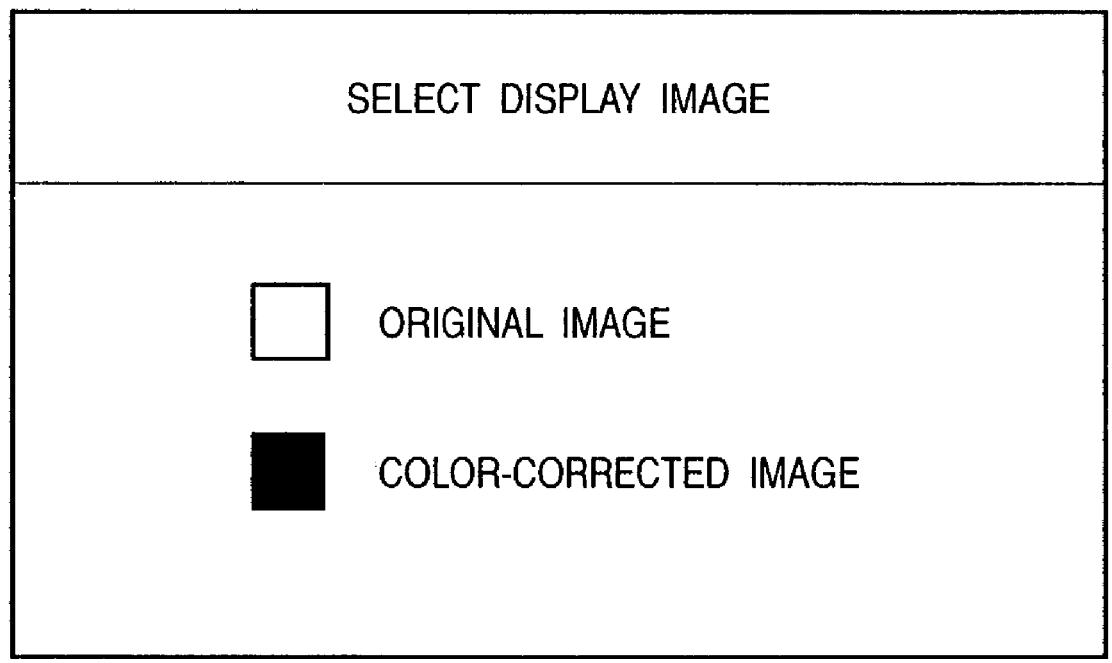
FIG. 10 shows a user interface used to select a display image.

FIG. 10 shows a user interface used to select a display image. Using this interface, the user selects data to be displayed as an image from the original image data and color-corrected image data. When the user selects a display image, display image selection message CHANGE_IMAGE is sent to the color analysis program, which updates the display image identification flag of the image object data shown in FIG. 7 in accordance with selection information of a display image attached to the message.

Figure 11:
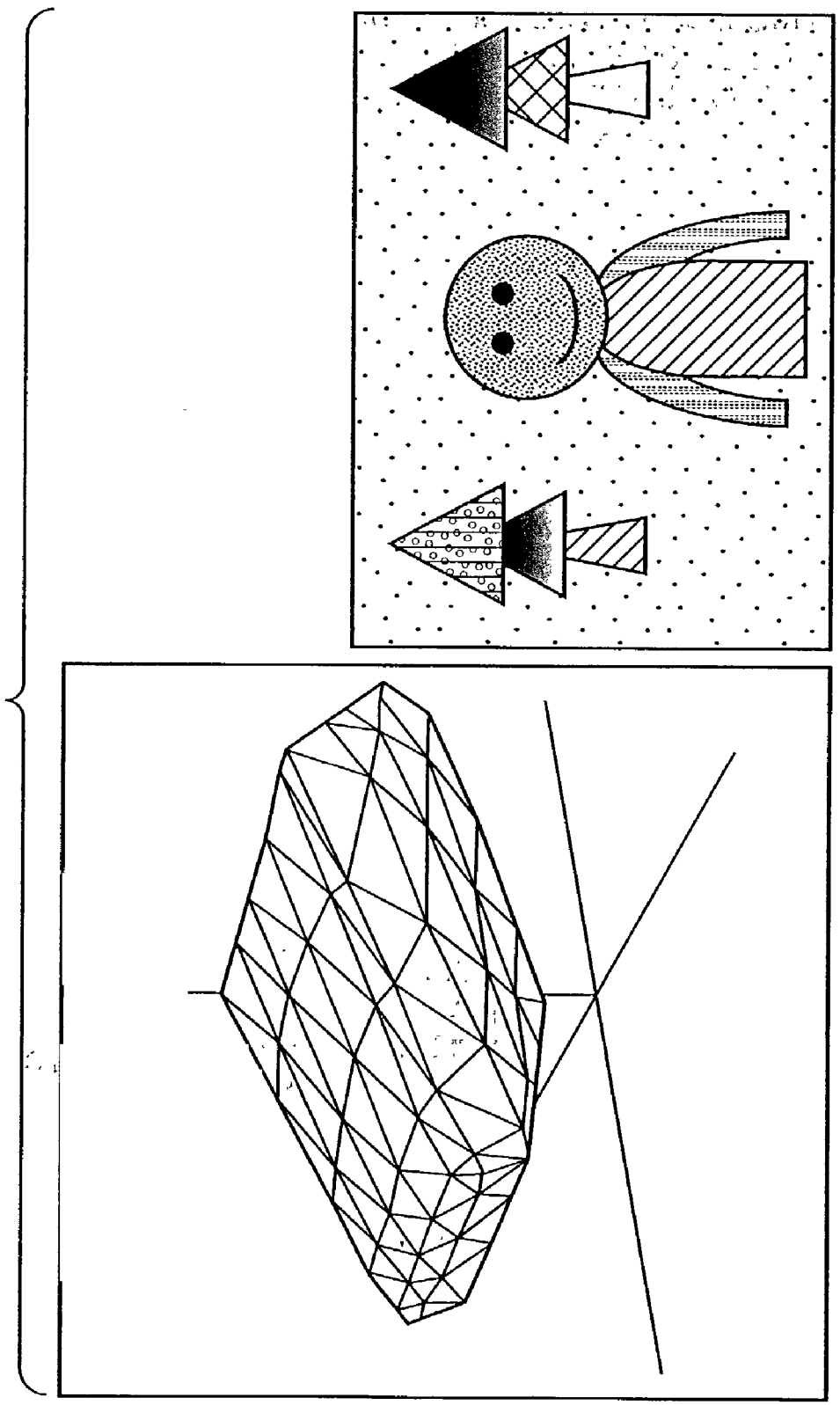
FIG. 11 shows a display example of object data.

FIG. 11 shows a display example on the color monitor 107 when the original image data is selected as a display image.

Select Display Grid Range

Selection and display of the display grid range in step S608 will be explained below.

FIG. 12 shows a user interface used to select a display grid range. The user can select an area of the RGB color space where a 3D object is to be displayed by selecting grid ranges of R, G, and B values using this interface. When the user selects display grid ranges using this user interface, message CHANGE_GRIDAREA indicating the designated display grid ranges is sent to the color analysis program, which updates 3D object data as follows in accordance with the RGB grid ranges attached to the message.

Initially, two different combinations of triangles are generated for each of minimum rectangles formed by grid points on the surface designated on the RGB color space (see FIG. 8). The coordinate values of vertices of these triangles are then converted into corresponding L*a*b* coordinate values using the color distribution information data, and 3D object data is formed based on combinations of triangles after conversion. In this case, the combinations of triangles are selected to maximize the volume of the 3D object data. That is, if N minimum rectangles formed by grid points are present on the RGB color space, the 3D object data is formed by 2N triangles selected from $2^N$ different combinations.

Figure 14:
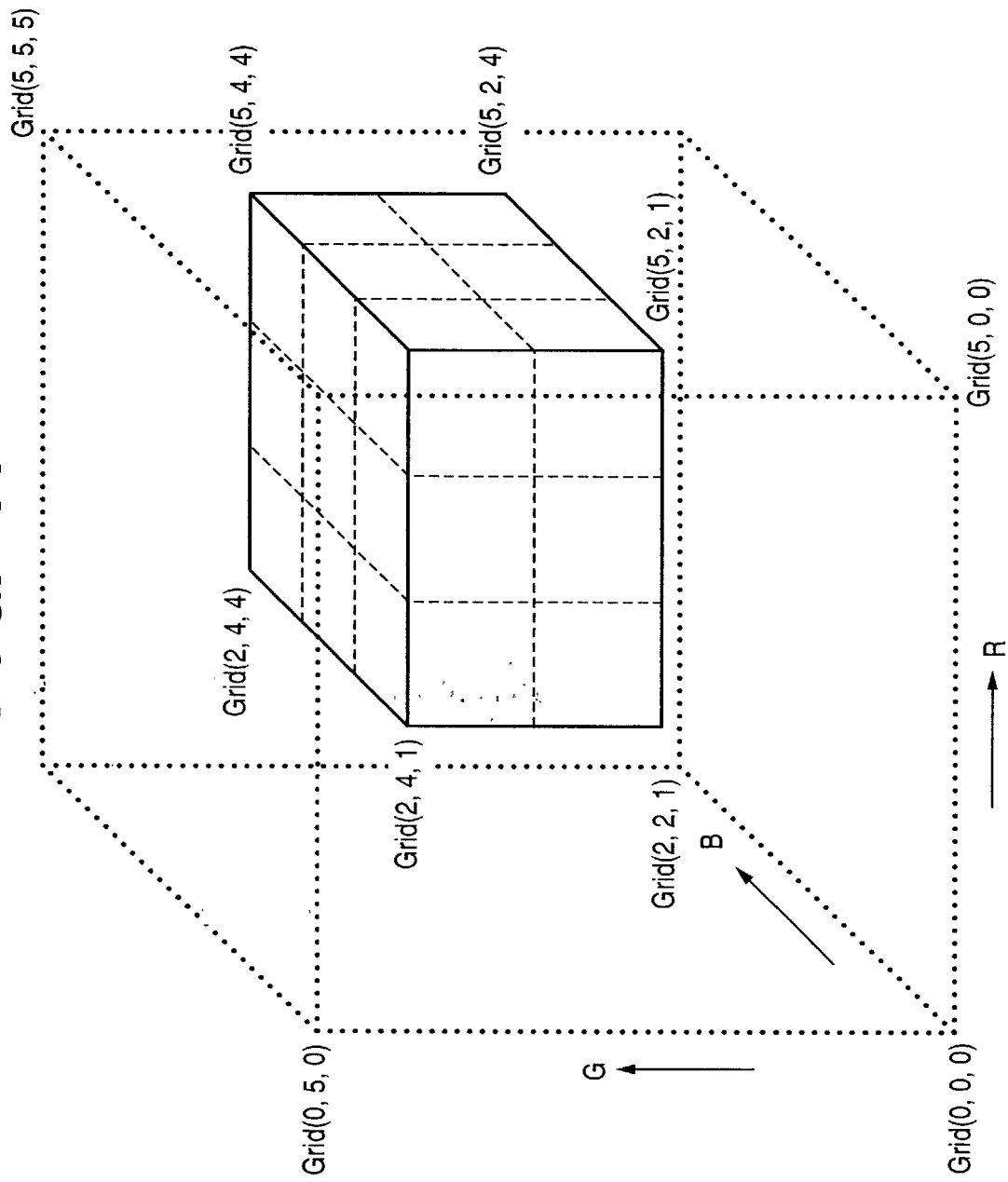
FIG. 14 shows the grid range in the RGB color space.

FIG. 13 shows a display example of 3D object data on the color monitor 107 when the number of grid points on each of the R, G, and B axes is "6", and the R, G, and B axis display grid ranges are [2, 5], [2, 4], and [1, 4], respectively. FIG. 14 shows the grid range in the RGB color space. A range indicated by the dotted line is a maximum grid area, and a range indicated by the solid line is a selected area. Note that intersections between the broken and solid lines in the selected area indicate grid points.

Select RGB Range

Selection of the RGB range of range display object data in step S610 will be explained below.

FIG. 15 shows a user interface used to select the RGB range of the range display object data. When the user selects the RGB range using this user interface, message CHANGE_RGBAREA1 is sent to the color analysis program, which updates the range display object data in accordance with the information indicating the RGB range, which is attached to the message.

Figure 16:
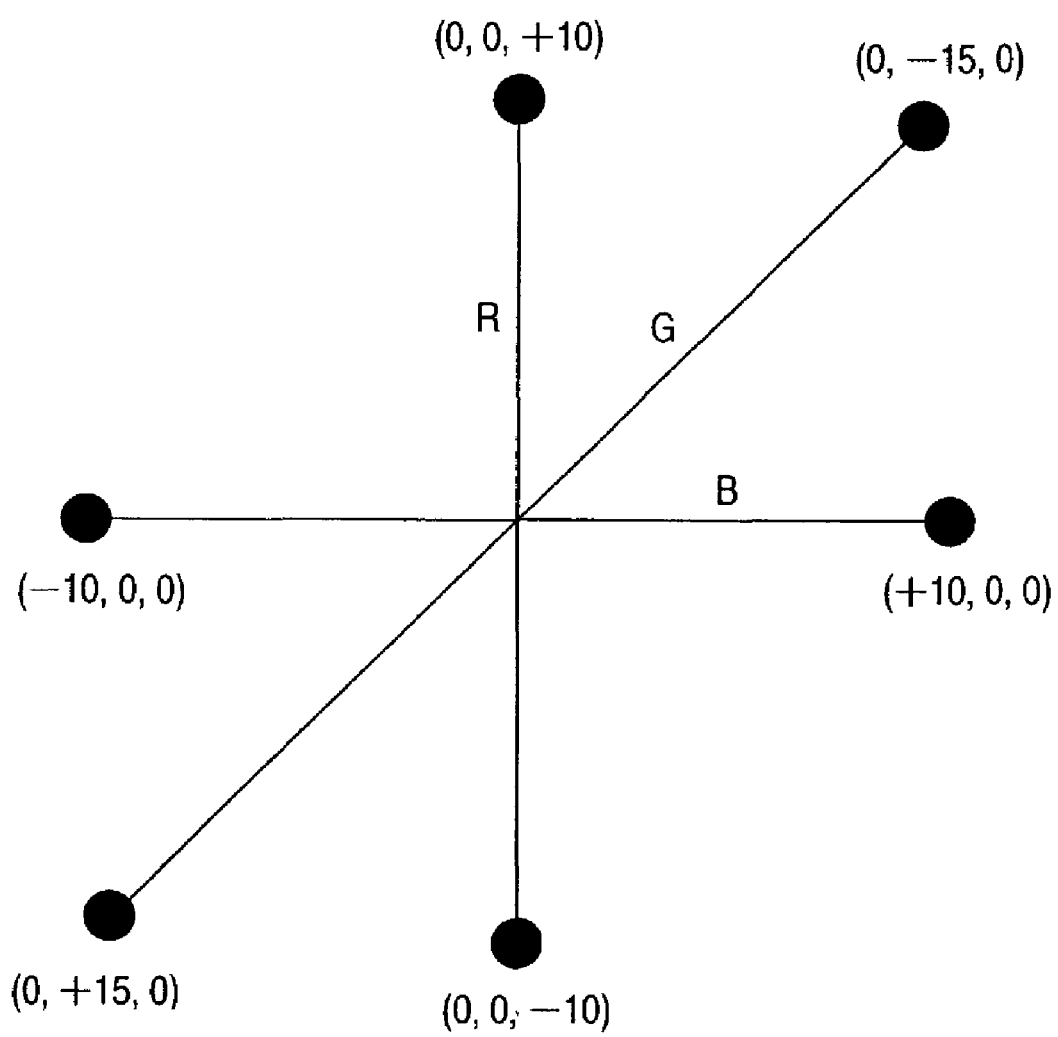
FIG. 16 shows RGB range designation of range display object data in the RGB color space.

FIG. 16 shows the selected RGB range of the range display object data in the RGB color space when the selected RGB range is [−10, 10], [−15, 15], and [−10, 10].

Image→Color Distribution Link Manipulation

The image→color distribution link manipulation in step S611 will be described below.

When the user selects a point on an image using the mouse or the like, an arrow (denoted by reference numeral 192 in FIG. 19) is displayed at the corresponding position, and message LINK_TO_DIST is sent to the color analysis program. At this time, the display image can be either an image based on the color-corrected image data or that based on the original image data. The color analysis program updates the range display object data on the basis of an RGB value which is to undergo image→color distribution link manipulation and is attached to the message (i.e., the RGB value of the selected point).

Figure 17:
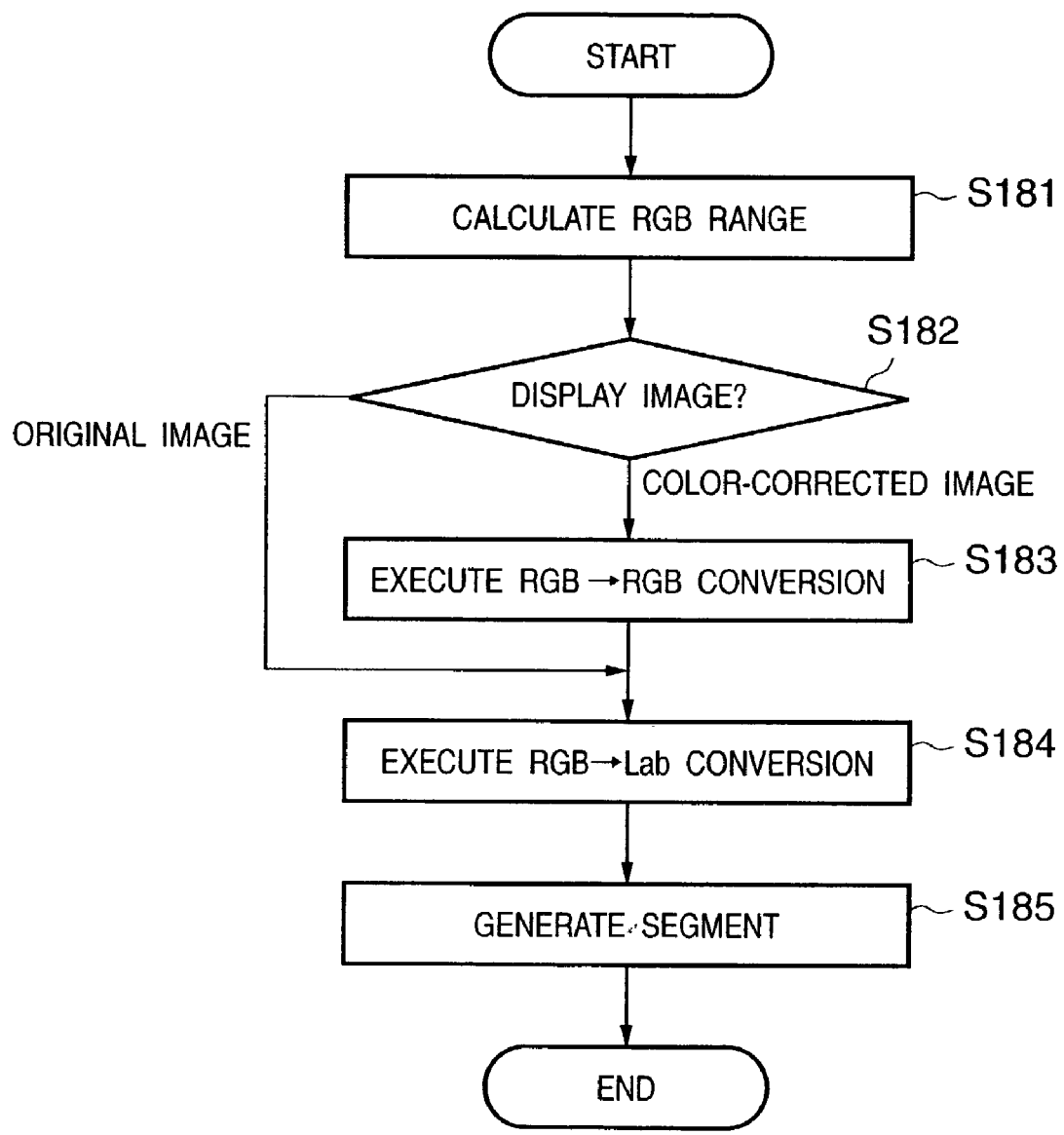
FIG. 17 is a flow chart showing the update sequence of range display object data.

FIG. 17 is a flow chart for explaining the update sequence of the range display object data.

On the basis of the RGB value (r, g, b) of a pixel of the selected point and the designated RGB range [−rsize, r'size], [−gsize, g'size], and [−bsize, b'size] of the range display object data, six values rmin, rmax, gmin, gmax, bmin, and bmax are calculated (S181) by:

$r\mathrm{min}=r-r\mathrm{size}$ $r\mathrm{max}=r+r'\mathrm{size}$ $g\mathrm{min}=g-g\mathrm{size}$ $g\mathrm{max}=g+g'\mathrm{size}$ $b\mathrm{min}=b-b\mathrm{size}$ $b\mathrm{max}=b+b'\mathrm{size}$ Based on the display image identification flag of the image object data, it is checked whether the display image is the color-corrected image or original image (S182). If the display image is the color-corrected image, seven RGB values (rmin, g, b), (rmax, g, b), (r, gmin, b), (r, gmax, b), (r, g, bmin), (r, g, bmax), and (r, g, b) are respectively converted into values before color correction on the basis of the color correction data (S183).

Then, the seven RGB values (rmin, g, b), (rmax, g, b), (r, gmin, b), (r, gmax, b), (r, g, bmin), (r, g, bmax), and (r, g, b) before color correction (or of the original image) are converted into L*a*b* values using the color distribution data (S184).

Six segments having, as end points, L*a*b* coordinate values corresponding to (rmin, g, b), (rmax, g, b), (r, gmin, b), (r, gmax, b), (r, g, bmin), and (r, g, bmax), and an L*a*b* coordinate value corresponding to (r, g, b), are generated to update the range display object data (S185).

Figure 18:
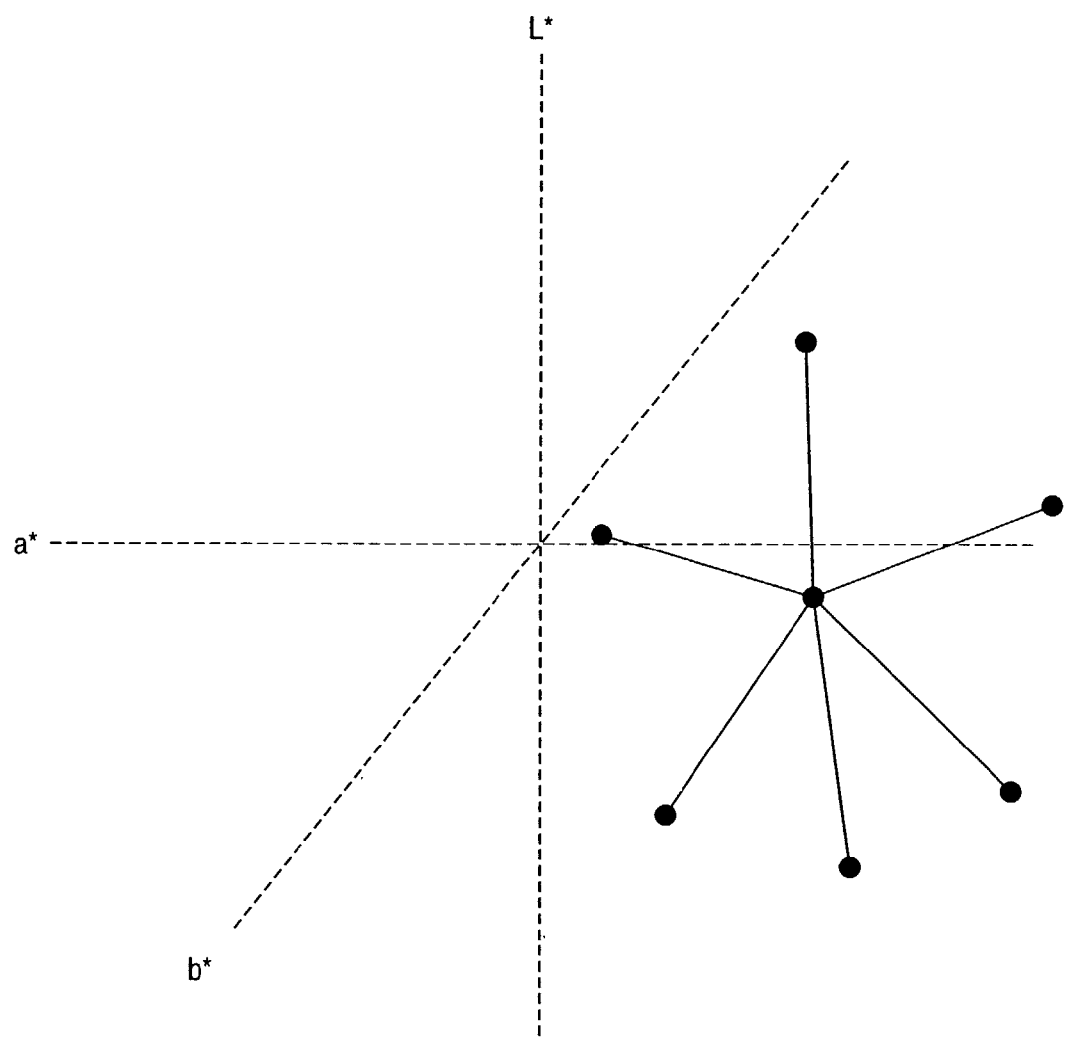
FIG. 18 illustrates a range display object in an Lab color space.

FIG. 18 illustrates the range display object data in the L*a*b* color space.

The color analysis program determines the display position of the range display object data updated in the aforementioned sequence with reference to the 3D object data.

Figure 19:
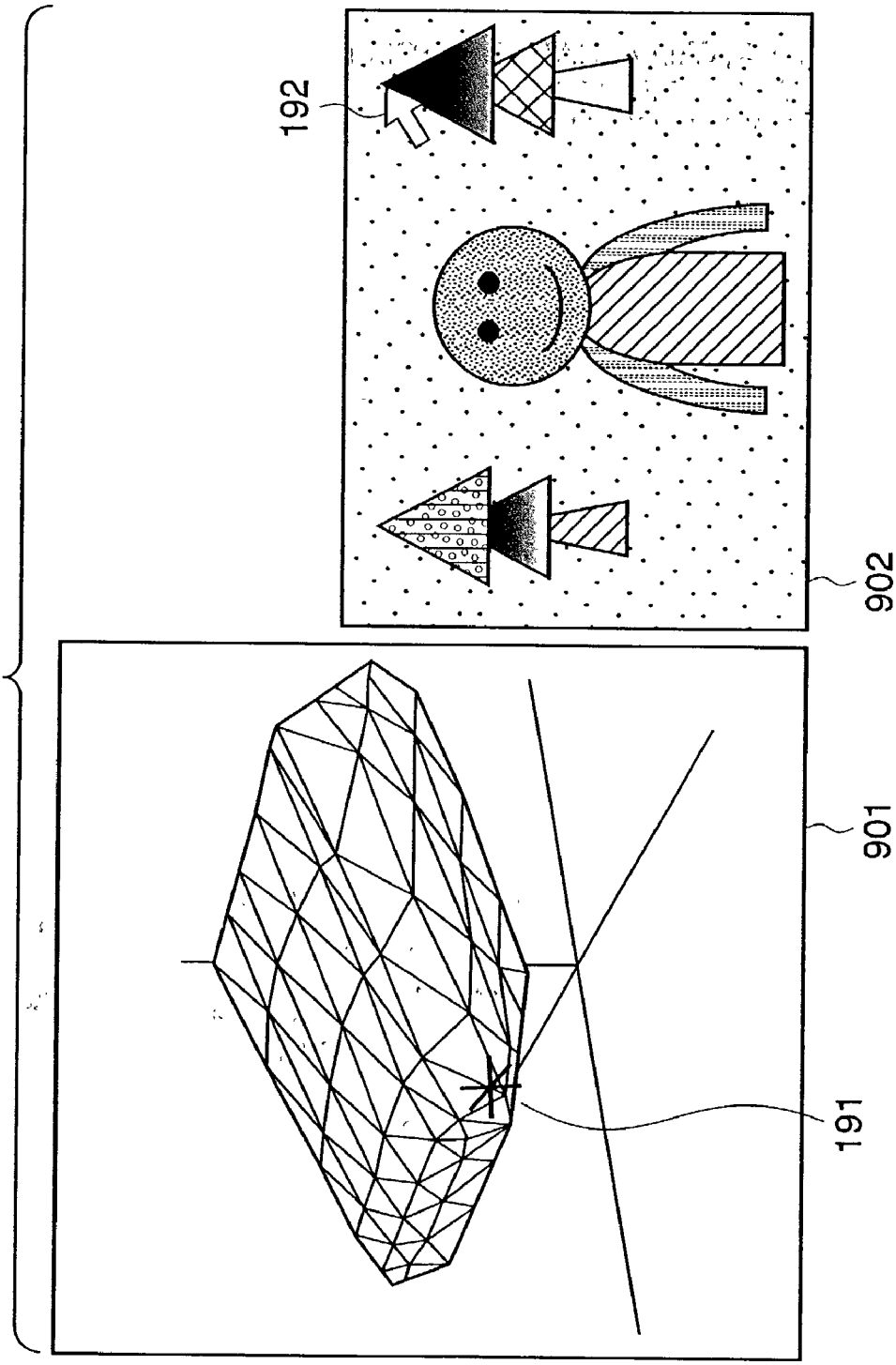
FIG. 19 shows a display example of object data.

FIG. 19 shows a display example on the color monitor 107 upon manipulating an image→color distribution link. When a range display object 191 is not displayed on the surface of an image based on the 3D object data, the user moves/rotates the 3D object and selects the display grid range so that display object 191 appears on the surface of the image based on the 3D object.

Select Flickering Display Range

Selection of the flickering display range in step S613 will be described below.

FIG. 20 shows a user interface used to the flickering display range. When the user selects the RGB range using this user interface, message CHANGE_RGBAREA2 is sent to the color analysis program, which updates a flickering display area (see FIG. 7) of the image object data in accordance with the information of the flickering display range (RGB range), which is attached to the message.

Figure 21:
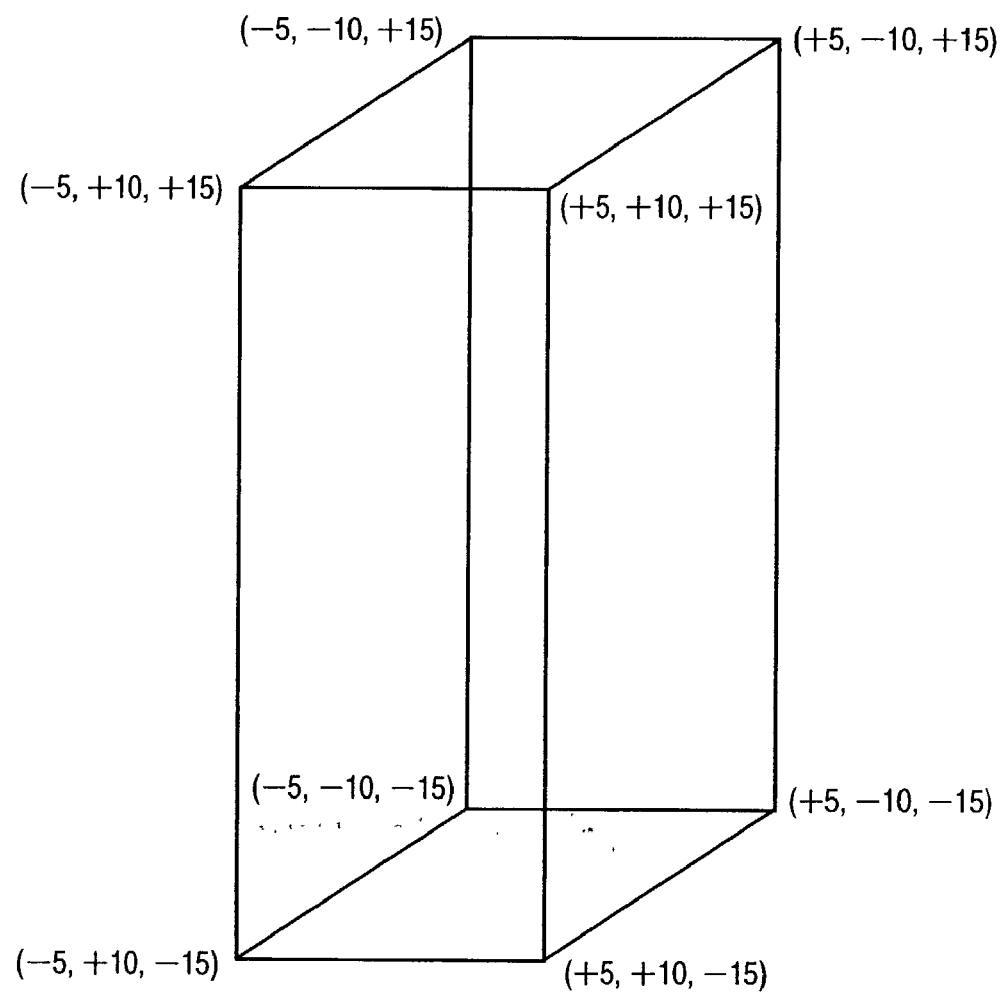
FIG. 21 illustrates the flickering display range in the RGB color space.

FIG. 21 illustrates the flickering display range in the RGB color space when the RGB range is [−5, 5], [−10, 10], and [−15, 15], as shown in FIG. 20.

Color Distribution→Image Link Manipulation

The color distribution→image link manipulation in step S612 will be described below.

When the user selects a point on the 3D object using the mouse or the like, an arrow (denoted by reference numeral 250 in FIG. 24) is displayed at the corresponding position, and message LINK_TO_IMAGE is sent to the color analysis program. The color analysis program updates the image object data on the basis of an L*a*b* value which is to undergo color distribution→image link manipulation and is attached to the message (i.e., the L*a*b* value of the selected point).

Figure 22:
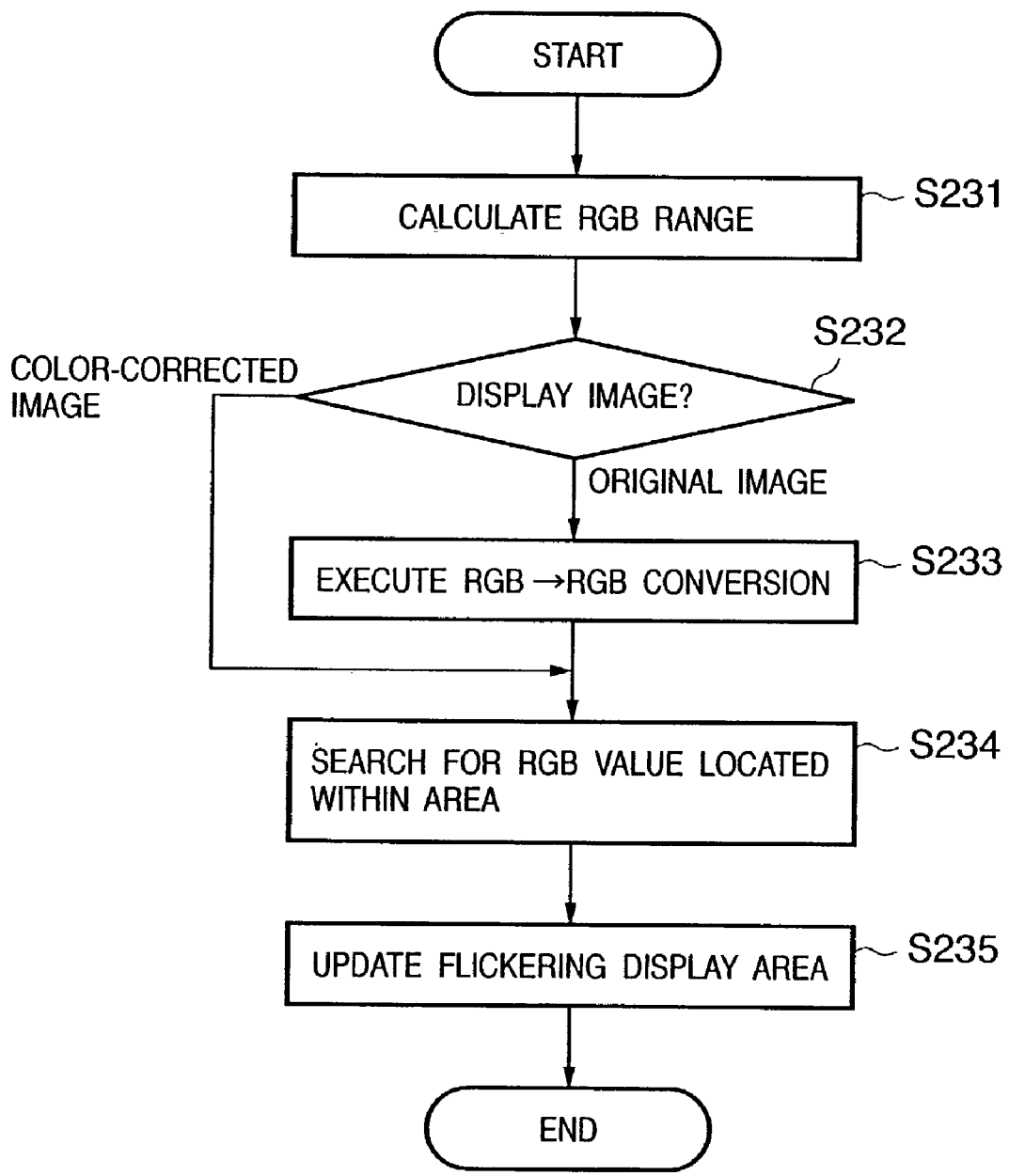
FIG. 22 is a flow chart showing the update sequence of image object data.

FIG. 22 is a flow chart showing the updating sequence of the image object data.

The L*a*b* coordinate value of the point selected by the user is converted into an RGB value (R0, G0, B0) before correction using the color distribution data (S231). On the basis of the RGB value (R0, G0, B0) before correction, and the aforementioned flickering display range [−Rsize, R'size], [−Gsize, G'size], and [−Bsize, B'size], six values Rmin, Rmax, Gmin, Gmax, Bmin, and Bmax are calculated (S232) by:

$$R\text{min}=R-R\text{size}$$

$$R\text{max}=R+R'\text{size}$$

$$G\text{min}=G-G\text{size}$$

$$G\text{max}=G+G'\text{size}$$

$$B\text{min}=B-B\text{size}$$

$$B\text{max}=B+B'\text{size}$$

Based on the display image identification flag of the image object data, it is checked whether the display image is the color-corrected image or original image (S233). If the display image is the original image, RGB values within an area defined by [Rmin, Rmax], [Gmin, Gmax], and [Bmin, Bmax] are converted into color-corrected values using the color correction data.

Figure 23:
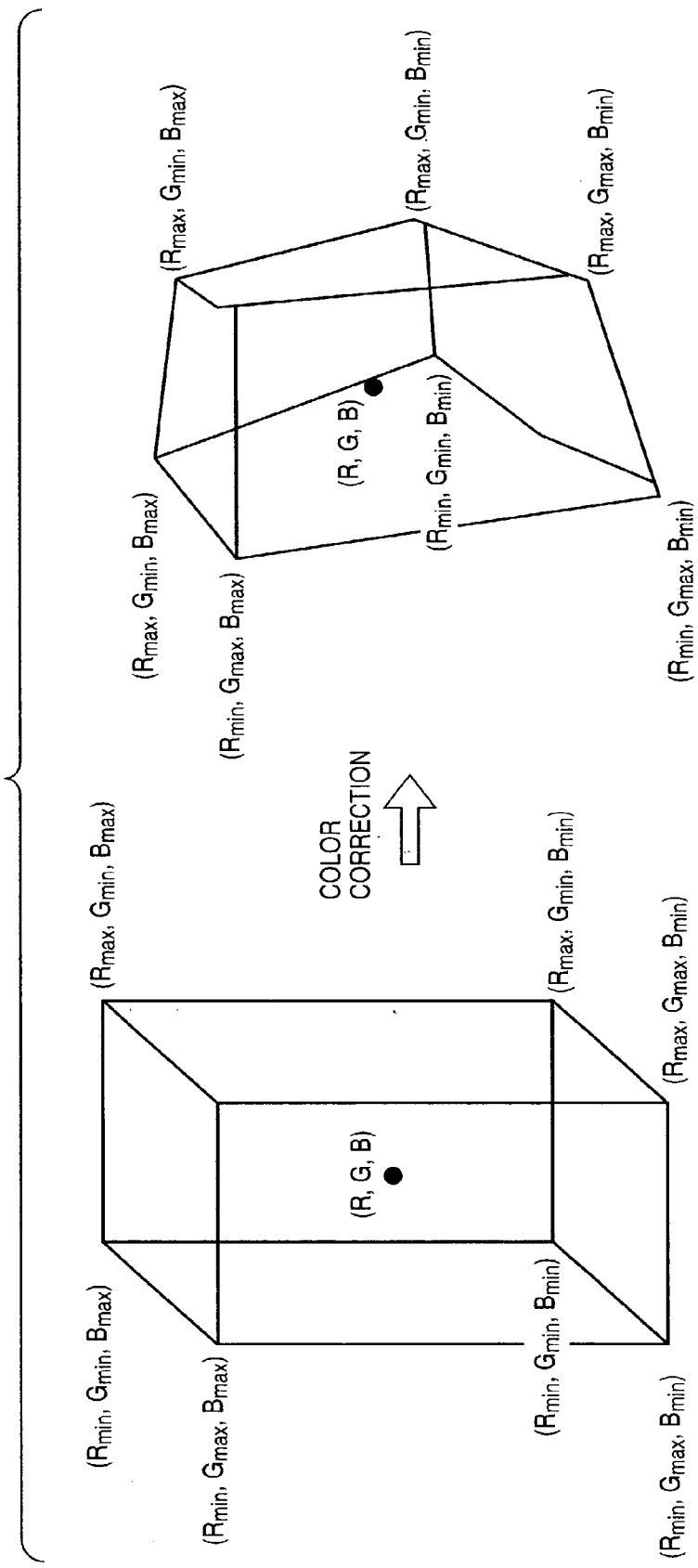
FIG. 23 shows respective areas before and after color correction.

FIG. 23 shows areas before (left side) and after (right side) color correction.

The image data is searched for RGB values located within the area, and the flickering display area of the image object data is updated to flicker the RGB values located within the area (S235).

Figure 24:
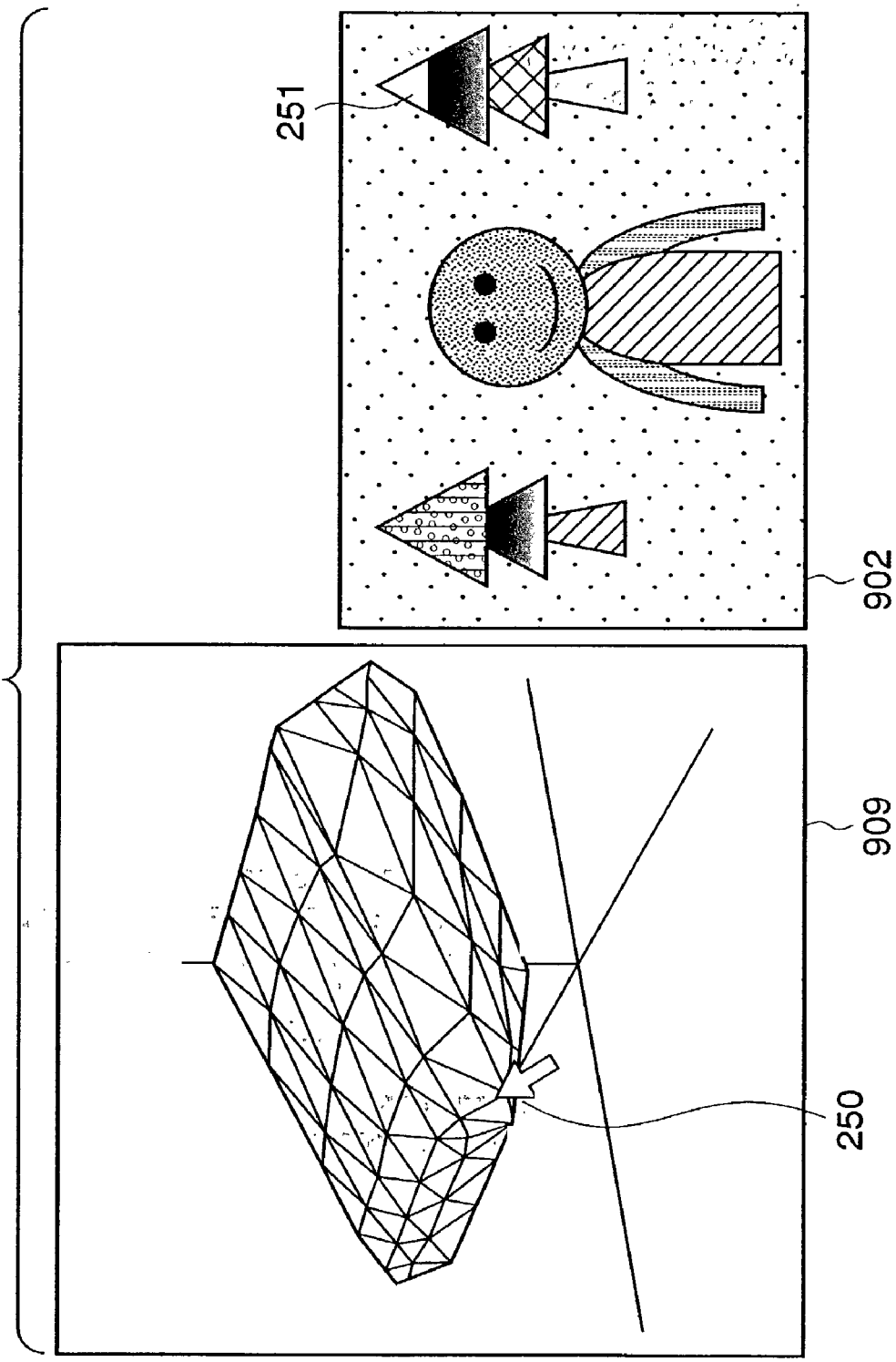
FIG. 24 shows a display example of object data.

FIG. 24 shows a display example on the color monitor 107 upon making the color distribution→image link manipulation. For example, an area denoted by reference numeral 251 flickers.

With the above arrangement, since the color distribution, and image that has undergone the color correction process are pseudo-3D displayed in correspondence with each other, the user can qualitatively/intuitively compare the color correction results of a gamut mapping process, and can quickly find out points to be improved of the gamut mapping process.

In the first embodiment, both the original image data and color-corrected image data are held as the image object data. Alternatively, the original image data alone may be held as the image object data, and an original image→color-corrected data color conversion process may be executed based on the color correction data in accordance with user's instruction.

In the first embodiment, a corresponding area flickers based on the L*a*b* coordinate value on the 3D object selected by the user. Alternatively, RGB values of the corresponding area may be highlighted.

In the first embodiment, the user selects one point on the 3D object, and the image→color distribution link is made based on the L*a*b* value of the selected point. Alternatively, a given area on the 3D object may be selected, and the image→color distribution link manipulation may be executed based on a plurality of L*a*b* values within the area. In this case, the average value of the plurality of L*a*b* values may be used, or L*a*b* values which are weighted and have undergone a convolution operation may be used.

In the first embodiment, a range display object, which indicates a corresponding point in the image→color distribution link manipulation, has a 3D cross-shape, but may have a polygonal shape, as shown in FIG. 25.

SECOND EMBODIMENT

A color information processing apparatus according to the second embodiment of the present invention will be described below. Note that the same reference numerals in the second embodiment denote the same parts as in the first embodiment, and a detailed description thereof will be omitted.

The technique for pseudo-3D displaying a plurality of pieces of color distribution information at the same time, which has been explained in the first embodiment, allows the user to qualitatively/intuitively compare the plurality of pieces of color distribution information, and to quickly find/determine the quality/difference of gamut mapping. The pseudo-3D display of the plurality of color distribution information is very effective for comprehensively or roughly comparing color distribution states, but is not so effective for comparing local or detailed color distribution states. Hence, the second embodiment provides pseudo-3D display of the comparison result of local or detailed color distribution states.

[Color Distribution Data]

Color distribution data to be stored in a color distribution information file in the second embodiment will be explained below. The color distribution data describes correspondence between color coordinate data of grid points in the RGB color space, and coordinate values that the color distribution data take on the L*a*b* color space.

Figure 26:
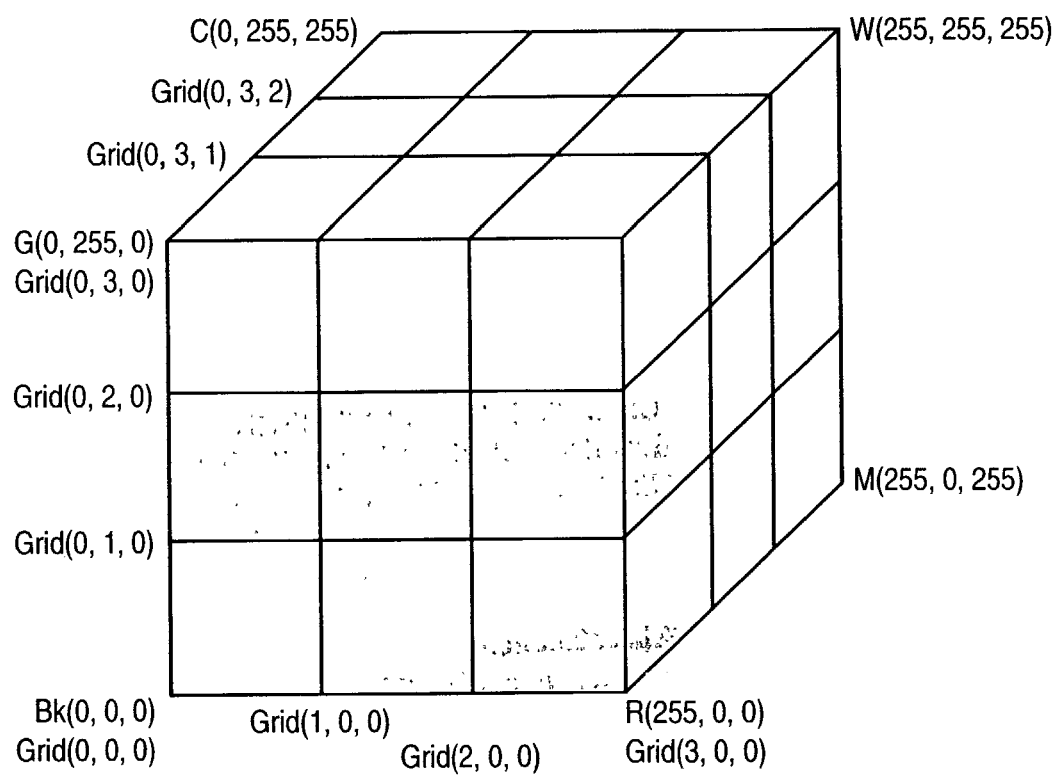
FIG. 26 illustrates grid points in the RGB color space.

FIG. 26 illustrates grid points in the RGB color space. The number of grid points on each of the R, G, and B axes is "4". Note that FIG. 26 shows RGB values of sample points corresponding to black (Bk), green (G), red (R), cyan (C), magenta (M), and white (W), and grid coordinate values of the sample points using grid numbers.

FIG. 27 is a view for explaining a data layout example (format) of the color distribution information file. Near the head of this file, steps of R, G, and B values are described. Following this description, data (grid data) of sample points nested in the order of R, G, and B, and corresponding L*a*b* coordinate values after color correction are described. FIG. 27 shows the file format when the number of grid points on each of the R, G, and B axes is "9".

The color distribution information file is generated by generating color patches corresponding to grid points (color coordinate values) of the grid points in the RGB color space, displaying them on the monitor or outputting them via the printer, and measuring the patch images using the calorimeter 111 on the computer system. Alternatively, such generation process may be implemented by calculations in consideration of perceptual adaptation specified by CIE CAM97s or by Gamut Mapping.

Also, the color distribution information file may be input to the color analysis program via removable media such as a floppy disk, magnetooptical recording media, and the like.

[Color Analysis Program]

Figure 28:
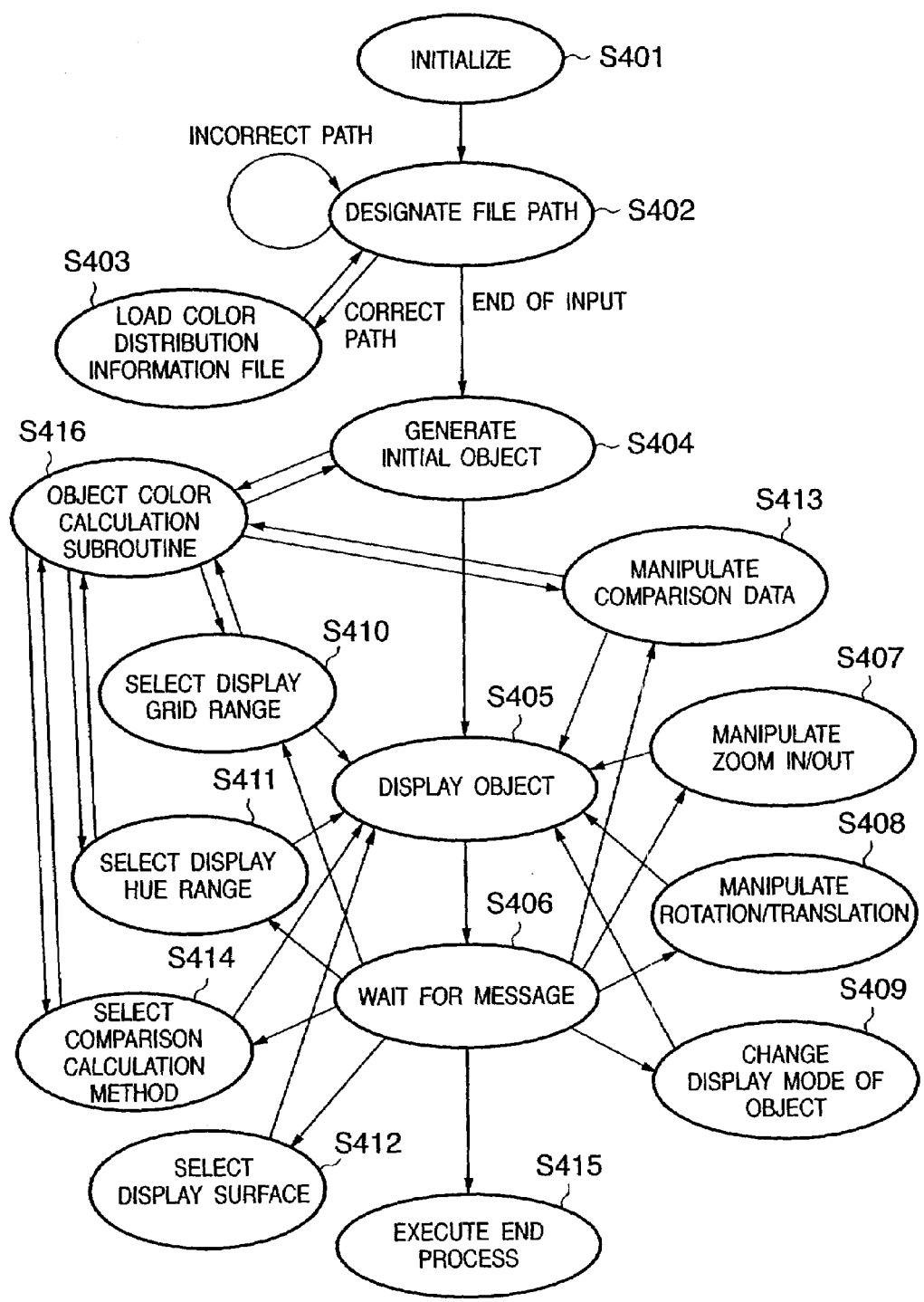
FIG. 28 is a status transition chart showing the process of a color analysis program in the second embodiment.

FIG. 28 is a status transition chart for explaining the process of the color analysis program in the second embodiment.

When the color analysis program is launched, it executes initialization (e.g., assures a work heap memory and the like) (S401). Subsequently, the program waits for path information of a color distribution information file input by the user (S402). If the input path information is incorrect, step S402 is repeated.

If the input path information is correct, the program loads the color distribution information file on the basis of the path information, and stores it in a heap memory (S403).

If the user inputs an end instruction of the file input, the flow advances to step S404. Note that at least two pieces of path information of files must be input.

In step S404, the program then generates initial 3D object data on the basis of color distribution data initially designated in step S402. The program calls a subroutine of step S416 to calculate object colors. In comparison operations upon calculation of object colors, the color distribution data of first and second designations are used.

Furthermore, in step S404 the program initializes geometry information and display mode information upon 3D display. Note that generation and display of the 3D object data in step S404 will be described later. Also, details of step S416 will be explained later.

The 3D object data is appropriately displayed on the monitor on the basis of the display mode information and geometry information (S405). The program then waits for a message from the user (S406). By interpreting various input messages, the control advances to an appropriate processing step. Processes corresponding to messages received in step S406 will be explained below. Note that a message list is as follows.

Message List:
{ZOOM_INOUT, MOVE, RASTERIZE_MODE, CHANGE_GRIDAREA, CHANGE_SCOPE, CHANGE_HUEAREA, CHANGE_DISPLAYSURFACE, SELECT_DATA, DIFFERENCE_MODE, PROCESS_END}

ZOOM_INOUT

Upon detection of message ZOOM_INOUT in step S406, a ZOOM IN/OUT amount attached to the message is extracted, and the geometry information is updated based on the extracted ZOOM IN/OUT amount (S407). The flow then returns to step S405 to update image display based on the 3D object data on the basis of the updated geometry information.

MOVE

Upon detection of message MOVE in step S406, a viewpoint translation amount/viewpoint rotation amount attached to the message is extracted, and the geometry information is updated based on the extracted viewpoint translation amount/viewpoint rotation amount (S408). The flow then returns to step S405 to update image display based on the 3D object data on the basis of the updated geometry information.

RASTERIZE_MODE

Upon detection of message RASTERIZE_MODE in step S406, selection information of a display mode attached to the message is extracted, and the display mode is updated on the basis of the extracted selection information of the display mode (S409). The flow then returns to step S405 to update image display based on the 3D object data on the basis of the updated display mode information.

CHANGE_GRIDAREA

Upon detection of message CHANGE_GRIDAREA in step S406, a displaying grid range information attached to the message is extracted, and the 3D object data is updated based on the extracted information (S410). After the object color calculation subroutine (S416) is called to calculate object colors, the flow returns to step S405 to update image display based on the updated 3D object data.

CHANGE_SCOPE

Upon detection of message CHANGE_SCOPE in step S406, information of a displaying internal layer attached to the message is extracted, and is converted into a display grid range, so as to update the 3D object data on the basis of that the display grid range (S410). After the object color calculation subroutine (S416) is called to calculate object colors, the flow returns to step S405 to update image display based on the updated 3D object data.

CHANGE_HUEAREA

Upon detection of message CHANGE_HUEAREA in step S406, information of a display hue range attached to the message is extracted, and the 3D object data is updated based on the extracted information of the display hue range (S411). After the object color calculation subroutine (S416) is called to calculate object colors, the flow returns to step S405 to update image display based on the updated 3D object data.

CHANGE_DISPLAYSURFACE

Upon detection of message CHANGE_DISPLAYSURFACE in step S406, selection information of a display surface attached to the message is extracted, and the 3D object data is updated on the basis of the extracted information of the display surface (S412). The flow then returns to step S405 to update image display based on the updated 3D object data.

SELECT_DATA

Upon detection of message SELECT_DATA in step S406, information which indicates selected data and is attached to the message is extracted, and 3D object data is generated/updated on the basis of color distribution data designated as a comparison source (S413). Also, the object color calculation subroutine (S416) is called to calculate object colors. Note that the comparison operations upon calculation of object colors use the color distribution data designated as the comparison source, and that designated as the comparison destination. Upon completion of these processes, the flow returns to step S405 to update image display based on the updated 3D object data.

DIFFERENCE_MODE

Upon detection of message DIFFERENCE_MODE in step S406, selection information of a comparison calculation method attached to the message is extracted, and is stored in a memory (S414). After the object color calculation subroutine (S416) is called to calculate object colors, the flow returns to step S405 to update image display based on the updated 3D object data.

PROCESS_END

Upon detection of message PROCESS_END in step S406, an end process (e.g., to release the heap memory and the like) is executed (S415), thus ending the color analysis program.

Generation of Initial Object Data

Upon generating the 3D object data in step S404, two different combinations of triangles are generated for each of minimum rectangles formed by grid points on the maximum grid area surface on the RGB color space, as in the first embodiment.

The grid point coordinate values of vertices of these triangles are then converted into corresponding L*a*b* coordinate values using the color distribution data, and 3D object data is formed based on combinations of triangles after conversion. In this case, the combinations of triangles are selected to maximize the volume of the 3D object data. That is, if there are N minimum rectangles formed by grid points on the RGB color space, the 3D object data is formed by 2N triangles selected from $2^N$ different combinations.

Each surface data (to be referred to as "polygon data" hereinafter) that forms the 3D object data obtained by the aforementioned process is held by a data structure shown in FIG. 29. FIG. 30 shows an example of the 3D object data generated in step S404.

In step S404, grid point information on the RGB color space, which corresponds to the polygon data that form the 3D object data, is stored independently of the 3D object data. This grid point information is used to calculate the color of an object surface in step S416.

Figure 31:
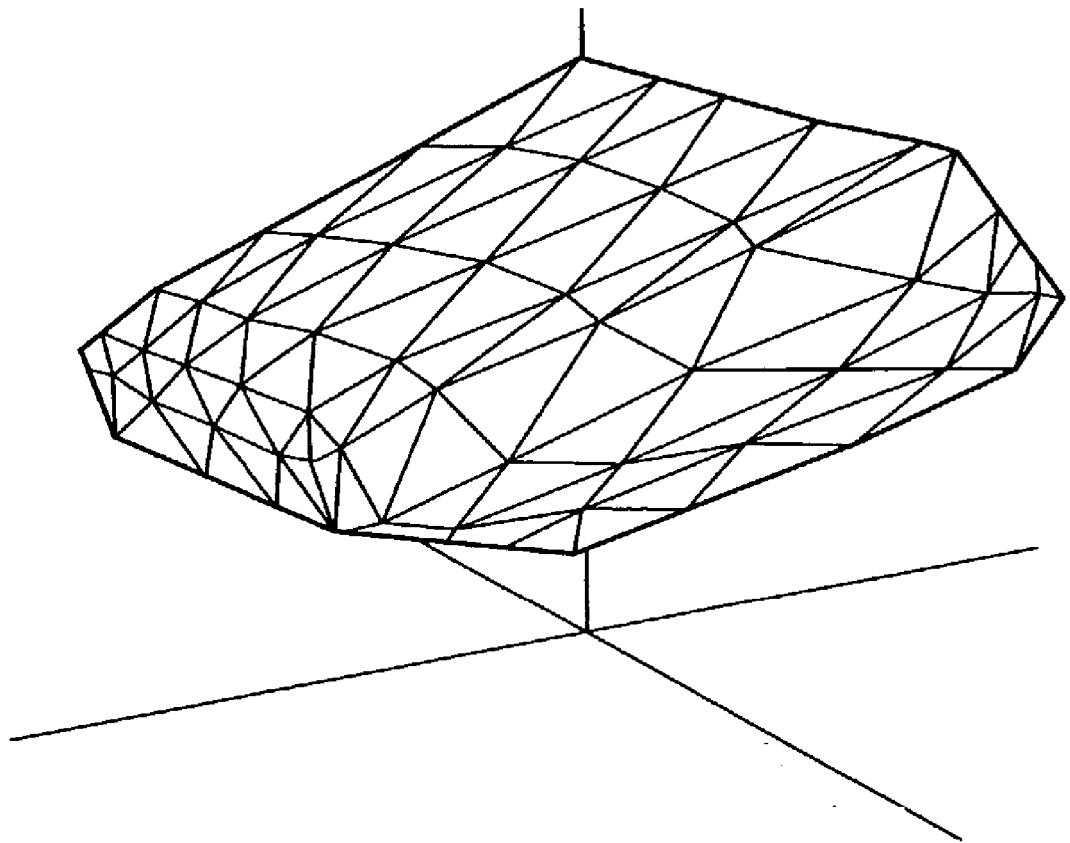
FIG. 31 shows a display example of 3D object data.

FIG. 31 shows a display example on the color monitor 107 in the second embodiment.

Select Display Mode

Selection and display of a display mode in step S409 will be explained below. As the display mode, three different modes, i.e., wire frame display, solid display 1, and solid display 2, are available.

Solid display 1 is a display mode based on triangle patch data of the display surface of the 3D object data, and the solid display color is based on the calculation result in step S416. Solid display 2 is a curved surface display mode based on the 3D object data, and the solid surface color is based on data obtained by smoothing the calculation result in step S416.

FIG. 32 shows a user interface used to select the display mode. When the user selects the display mode, message RASTERIZE_MODE is sent to the color analysis program, which changes the display mode in accordance with the selection information attached to that message, as described above.

Figure 33:
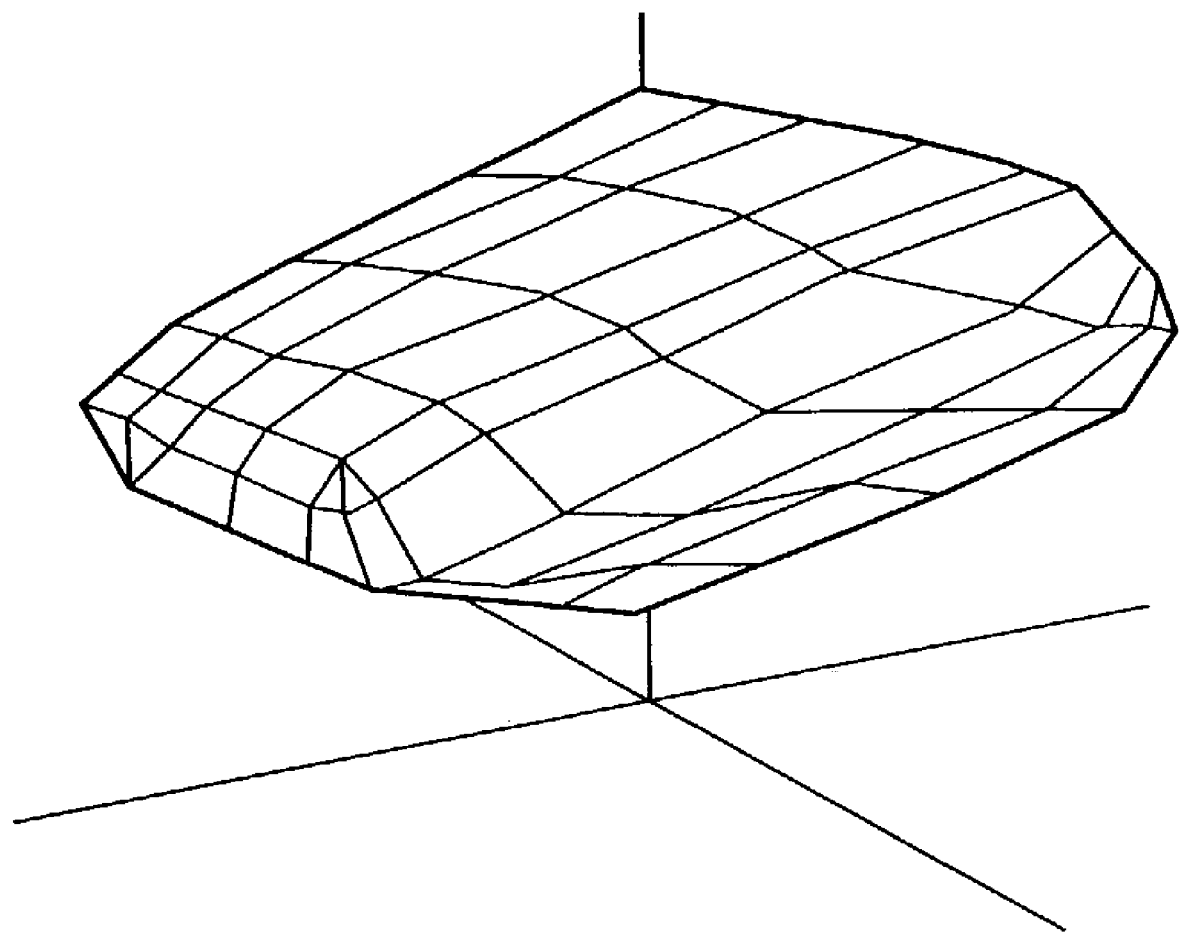
FIG. 33 shows a display example of 3D object data.
Figure 34:
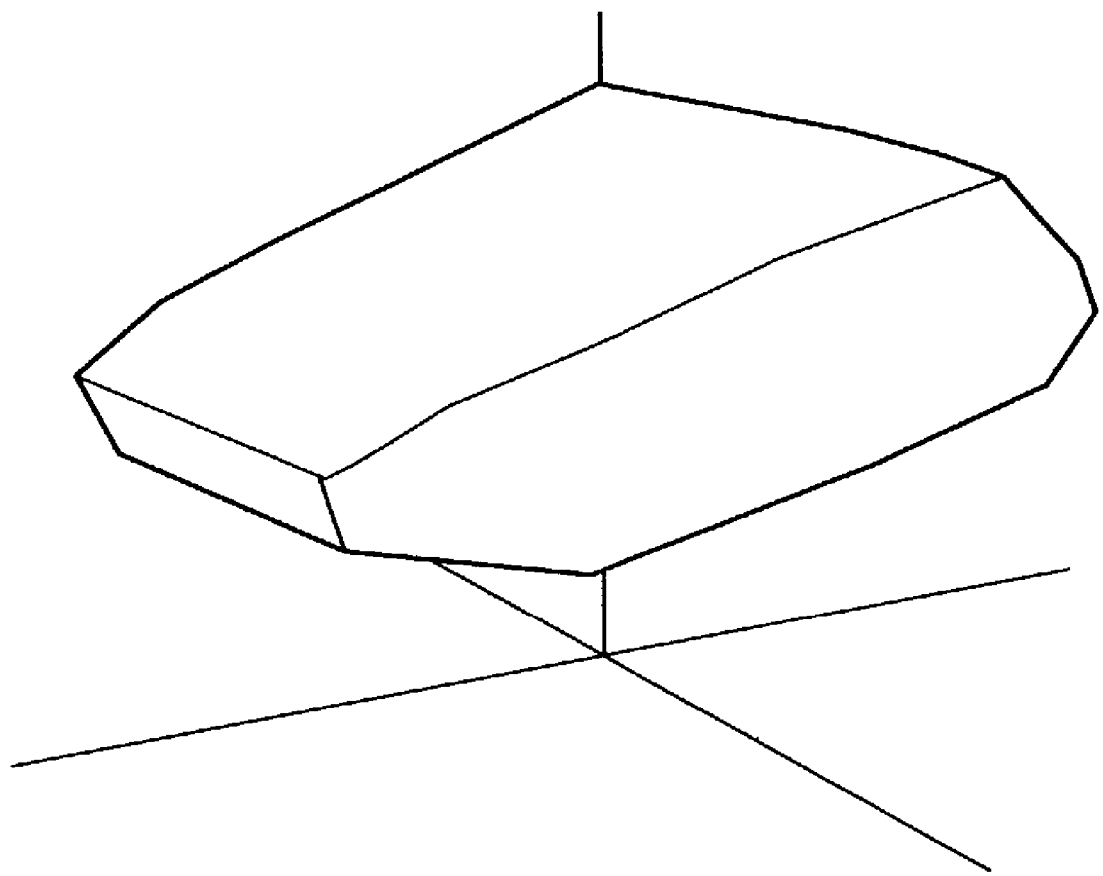
FIG. 34 shows a display example of 3D object data.

FIG. 33 illustrates monitor display upon selection of wire frame display. A hidden surface should also be displayed, but it is omitted in FIG. 33 for the sake of simplicity. When solid display 1 is selected, an object is displayed in the mode shown in FIG. 31. FIG. 34 illustrates monitor display upon selection of solid display 2.

Select Display Grid Range

Selection and display of a display grid range in step S410 are the same as those in the first embodiment, and a description thereof will be omitted.

Select Display Internal Layer

Selection and display of a display internal layer in step S410 will be described below. This operation sets the display range of RGB grids by setting only one value, and facilitates internal analysis.

Figure 35:
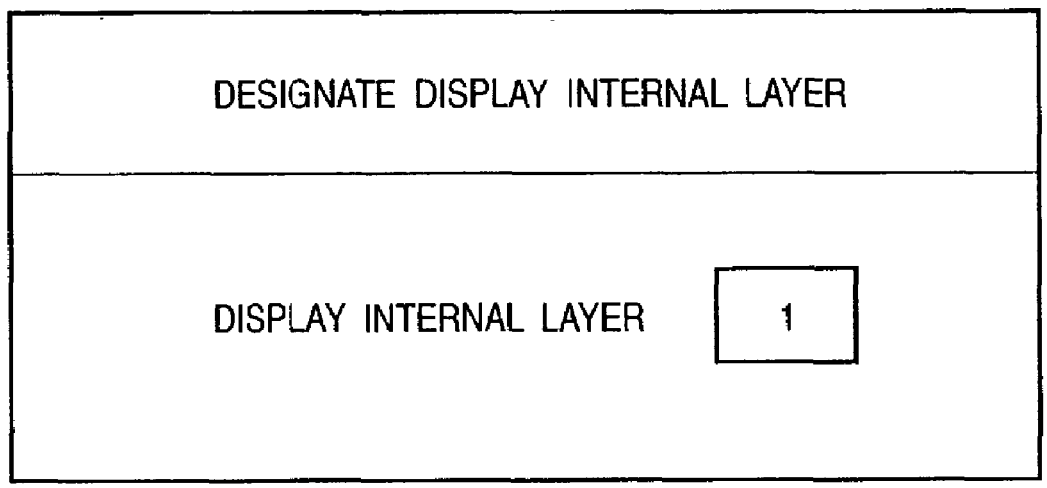
FIG. 35 shows a user interface used to designate a display internal layer.

FIG. 35 shows a user interface used to select a display internal layer. The user selects a square area to be displayed from the RGB color space by selecting the number of display internal layers of the square area. When the user selects the number of display internal layers, message CHANGE_SCOPE is sent to the color analysis program, which converts the number of display internal layers as information indicating the display range attached to the message into an RGB grid range as follows.

Let sc be the number of display internal layers, Nr be the number of grid points on the R axis; Ng be the number of grid points on the G axis, and Nb be the number of grid points on the B axis. Then, the RGB grid range is expressed by:

$$[Rsc, RNr-sc][Gsc, GNg-sc][Bsc, BNb-sc]$$

where Ri is the R value that the i-th grid point assumes on the R axis,

Gi is the G value that the i-th grid point assumes on the G axis, and

Bi is the B value that the i-th grid point assumes on the B axis.

If the number sc of display internal layers is zero, the RGB grid range becomes the grid surface as in the aforementioned initial generation. After that, the 3D object data is updated in accordance with information indicating the RGB grid range. Note that details of the updating process are the same as those described above, and a description thereof will be omitted. Also, in step S410 the grid point information on the RGB color space, which corresponds to polygon data that form the 3D object data, is stored independently of the 3D object data.

Figure 36:
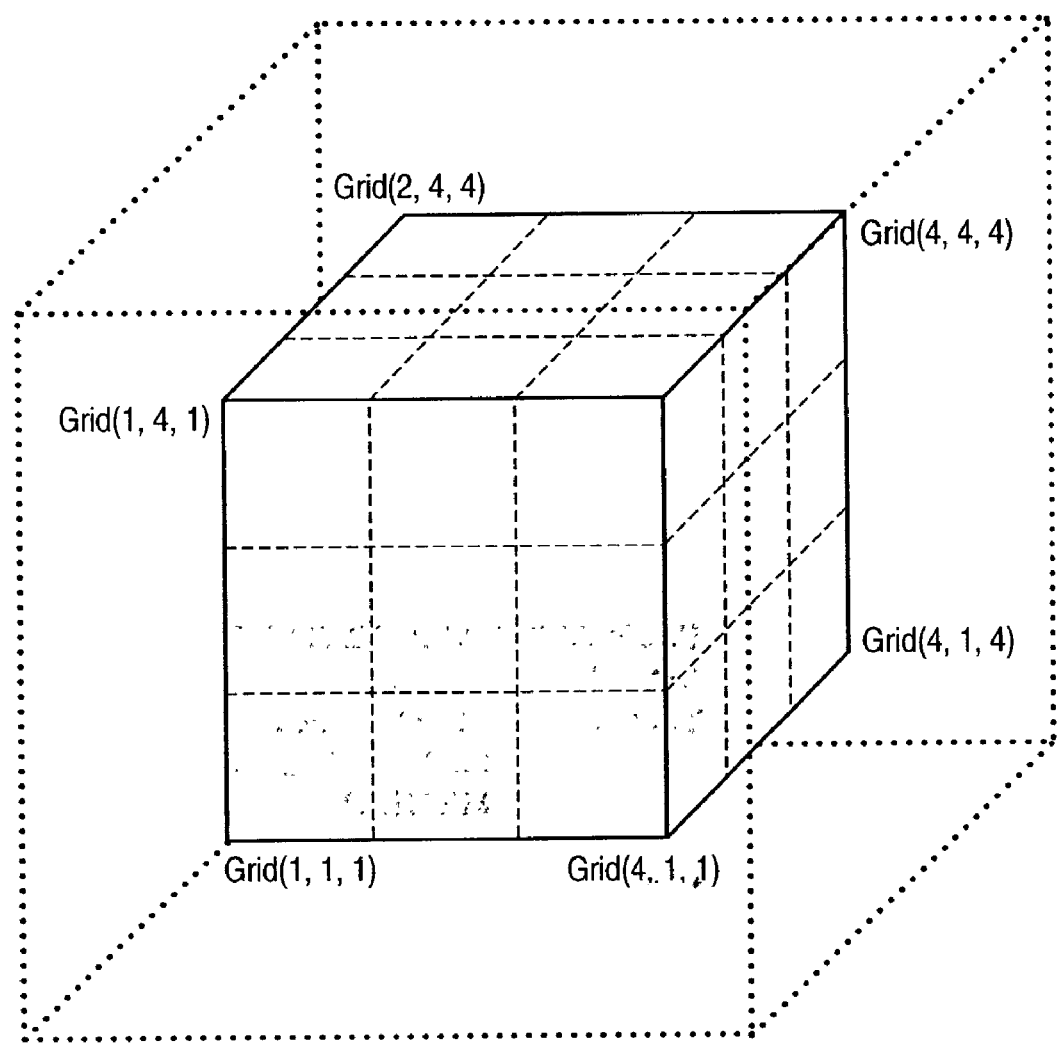
FIG. 36 shows the grid range in the RGB color space.
Figure 37:
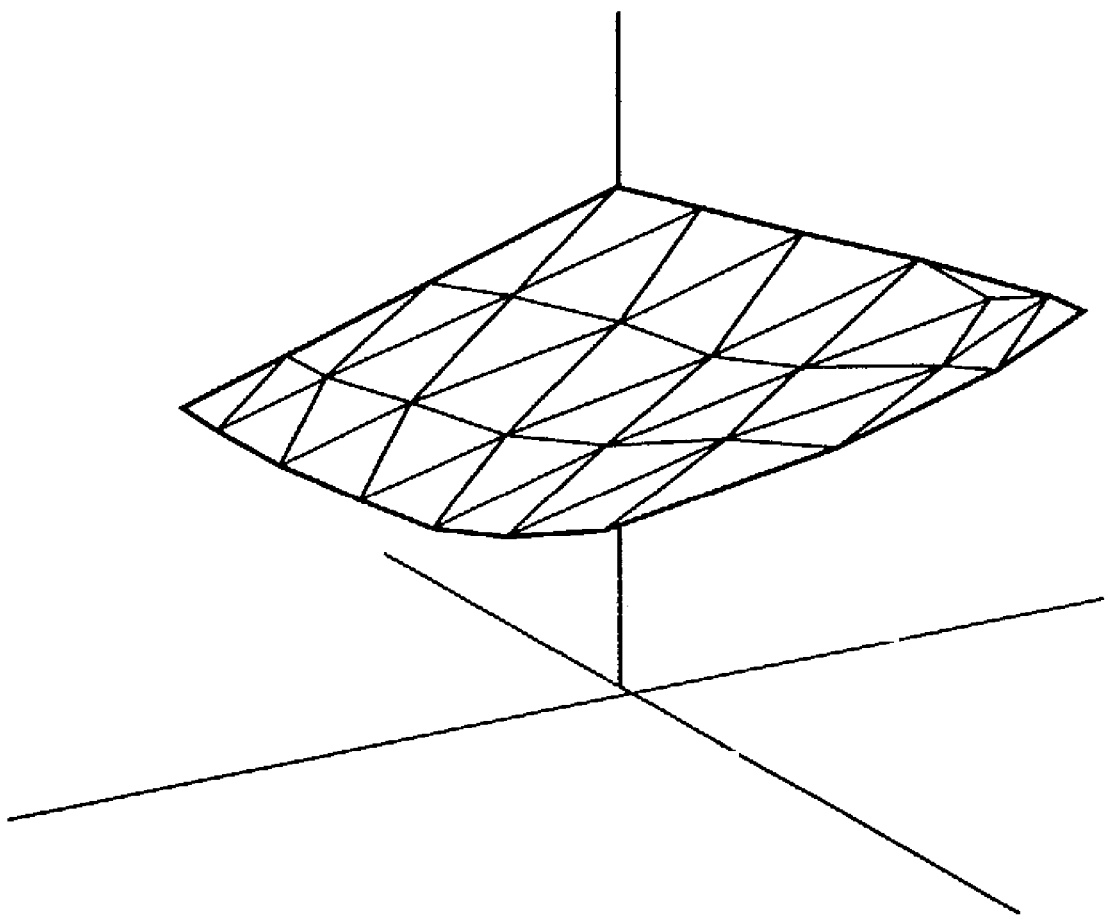
FIG. 37 shows a display example of 3D object data.

The grid range and monitor display when the number of grid points on each of the R, G, and B axes in the color distribution information is "6" and the user selects "1" as the display range internal layer will be explained below. FIG. 36 shows the grid range in the RGB color space. In FIG. 36, a range indicated by the dotted line indicates a maximum grid area, and a range indicated by the solid line indicates a square area. Intersections between the dotted and solid lines indicate grid points. FIG. 37 shows a display example on the color monitor 107, which corresponds to FIG. 36.

Select Display Hue Range

Selection and display of a display hue range in step S411 will be described below. Note that this process is not executed unless the numbers of grid points on the R, G, and B axes are equal, and the steps of grid points are equal.

FIG. 38 shows a user interface used to select a display hue range. The user selects a hue range to be displayed from the RGB color space by selecting at least one of six display hue ranges shown in FIG. 38. When the user selects the display hue range, message CHANGE_HUEAREA is sent to the color analysis program, which updates the 3D object data in accordance with the hue selection information attached to the message as follows.

Figure 39:
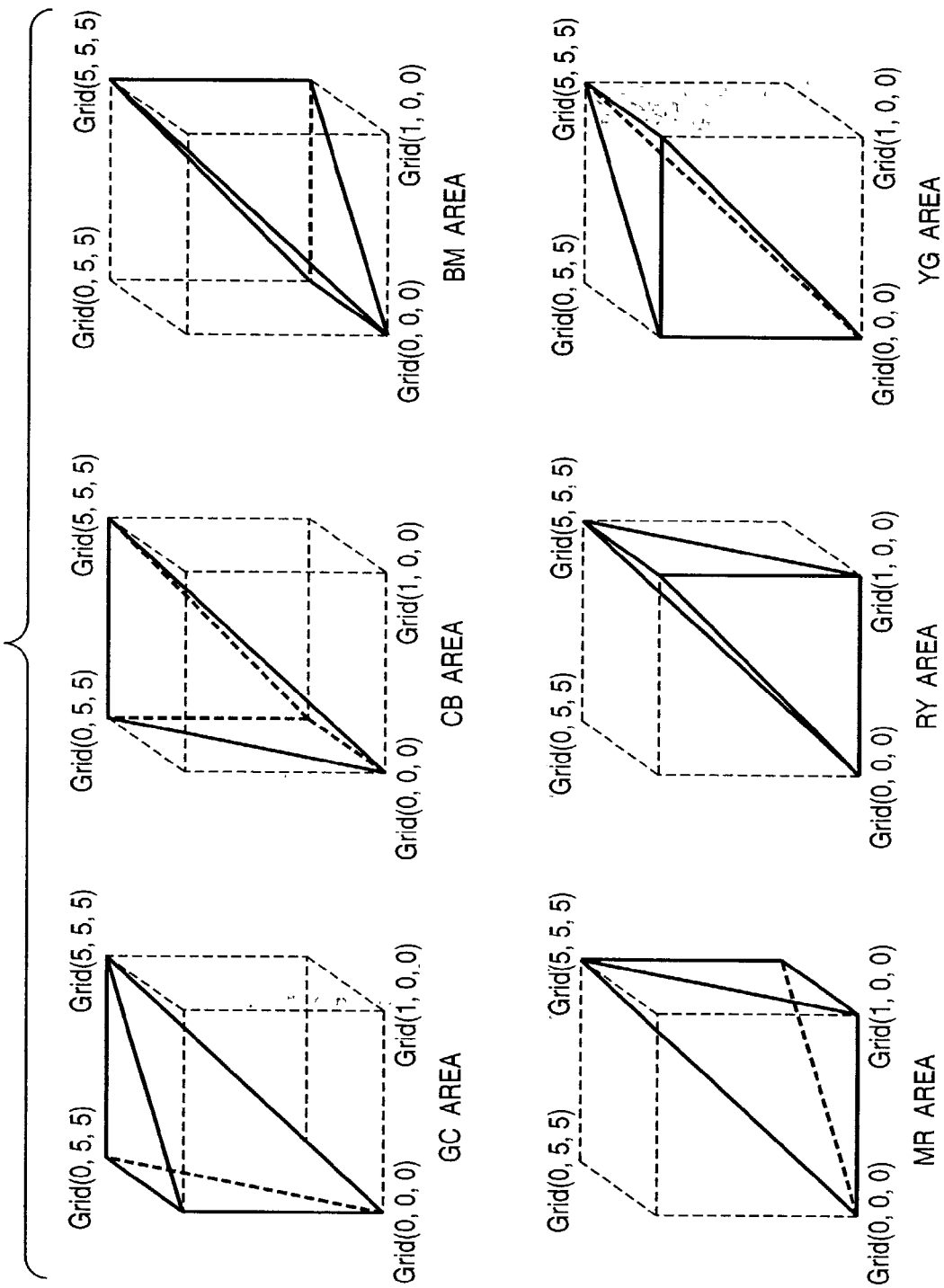
FIG. 39 shows tetrahedral areas selected in accordance with hue selection information.

Initially, one of six tetrahedral areas shown in FIG. 39 is selected in accordance with the hue selection information. Two different combinations of triangles are generated for each of minimum rectangles formed by grid points on the surfaces of the selected tetrahedral area. A minimum triangle is generated for a surface area for which a rectangle cannot be generated.

Subsequently, the grid point coordinate values of vertices of these triangles are then converted into corresponding L*a*b* coordinate values using the color distribution data, and 3D object data is formed based on combinations of triangles after conversion. In this case, the combinations of triangles are selected to maximize the volume of the 3D object data as in selection of the display grid range. Also, in step S411 the grid point information on the RGB color space, which corresponds to polygon data that form the 3D object data, is stored independently of the 3D object data.

Figure 40:
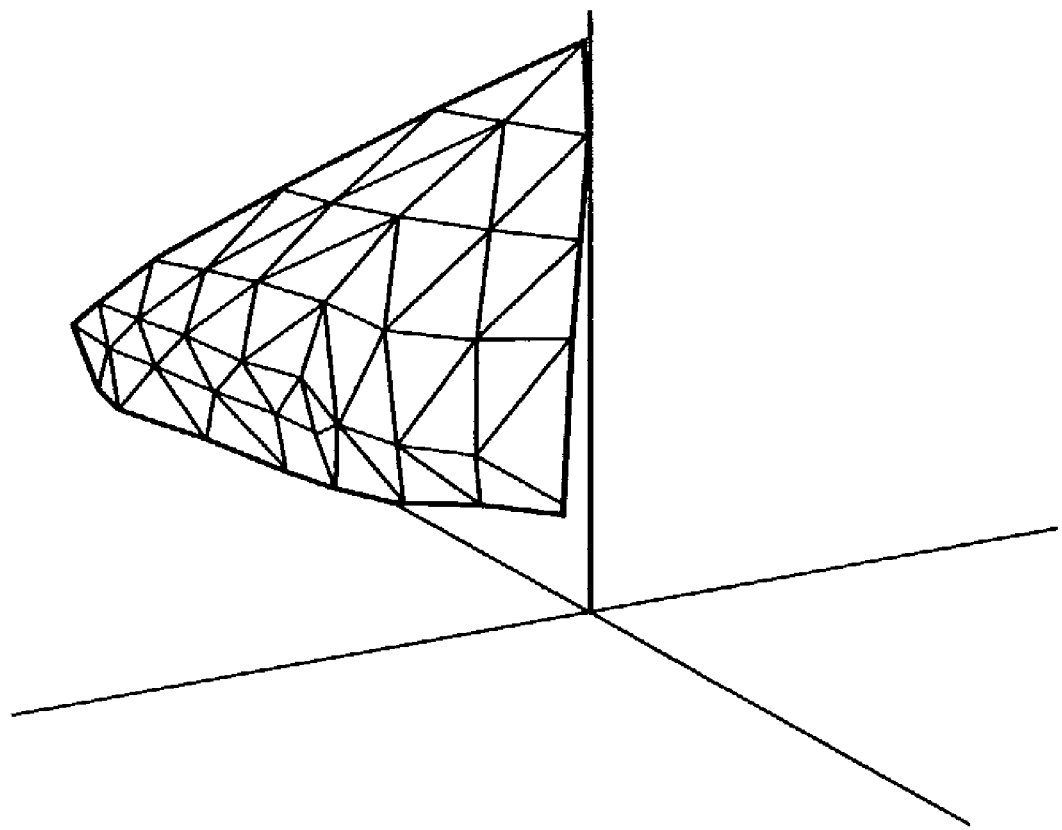
FIG. 40 shows a display example of 3D object data.
Figure 41:
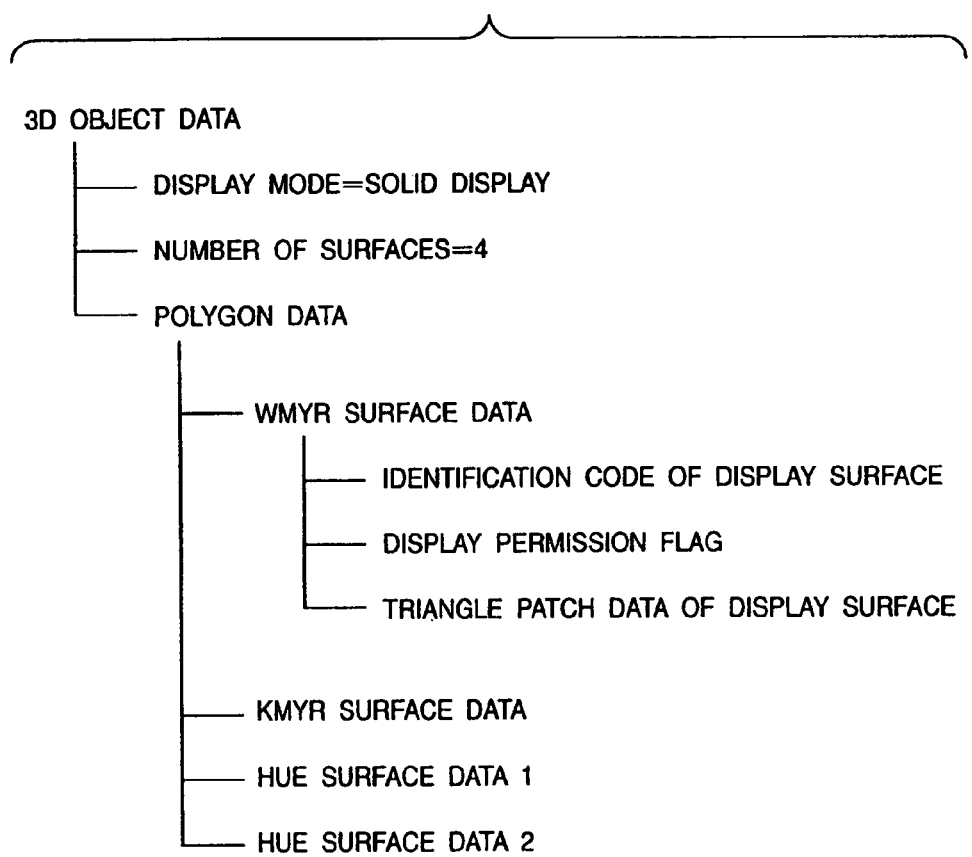
FIG. 41 shows an example of the internal structure of 3D object data.

FIG. 40 shows a display example on the color monitor when an MR area is selected as the display hue range. FIG. 41 shows the structure of the 3D object data formed in step S411.

Select Display Surface

Selection and display of a display surface in step S412 will be described below. FIG. 42 shows a user interface used to select a display surface. The enable/disable states of check boxes shown in FIG. 42 are switched in correspondence with the 3D object data, which is currently displayed, and if a given check box is disabled, it is grayed out like check boxes of hue surface 1 and hue surface 2 shown in FIG. 42.

The user selects at least one of the enabled display surfaces. When the user selects the display surface, message CHANGE_DISPLAYSURFACE is sent to the color analysis program, which updates the 3D object data based on display surface selection information attached to the message as follows.

Figure 29:
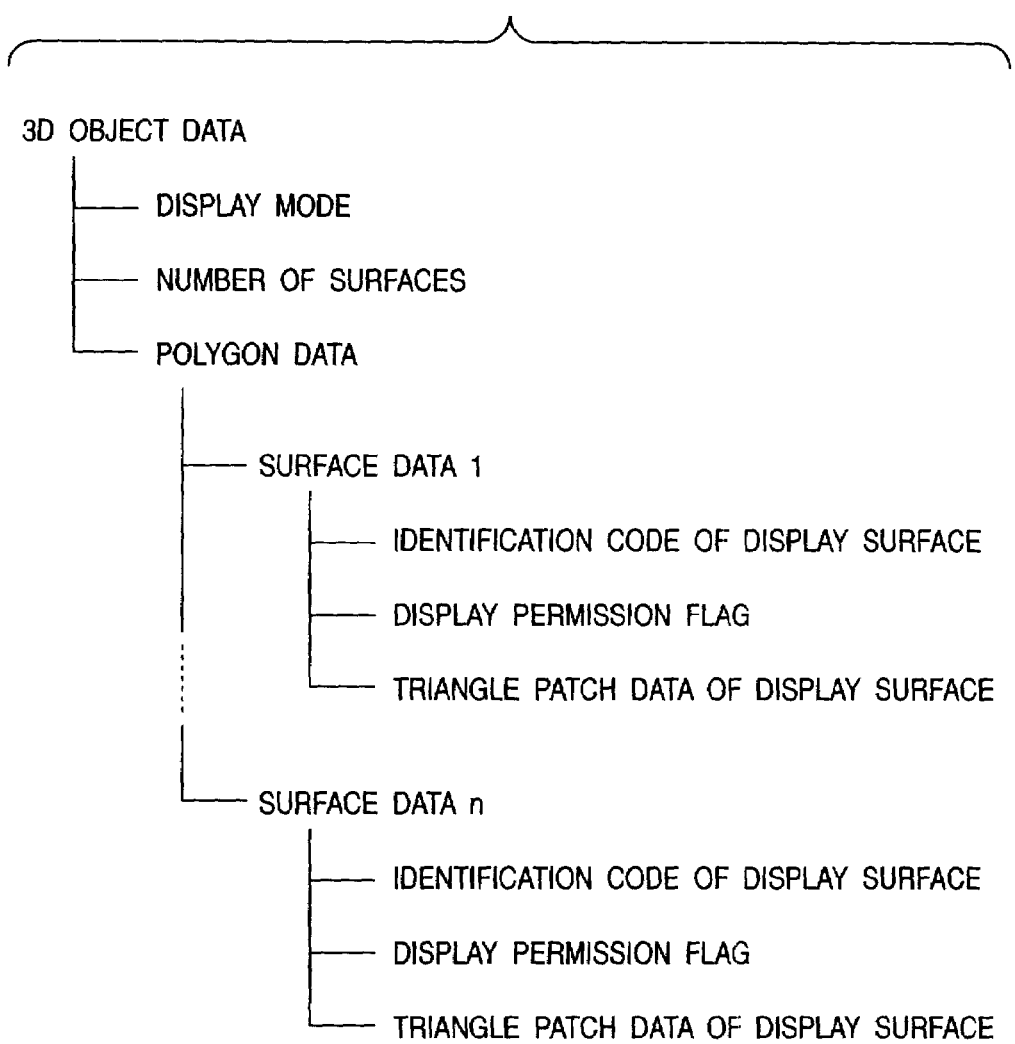
FIG. 29 shows the internal structure of 3D object data.
Figure 30:
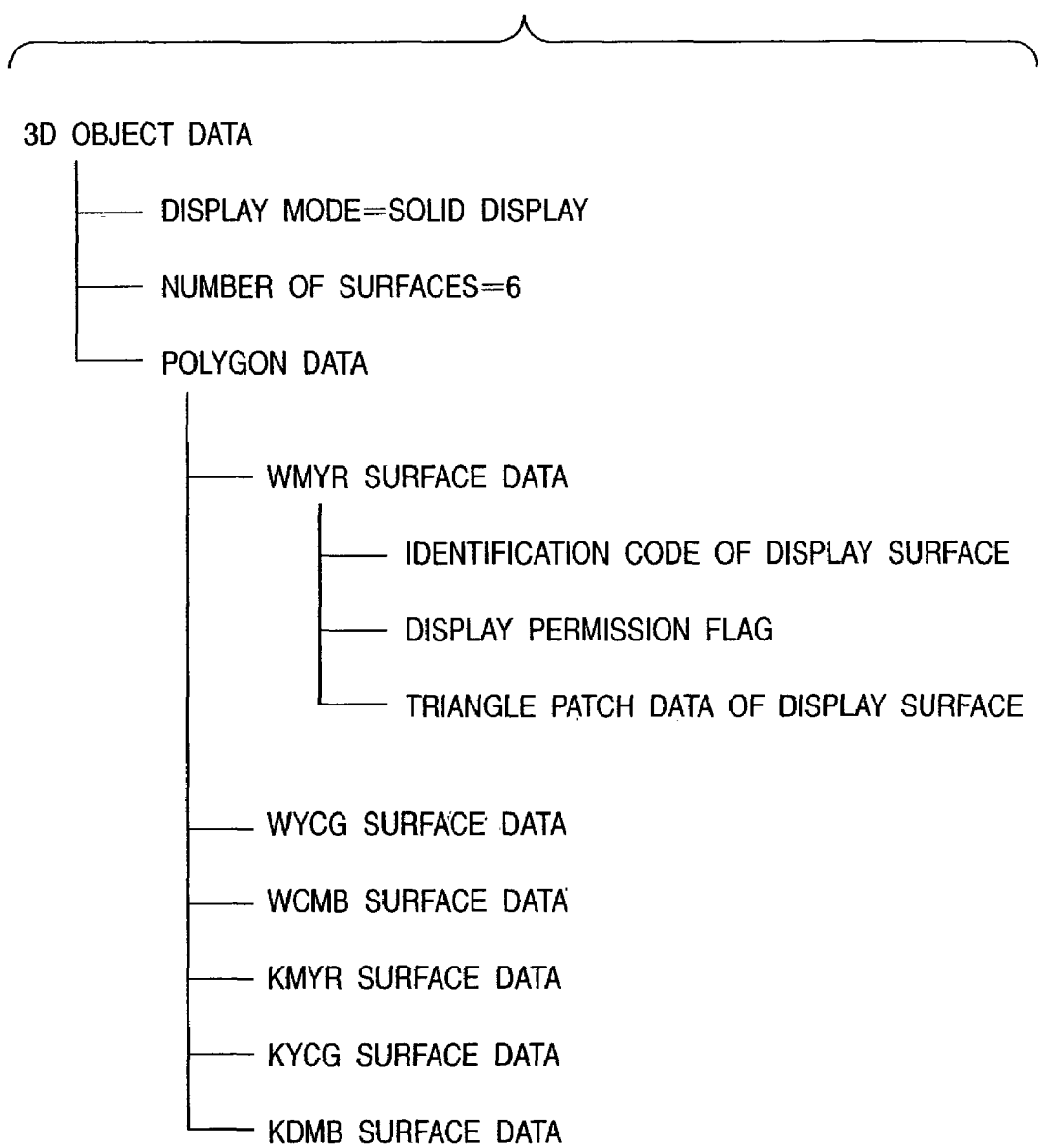
FIG. 30 shows an example of the internal structure of 3D object data.
Figure 43:
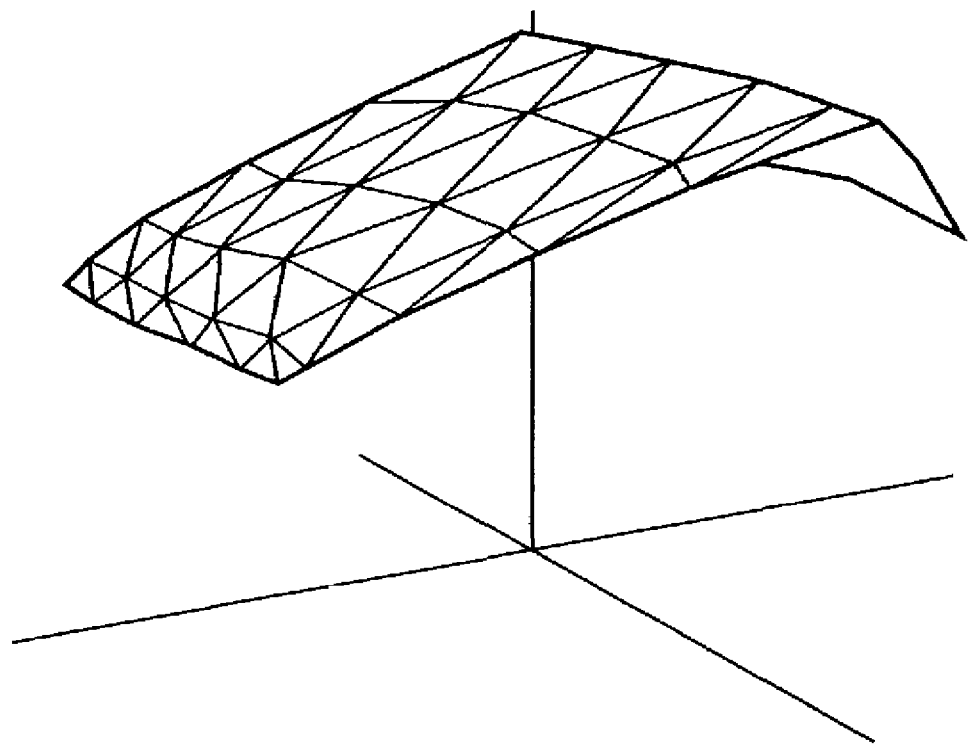
FIG. 43 shows a display example of 3D object data.

The internal structure of the 3D object data is as shown in FIG. 29. The structure of the 3D object data generated based on the selected RGB grid range is as shown in FIG. 30, and the structure of the 3D object data generated based on the selected display hue range is as shown in FIG. 41. In this case, a display permission flag in polygon data is updated in accordance with the display surface selection information. FIG. 43 shows a display example on the color monitor 107 when WMYR and WYCG surfaces are selected as the display surface.

Select Comparison Data

Figure 44:
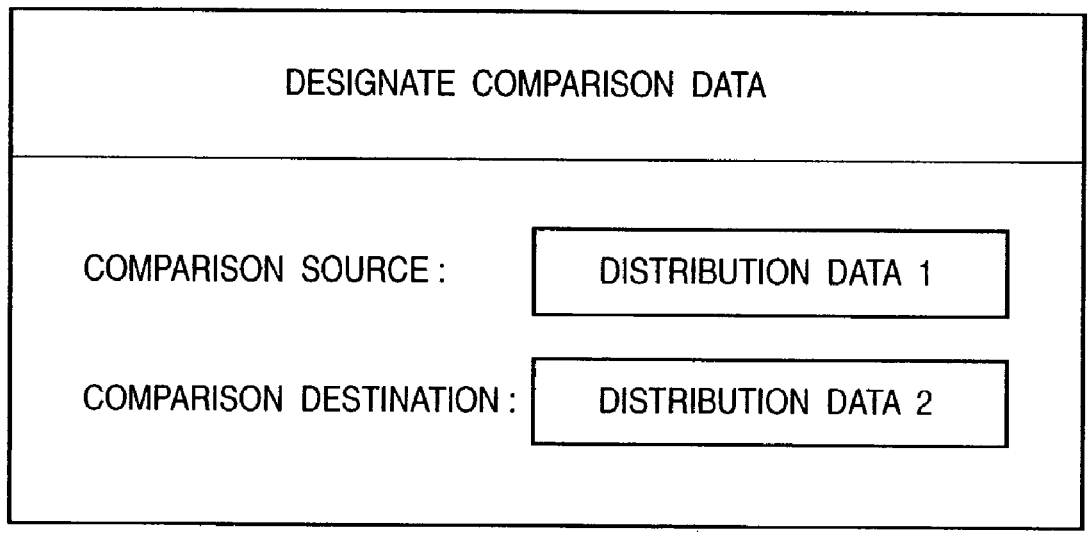
FIG. 44 shows a user interface used to select comparison data.

Selection of comparison data in step S413 will be described below. FIG. 44 shows a user interface used to select comparison data. The user selects comparison source data and comparison destination data. When the user selects comparison data, message SELECT_DATA is sent to the color analysis program, which generates/updates 3D object data based on the comparison source data as in step S404. Also, the grid point information on the RGB color space, which corresponds to polygon data that form the 3D object data, is stored independently of the 3D object data.

Select Comparison Calculation Method

Selection of a comparison calculation method in step S414 will be described below. FIG. 45 shows a user interface used to select a comparison calculation method. When the user selects the comparison calculation method, message DIFFERENCE_MODE is sent to the color analysis program. In accordance with the selected comparison calculation method, object surface colors are calculated in step S416.

In step S416, the colors of the 3D object data are calculated based on the comparison source color distribution data, the comparison destination color distribution data, the grid point information on the RGB color space, which corresponds to polygon data that form the 3D object data, and the selection information of the comparison calculation method. If the color distribution data of the comparison source and destination have different numbers of grids, calculations are executed based on grid point coordinate values on the RGB color space of the color distribution data of the comparison source.

Each calculation methods will be described in detail below.

(A) Compare Change Amount

A color difference DE between the color distribution data of the comparison source and destination is calculated for each vertex of a polygon in the 3D object data. In this case, correspondence between each vertex of a polygon and the color distribution data is defined using the grid point information on the RGB color space, which corresponds to polygon data that form the 3D object data.

Using the calculated color difference DE, a color of a polygon is calculated by:

$$a = \sum_{j=1}^{n} DE_{ij}/n \qquad (1)$$

where $DE_{ij}$ is the color difference at vertex j of polygon i, and n is the number of vertices of the polygon.

A color (R, G, B) of polygon i is calculated by:

$$(R, G, B) = \left(\frac{255}{20}a, 0, 255 - \frac{255}{20}a\right) \qquad (2)$$

for if a<0, a=0
if a>20, a=20

As can be seen from equation (2), if the color difference DE is 0 or less, the color of a polygon is blue; if the color difference is 20 or more, the color is red.

Also, the color of a wire frame in wire frame display is calculated as the average of change amounts of the two ends of a side. If a side belongs to polygon i, and vertices at the two ends of the side are j and k, the color (R, G, B) of a wire frame is calculated using $DE_{ij}$ above by:

$$a = \frac{DE_{ij} + DE_{ik}}{2} \qquad (3)$$

$$(R, G, B) = \left(\frac{255}{20}a, 0, 255 - \frac{255}{20}a\right) \qquad (4)$$

for if a<0, a=0
if a>20, a=20

(B) Compare Density

The length of each side of a polygon in the 3D object is calculated on the basis of the color distribution data of the comparison source and destination. In this case, correspondence between each vertex of a polygon and the color distribution data is defined using the grid point information on the RGB color space, which corresponds to polygon data that form the 3D object data.

Let $\lambda 1_{ij}$ be the length (color difference between vertices that form a side) of side j upon referring to the color distribution data of the comparison source, and $\lambda 2_{ij}$ be the length of side j upon referring to the color distribution data of the comparison destination. FIG. 46 is a view for explaining the length of a side of polygon i.

The color (R, G, B) of a wire frame in wire frame display is calculated using $\lambda 1_{ij}$ and $\lambda 2_{ij}$ by:

$$(R, G, B) = \left(128 - \frac{128}{3}a, 128 + \frac{128}{3}a, 128 + \frac{128}{3}a\right) \quad (5)$$

for if $\lambda 1_{ij} > \lambda 2_{ij}$, $a = \lambda 1_{ij}/\lambda 2_{ij}$
if $\lambda 2_{ij} > \lambda 1_{ij}$, $a = -\lambda 2_{ij}/\lambda 1_{ij}$
if $a > 3$, $a = 3$
if $a < -3$, $a = -3$ As can be seen from equation (5), when the lengths of the sides of the two data are equal to each other, the wire frame color is gray. When the length of the side of the color distribution data of the comparison destination is longer, the wire frame color changes to cyan; when it is shorter, the wire frame color changes to red.

Also, the color (R, G, B) of a polygon is calculated as the average of change amounts of a side by:

$$(R, G, B) = \left(\sum_{j=1}^{n} R_{ij}/n, \sum_{j=1}^{n} G_{ij}/n, \sum_{j=1}^{n} B_{ij}/n\right) \quad (6)$$

where $R_{ij}$, $G_{ij}$, and $B_{ij}$ are the values of respective color components of side j of polygon i, and n is the number of vertices of the polygon.

(C) Compare Change Direction

The vector of each side of a polygon in the 3D object data is calculated based on the color distribution data of the comparison source and destination. Correspondence between each vertex of a polygon and the color distribution data is defined using the grid point information on the RGB color space, which corresponds to polygon data that form the 3D object data.

Let $v1_{ij}$ be a vector formed by side j upon referring to the color distribution data of the comparison source in polygon i, and $v2_{ij}$ be a vector formed by side j upon referring to the color distribution data of the comparison destination. FIG. 47 illustrates such vectors.

Using $v1_{ij}$ and $v2_{ij}$, the color (R, G, B) of side j of polygon i in wire frame display is calculated by:

$$\theta = \cos^{-1}\left(\frac{v1_{ij} \cdot v2_{ij}}{a}\right) \quad (7)$$

$$(R, G, B) = (360 \cdot \sin(\theta/2), 0, 360 \cdot \cos(\theta/2)) \quad (8)$$

Note that the R, G, and B values are clipped to fall within the range from 0 to 255.

As can be seen from equation (8), when the directions of vectors of the two data are equal to each other, the wire frame color is blue, and as the direction rotates toward the opposite direction, the wire frame color changes to red.

Also, the color (R, G, B) of a polygon is calculated as the average of change amounts of a side by:

$$(R, G, B) = \left(\sum_{j=1}^{n} R_{ij}/n, \sum_{j=1}^{n} G_{ij}/n, \sum_{j=1}^{n} B_{ij}/n\right) \quad (9)$$

where $R_{ij}$, $G_{ij}$, and $B_{ij}$ are the values of respective color components of side j of polygon i, and n is the number of vertices of the polygon.

(D) Compare Change Direction+Change Amount

The vector of each side of a polygon in the 3D object data is calculated based on the color distribution data of the comparison source and destination. Correspondence between each vertex of a polygon and the color distribution data is defined using the grid point information on the RGB color space, which corresponds to polygon data that form the 3D object data. Let $v1_{ij}$ be a vector formed by side j upon referring to the color distribution data of the comparison source in polygon i, and $v2_{ij}$ be a vector formed by side j upon referring to the color distribution data of the comparison destination. These vectors are the same as those shown in FIG. 47.

Using $v1_{ij}$ and $v2_{ij}$, the color (R, G, B) of side j of polygon i in wire frame display is calculated by:

$$\theta = \cos^{-1}\left(\frac{v1_{ij} \cdot v2_{ij}}{a}\right) \quad (10)$$

$$L = \frac{\|v1_{ij} - v2_{ij}\|}{\|v2_{ij}\|} \quad (11)$$

$$\alpha = L \cdot \cos(\theta/2) \quad (12)$$

$$\beta = L \cdot \sin(\theta/2) \quad (13)$$

Note that if $\alpha + \beta > 1$, correction to $\alpha = \alpha/(\alpha+\beta)$ and $\beta = \beta/(\alpha+\beta)$ are made. Also, $\alpha$ and $\beta$ are clipped to fall within the range from 0 to 1. From $\alpha$ and $\beta$ calculated as above, we have:

$$(R, G, B) = (127.5, 127.5, 127.5) + \alpha \cdot (-127.5, -127.5, 127.5) + \beta \cdot (127.5, -127.5, -127.5) \quad (14)$$

Note that the R, G, and B values are clipped to fall within the range from 0 to 255, respectively. As can be seen from equation (14), when the directions of vectors of the two data are equal to each other, the wire frame color is blue, and as the direction rotates toward the opposite direction, the wire frame color changes to red. Furthermore, when the vector difference is small, the color changes to gray.

The color (R, G, B) of a polygon is calculated as the average of change amounts of a side by:

$$(R, G, B) = \left(\sum_{j=1}^{n} R_{ij}/n, \sum_{j=1}^{n} G_{ij}/n, \sum_{j=1}^{n} B_{ij}/n\right) \quad (15)$$

where $R_{ij}$, $G_{ij}$, and $B_{ij}$ are the values of respective color components of side j of polygon i, and n is the number of vertices of the polygon.

As described above, according to the second embodiment, pseudo-3D display of the comparison result of local color distribution states and that of detailed color distribution states can be provided. Furthermore, since the user can adequately recognize/determine local problems, he or she can quickly reflect the recognized/determined problems in the gamut mapping technique.

MODIFICATION OF SECOND EMBODIMENT

In the second embodiment, the colors of the 3D object are changed based on comparison calculations only when the distribution data of the comparison source and destination have the same number of grids. However, the above restrictions may be removed.

Hence, only the calculations of the color of an object surface in step S416 when the color distribution data of the comparison source and destination have different numbers of grids will be explained.

Initially, based on the color distribution data of the comparison destination interpolation operations are made to see what L*a*b* coordinate values that the color distribution data of the comparison destination assumes in correspondence with RGB coordinate values of sample points of the color distribution data of the comparison source. In this manner, L*a*b* values of the color distribution data of the comparison destination at same sample points as those of the color distribution data of the comparison source are calculated, thus forming color distribution data defined by the same sample points as those of the color distribution data of the comparison source. Then, the formed color distribution data can be considered as the comparison destination, and the color calculations of an object surface can be made in step S416.

THIRD EMBODIMENT

A color information processing apparatus according to the third embodiment of the present invention will be described below. Note that the same reference numerals in the third embodiment denote the same parts as in the first and second embodiments, and a detailed description thereof will be omitted.

[Color Analysis Program]

Figure 48:
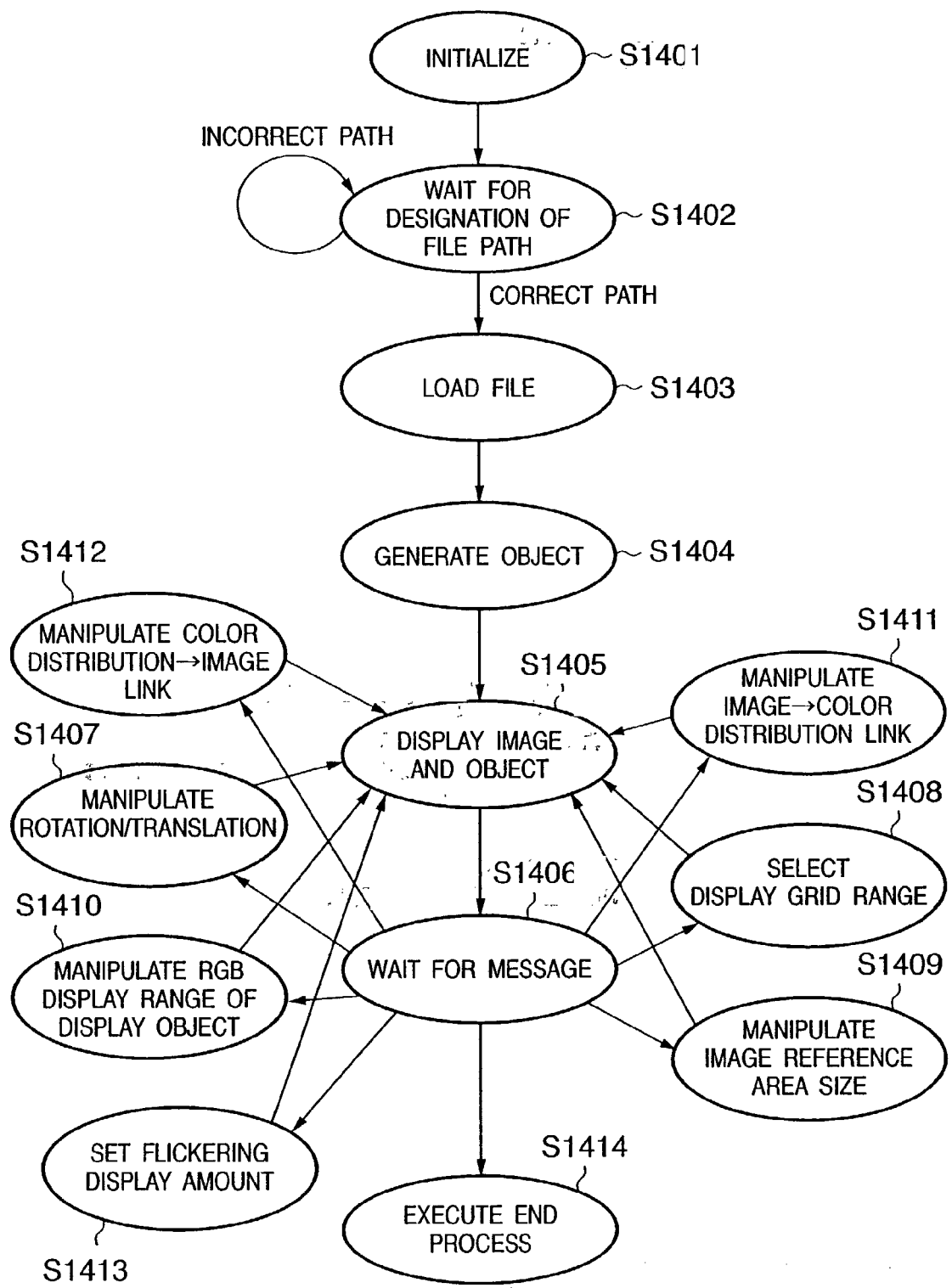
FIG. 48 is a status transition chart for explaining the process of a color analysis program.

FIG. 48 is a status transition chart for explaining the processing operation of the color analysis program.

When the color analysis program is launched, it executes initialization (e.g., assures a work heap memory and the like) (S1401). Subsequently, the program waits for path information of a color correction information file, color distribution information file, and image file input by the user (S1402). If the input path information is incorrect, step S1402 is repeated.

If the input path information is correct, the program loads the color distribution information file and image file on the basis of the path information, and stores them in a heap memory (S1403). The program then generates initial 3D object data and image object data on the basis of color distribution data and image data, and initializes geometry information upon displaying a 3D object (S1404). Note that generation and display of objects in step S1404 will be described later.

Images based on the image object data and 3D object data are appropriately displayed on the monitor on the basis of the geometry information (S1405). Note that the geometry information is formed of the position of the 3D object on the world coordinate system, rotational angle of the 3D object, screen coordinate data, screen rotational angle, viewpoint coordinate data, line-of-sight vector data, and the like.

The program waits for a message from the user (S1406). By interpreting various input messages, the control advances to an appropriate processing step. Processes corresponding to messages received in step S1406 will be explained below. Note that a message list is as follows.

Message List:
{MOVE, CHANGE_RGBAREA1, CHANGE_RGBAREA2, CHANGE_AREA_SIZE, CHANGE_GRIDAREA, LINK_TO_IMAGE, LINK_TO_DIST, PROCESS_END}

MOVE

Upon detection of message MOVE in step S1406, a viewpoint translation amount/viewpoint rotation amount attached to the message is extracted, and the viewpoint coordinate data and line-of-sight vector data of the geometry information are updated based on the extracted viewpoint translation amount/viewpoint rotation amount (S1407). The flow returns to step S1405 to update image display based on the 3D object data on the basis of the updated geometry information.

CHANGE_GRIDAREA

Upon detection of message CHANGE_GRIDAREA in step S1406, information of a display grid range attached to the message is extracted, and the 3D object data is updated based on the extracted information of the display grid range (S1408). The flow returns to step S1405 to update image display based on the 3D object data.

CHANGE_RGBAREA1

Upon detection of message CHANGE_RGBAREA1 in step S1406, information of a flickering display range attached to the message is extracted, and information indicating the flickering display range of the color analysis program is updated on the basis of the extracted information of the flickering display range (S1412). The flow then returns to step S1405 to update display.

CHANGE_RGBAREA2

Upon detection of message CHANGE_RGBAREA2 in step S1406, information of a range display amount attached to the message is extracted, and the RGB display range of a display object is updated on the basis of the extracted information of the range display amount (S1410). The flow then returns to step S1405 to update display.

CHANGE_IMAGE_AREA

Upon detection of message CHANGE_IMAGE_AREA in step S1406, size information of an image reference area attached to the message is extracted, and the size of the image reference area is updated on the basis of the extracted size information of the image reference area (S1409). The flow then returns to step S1405 to update display.

LINK_TO_IMAGE

Upon detection of message LINK_TO_IMAGE in step S1406, an L*a*b* value, which is to undergo color distribution→image link manipulation and is attached to the message, is extracted, and the color distribution→image link (to be described later) is manipulated on the basis of the extracted L*a*b* value which is to undergo color distribution→image link manipulation, thus updating the image object data (S1412). The flow returns to step S1405 to update image display based on the image object data.

LINK_TO_DIST

Upon detection of message LINK_TO_DIST in step S1406, an RGB value, which is to undergo image→color distribution link manipulation and is attached to the message, is extracted, and the image→color distribution link (to be described later) is manipulated on the basis of the extracted RGB value which is to undergo image→color distribution link manipulation, thus updating the range display object data (S1411). The flow returns to step S1405 to update image display based on the range display object data.

PROCESS_END

Upon detection of message PROCESS_END in step S1406, an end process (e.g., to release the heap memory and the like) is executed, thus ending the color analysis program.

Generation, updating, and display of the 3D object data and image object data will be described below.

Generation of Initial Object Data

FIG. 49 shows an example of the structure of object data used in the third embodiment.

Upon generating 3D object data, two different combinations of triangles are generated for each of minimum rectangles formed by grid points on a maximum grid area surface on the RGB color space, as in the first embodiment.

The grid point coordinate values of vertices of these triangles are converted into corresponding L*a*b* coordinate values using the color distribution information data, and 3D object data is formed based on combinations of triangles after conversion. In this case, the combinations of triangles are selected to maximize the volume of the 3D object data. Note that the display grid range of 3D object data is reset to a maximum grid area.

The initial image object data consists of only image data read in step S1403, and no flickering display area is set. Also, a display/non-display flag of the range display object is reset to a non-display state.

Figure 50:
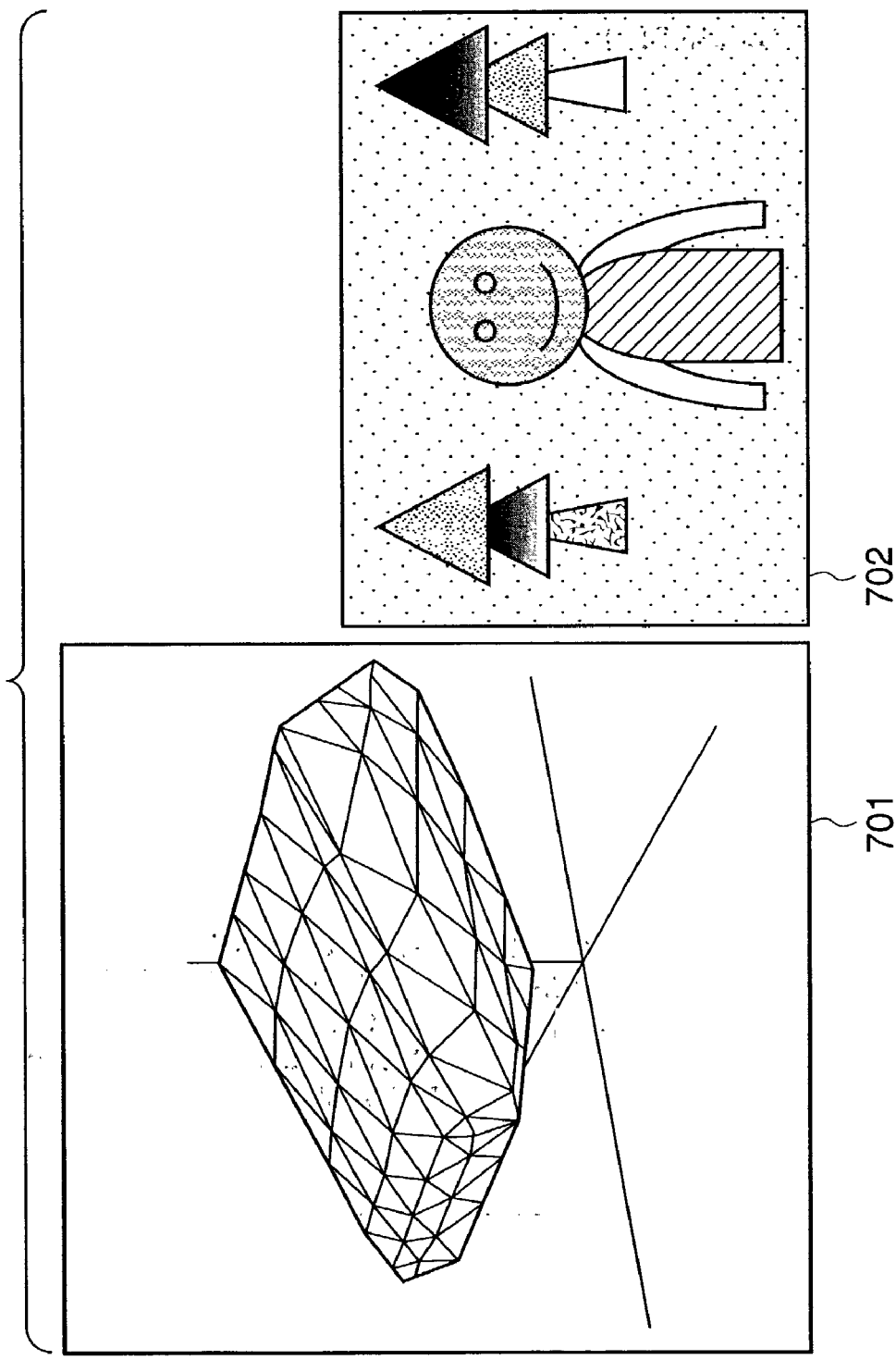
FIG. 50 shows a display example on a color monitor.

FIG. 50 shows a display example on the color monitor 107 in step S1405. Reference numeral 701 denotes a display example of an image based on the 3D object data; and 702, a display example of an image based on the image object data.

Select Display Grid Range

Selection of the display grid range is the same as that in the first embodiment, and a detailed description thereof will be omitted.

Select Image Reference Area Size

The average value of pixels in a surrounding area is calculated to have, as the center, a point on an image designated by the user upon manipulating the image→color distribution link, and a corresponding L*a*b* coordinate value on the 3D object is calculated with reference to this average value.

FIG. 51 shows a user interface used to select the sizes of the surrounding area. When the user selects the surrounding area sizes, message CHANGE_AREA_SIZE indicating the selected reference area size is sent to the color analysis program, which updates size information of the image reference area in accordance with the surrounding area size information attached to the message.

When the user instructs to construct an image→color distribution link while the vertical and horizontal reference sizes are set to be ±1 pixel, as shown in FIG. 51, the average value of RGB values of neighboring nine pixels including a pixel selected by the user, and respective processes in the image→color distribution link manipulation (to be described later) are executed.

Select RGB Range of Range Display Object

Selection of the RGB range of the range display object is the same as that in the first embodiment, and a detailed description thereof will be omitted.

Image→Color Distribution Link Manipulation

When the user selects a point on an image using the mouse or the like, an arrow (denoted by reference numeral 162 in FIG. 53) is displayed at the corresponding position, and message LINK_TO_DIST is sent to the color analysis program. The color analysis program updates the range display object data on the basis of an RGB value which is to undergo image→color distribution link manipulation and is attached to the message (i.e., the RGB value of the selected point).

Figure 52:
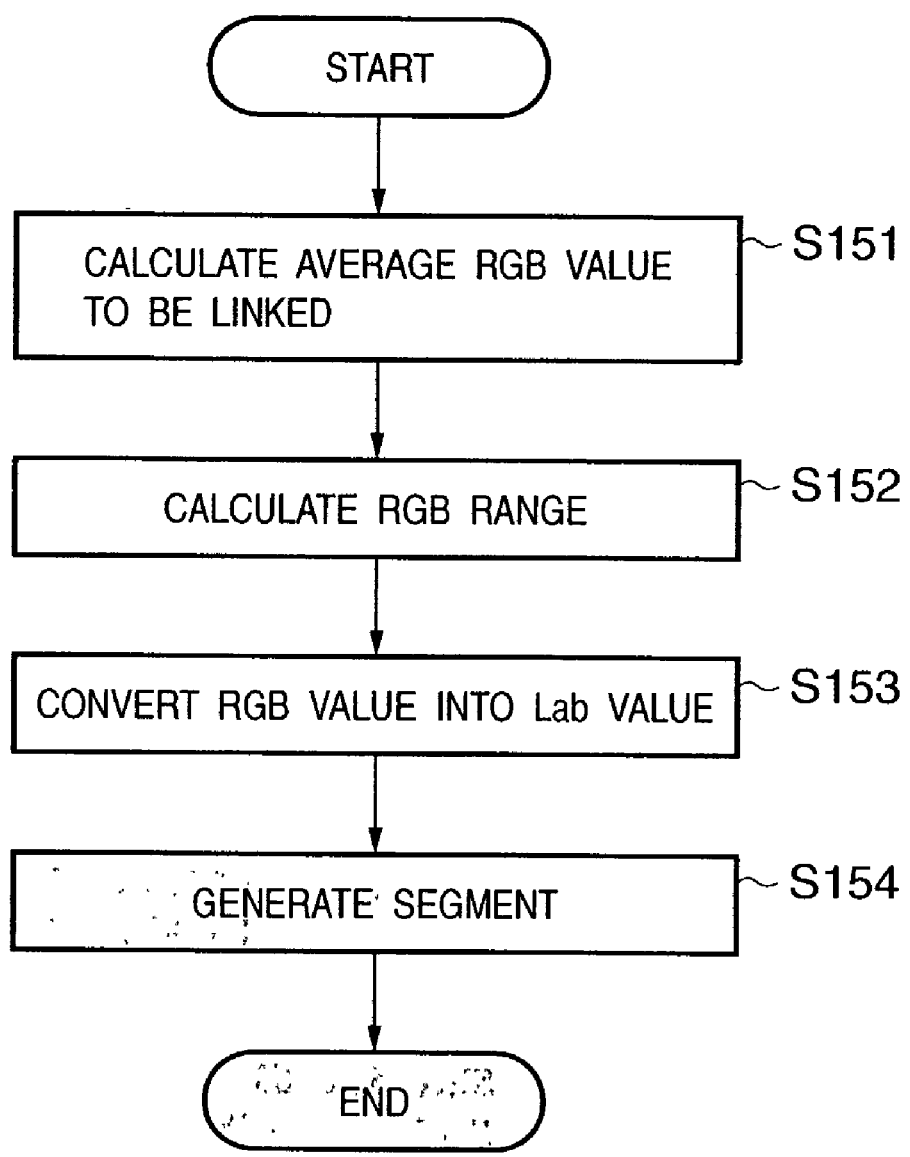
FIG. 52 is a flow chart for explaining the update sequence of range display object data.

FIG. 52 is a flow chart for explaining the update sequence of the range display object data.

On the basis of the point on the image selected by the user, and the reference area size information, RGB values of surrounding pixels are acquired, and their average value (rave, gave, bave) is calculated (S151).

On the basis of the calculated average value (rave, gave, bave), and the RGB range (−rsize to +r'size, −gsize to +g'size, and −bsize to +b'size) of the range display object, six values rmin, rmax, gmin, gmax, bmin, and bmax indicating the RGB range are calculated (S152):

$r\text{min} = r - r'\text{size}$ $r\text{max} = r + r'\text{size}$ $g\text{min} = g - g\text{size}$ $g\text{max} = g + g'\text{size}$ $b\text{min} = b - b\text{size}$ $b\text{max} = b + b'\text{size}$ Then, seven sets of RGB values (rmin, gave, bave), (rmax, gave, bave), (rave, gmin, bave), (rave, gmax, bave), (rave, gave, bmin), (rave, gave, bmax), and (rave, gave, bave) are converted into L*a*b* values using the color distribution data (S153).

Then, six segments having, as end points, L*a*b* coordinate values corresponding to the seven sets of RGB values and an L*a*b* coordinate value corresponding to (rave, gave, bave), are generated to update the range display object data.

FIG. 18 illustrates the range display object data in the L*a*b* color space.

The color analysis program determines the display position of the updated range display object data with reference to the 3D object data.

Figure 53:
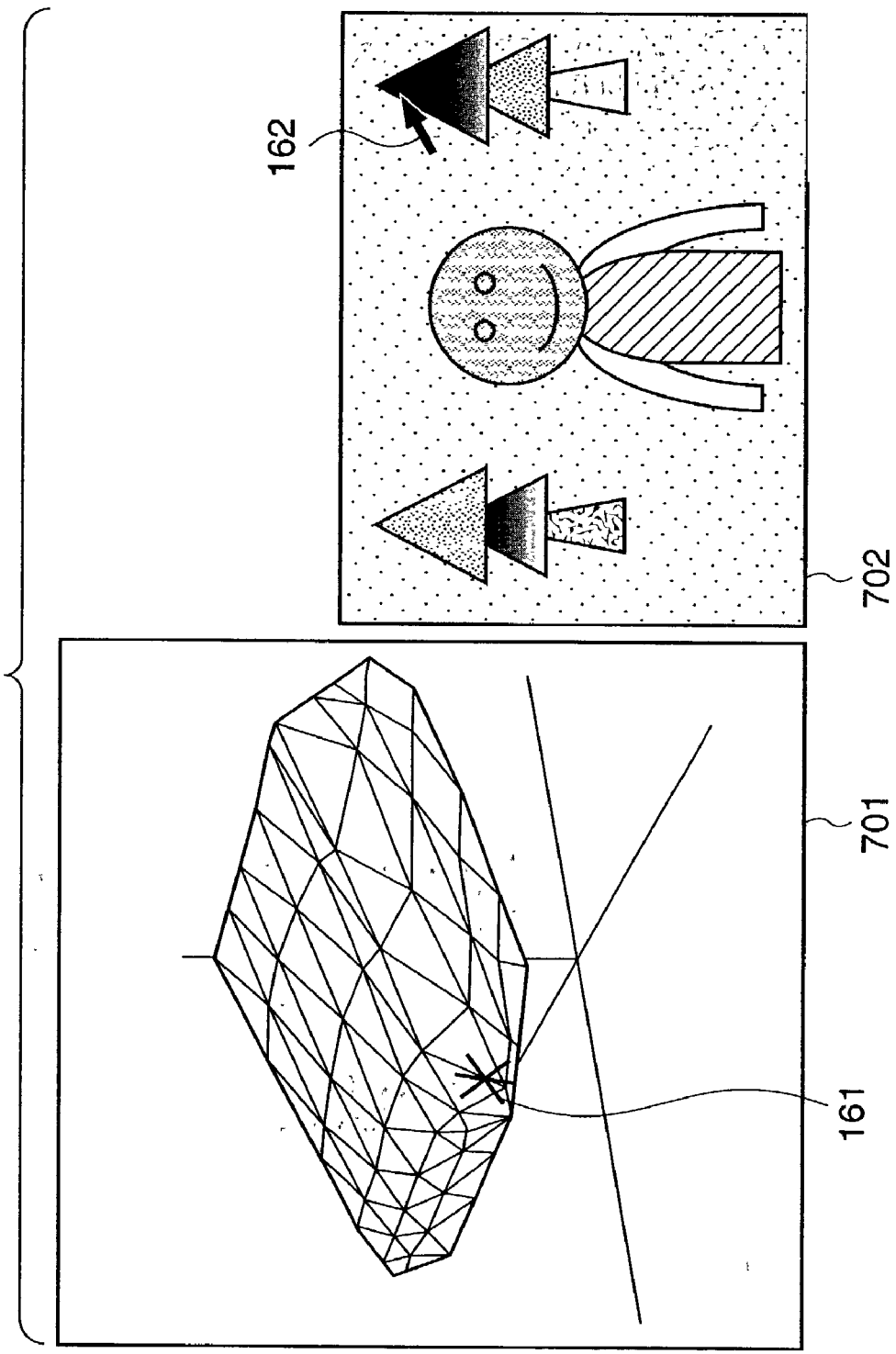
FIG. 53 shows a display example on a color monitor upon manipulating an image→color distribution link.

FIG. 53 shows a display example on the color monitor 107 upon constructing an image→color distribution link. When a range display object 161 is not displayed on the surface of an image based on the 3D object data, the user moves/rotates the 3D object and selects the display grid range to display the range display object 161 on the surface of the image based on the 3D object.

Select Flickering Display Range

Selection of a flickering display range is the same as that in the first embodiment, and a detailed description thereof will be omitted.

Color Distribution→Image Link Manipulation

When the user selects a point on the 3D object using the mouse or the like, an arrow (denoted by reference numeral 220 in FIG. 56) is displayed at the corresponding position, and message LINK_TO_IMAGE is sent to the color analysis program. The color analysis program updates the image object data on the basis of an L*a*b* value which is to undergo color distribution→image link manipulation and is attached to the message (i.e., the L*a*b* value of the selected point).

Figure 54:
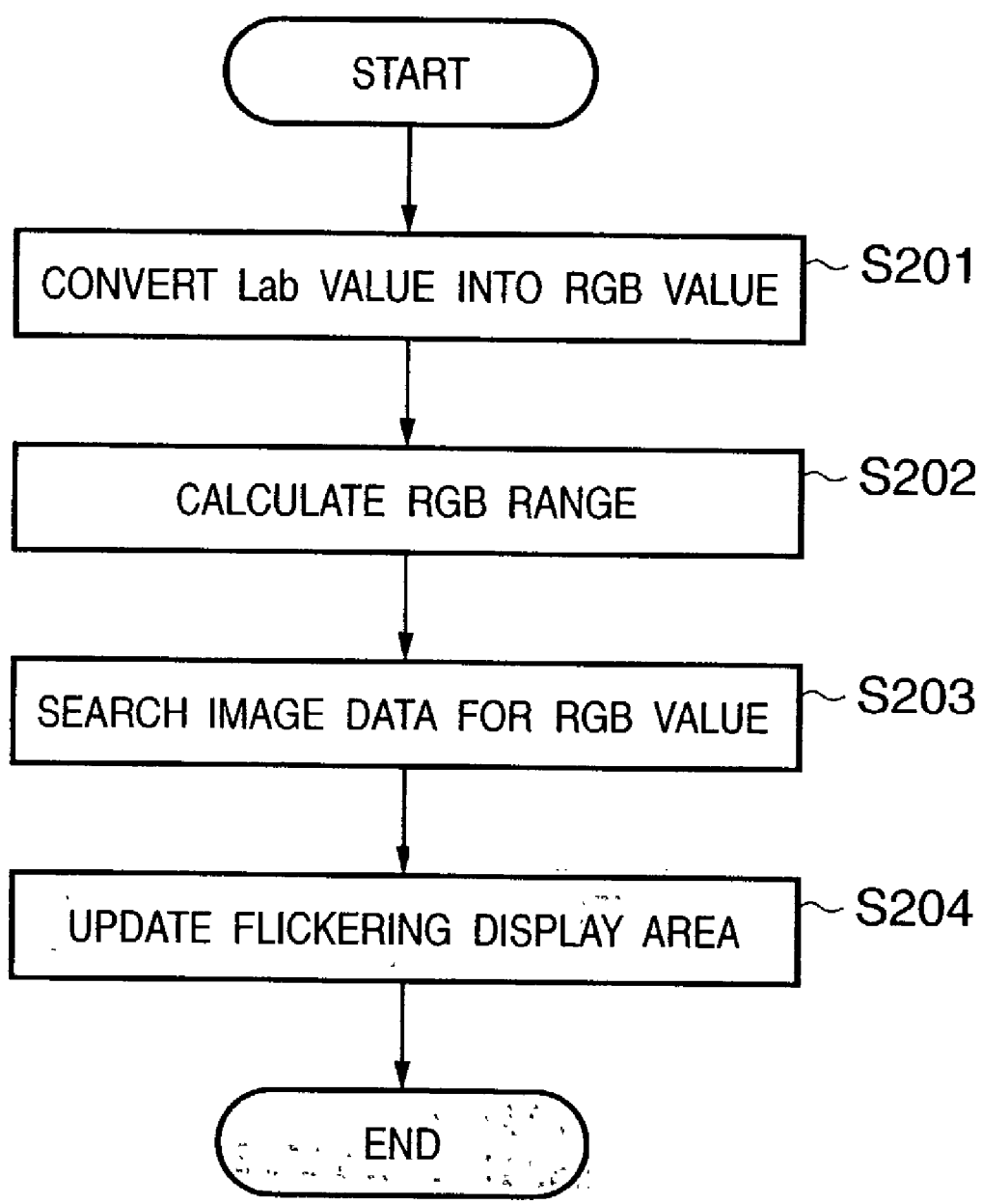
FIG. 54 is a flow chart for explaining the update sequence of image object data.

FIG. 54 is a flow chart showing the update sequence of the image object data.

The L*a*b* coordinate value of the point selected by the user is converted into an RGB value using the color distribution data (S201).

Figure 55:
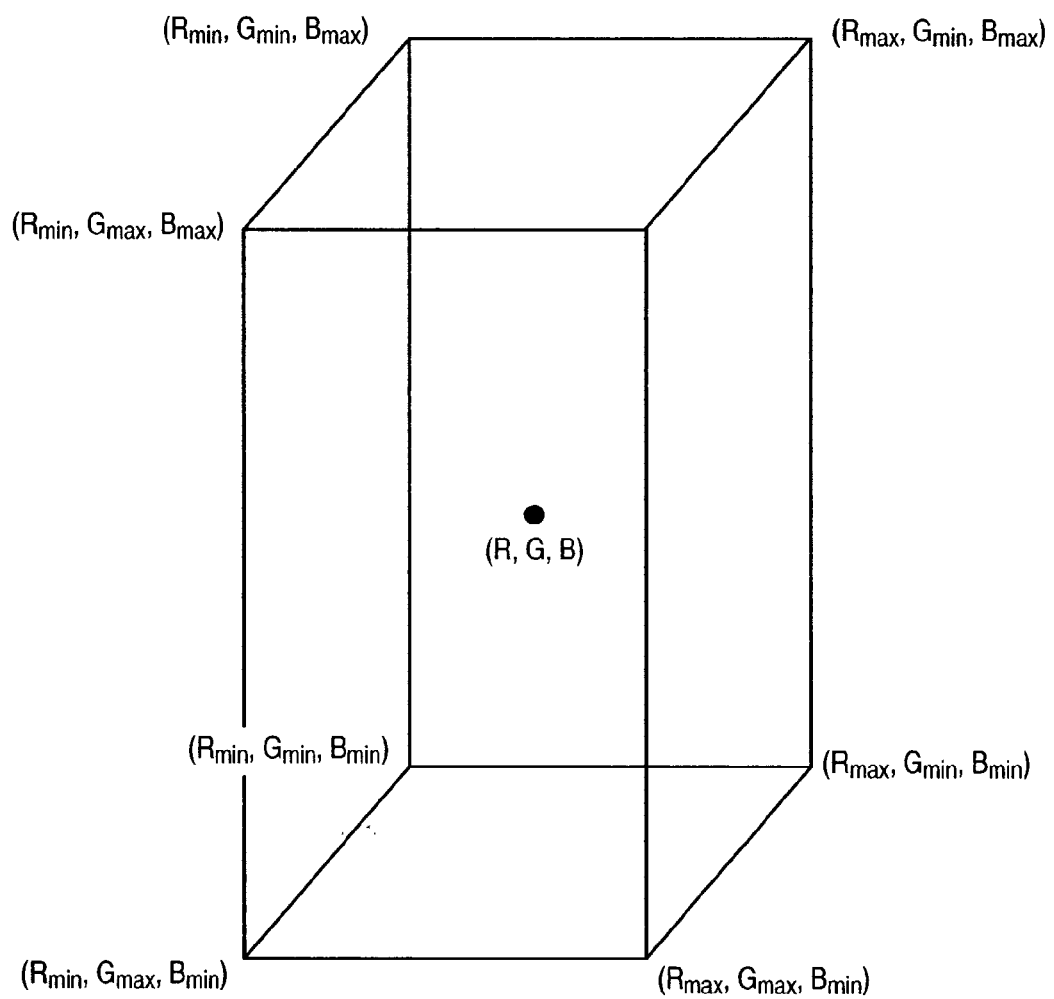
FIG. 55 is a view for explaining a flickering display range in the RGB color space.

Then, based on the converted RGB value (R, G, B) and the flickering display range −Rsize to +R'size, −Gsize to +G'size, and −Bsize to +B'size, six values Rmin, Rmax, Gmin, Gmax, Bmin, and Bmax indicating the RGB range are calculated (S202):

$R\text{min} = R - R\text{size}$ $R\text{max} = R + R'\text{size}$ $G\text{min} = G - G\text{size}$ $G\text{max} = G + G\text{size}$ $B\text{min} = B - B\text{size}$ $B\text{max} = B + B\text{size}$ The image data is searched for RGB values located within an area (see FIG. 55) defined by ([Rmin, Rmax], [Gmin, Gmax], [Bmin, Bmax]) (S203).

Then, information indicating the flickering display area of the image object data is updated to flicker the RGB values located within the area (S204).

Figure 56:
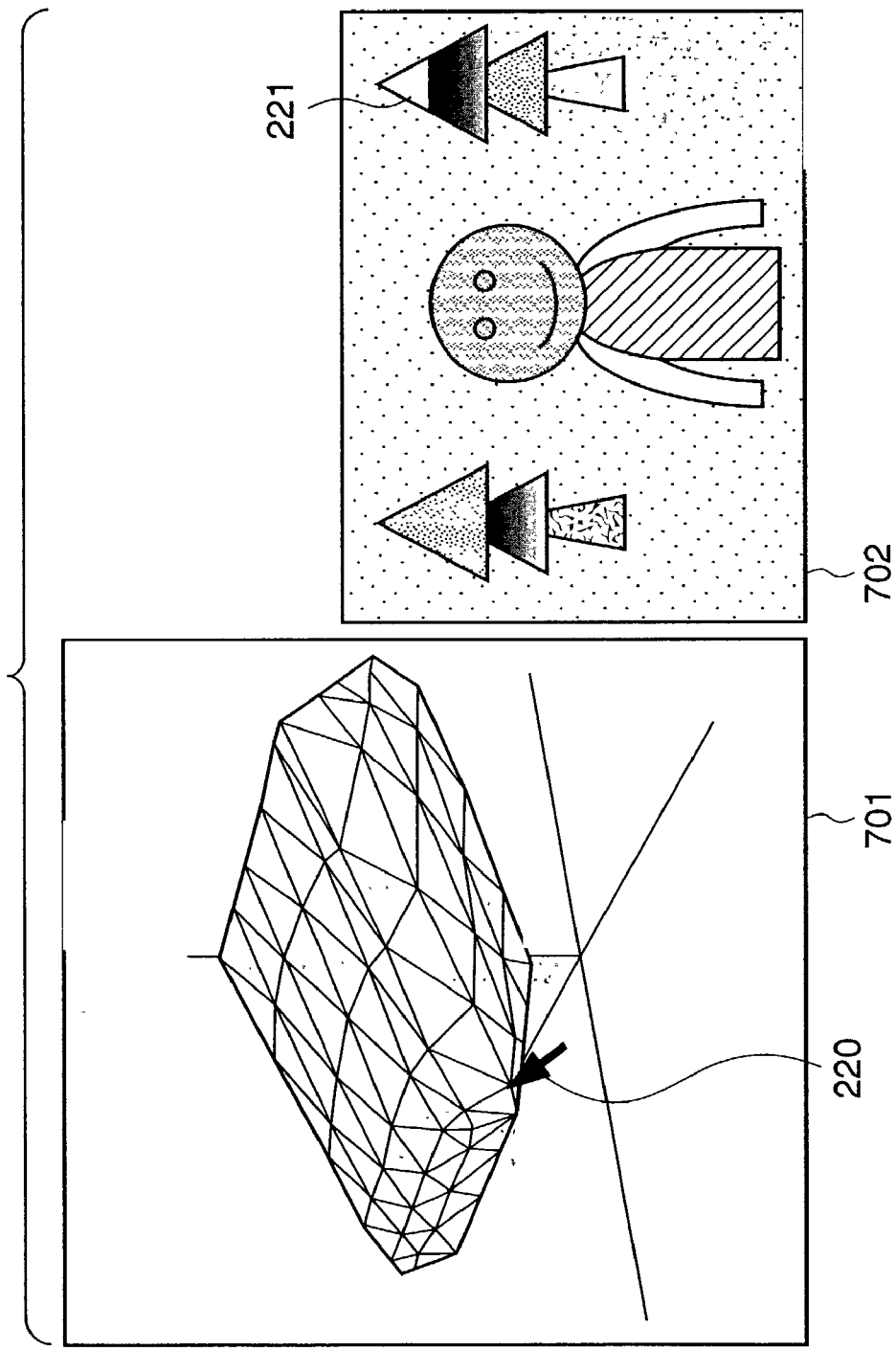
FIG. 56 shows a display example on a color monitor upon manipulating an image→color distribution link.

FIG. 56 shows a display example on the color monitor 107 upon constructing a color distribution→image link. For example, an area denoted by reference numeral 221 flickers.

As described above, according to the third embodiment, 3D color distribution information and image information can be displayed on the monitor in correspondence with each other in an easy-to-understand layout for the user. Therefore, the user can qualitatively and intuitively determine and evaluate local and comprehensive information of the gamut mapping process, can adequately recognize and determine local problems of the gamut mapping process, and can quickly reflect the determination result in the gamut mapping process.

FOURTH EMBODIMENT

An image processing apparatus according to the fourth embodiment of the present invention will be described below. Note that the same reference numerals in this embodiment denote the same parts as in the first to third embodiments, and a detailed description thereof will be omitted.

In the third embodiment, when constructing an image→color distribution link, the display range of the range display object is specified in the RGB color space. In the fourth embodiment, the display range of the range display object is assigned in the L*a*b* color space.

FIG. 57 shows a user interface used to specify the L*a*b* range of the range display object. The specification method is the same as that of the RGB range in the third embodiment.

When the user selects a point on an image using the mouse or the like, an arrow is displayed at the corresponding position, and message LINK_TO_DIST is sent to the color analysis program. The color analysis program updates the range display object data on the basis of an RGB value which is to undergo image→color distribution link manipulation and is attached to the message.

Figure 58:
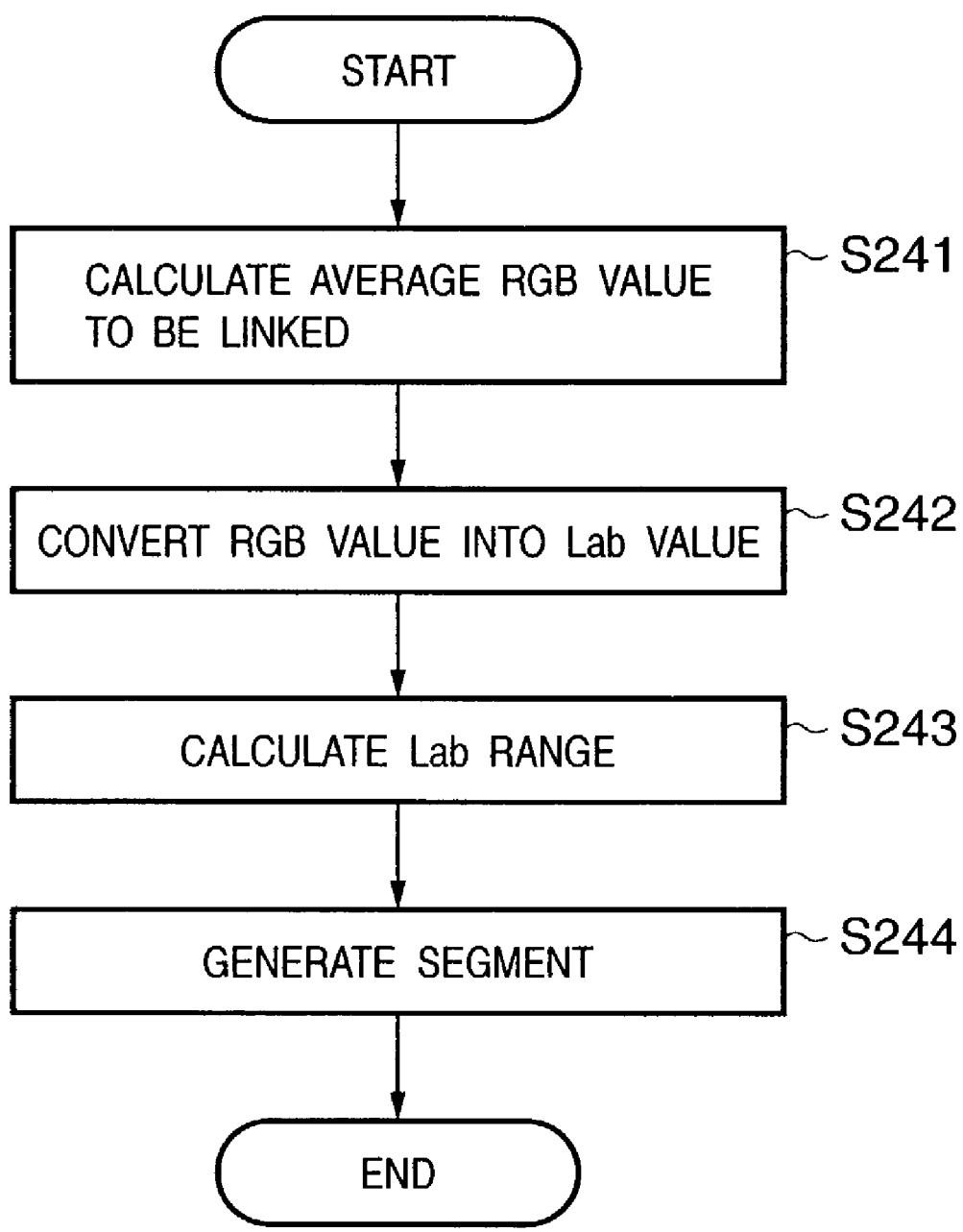
FIG. 58 is a flow chart for explaining the update sequence of range display object data.

FIG. 58 is a flow chart for explaining the update sequence of the range display object data.

On the basis of the point on the image selected by the user, and the reference area size information, the RGB values of surrounding pixels are acquired, and their average value (rave, gave, bave) is calculated (S241).

The calculated average value (rave, gave, bave) is converted into an L*a*b* value (Lave, aave, bave) on the basis of the color distribution data (S242).

Using the L*a*b* range designated using the user interface shown in FIG. 57, an L*a*b* range having the L*a*b* value (Lave, aave, bave) obtained by conversion as the center is obtained (S243).

Segments having, as end points, the maximum and minimum values of the respective axis of the obtained L*a*b* range, are generated to update the range object data (S244).

Figure 59:
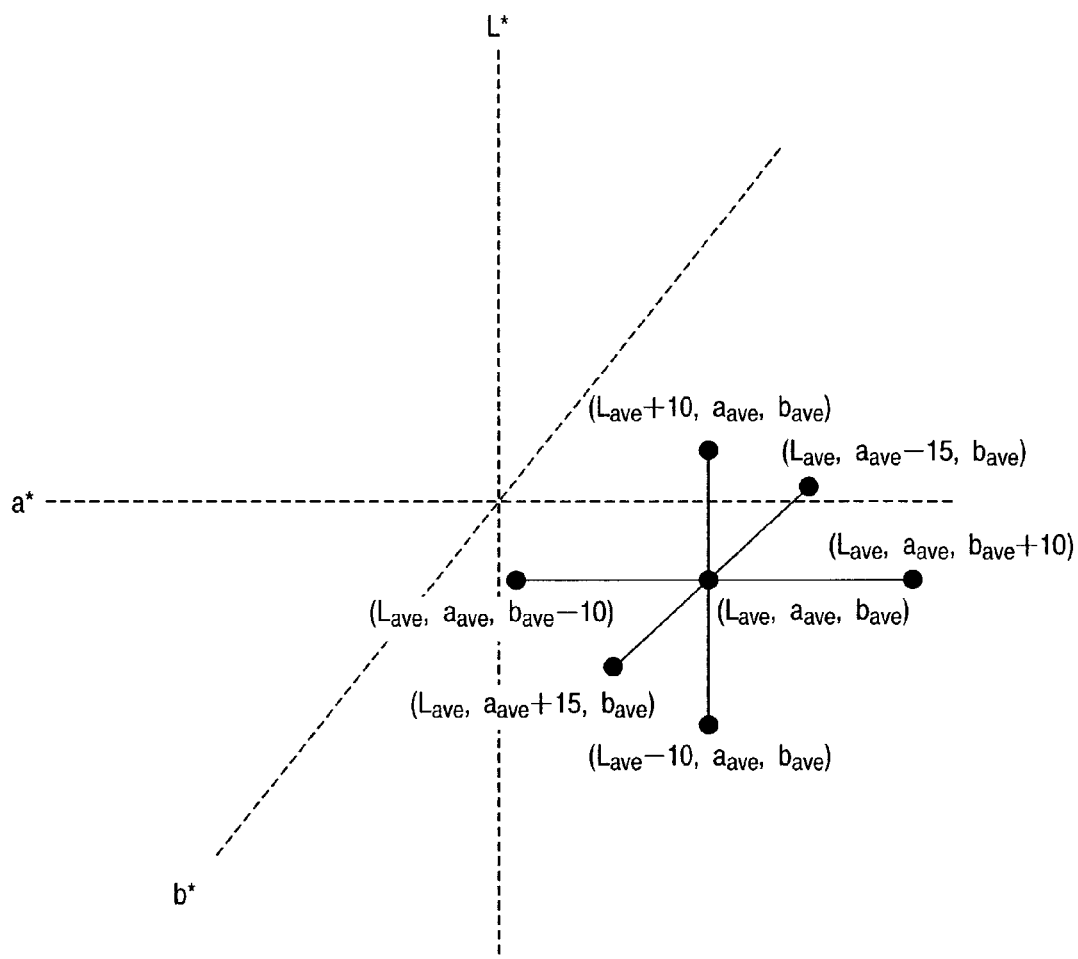
FIG. 59 shows a display example of a range display object.
Figure 60:
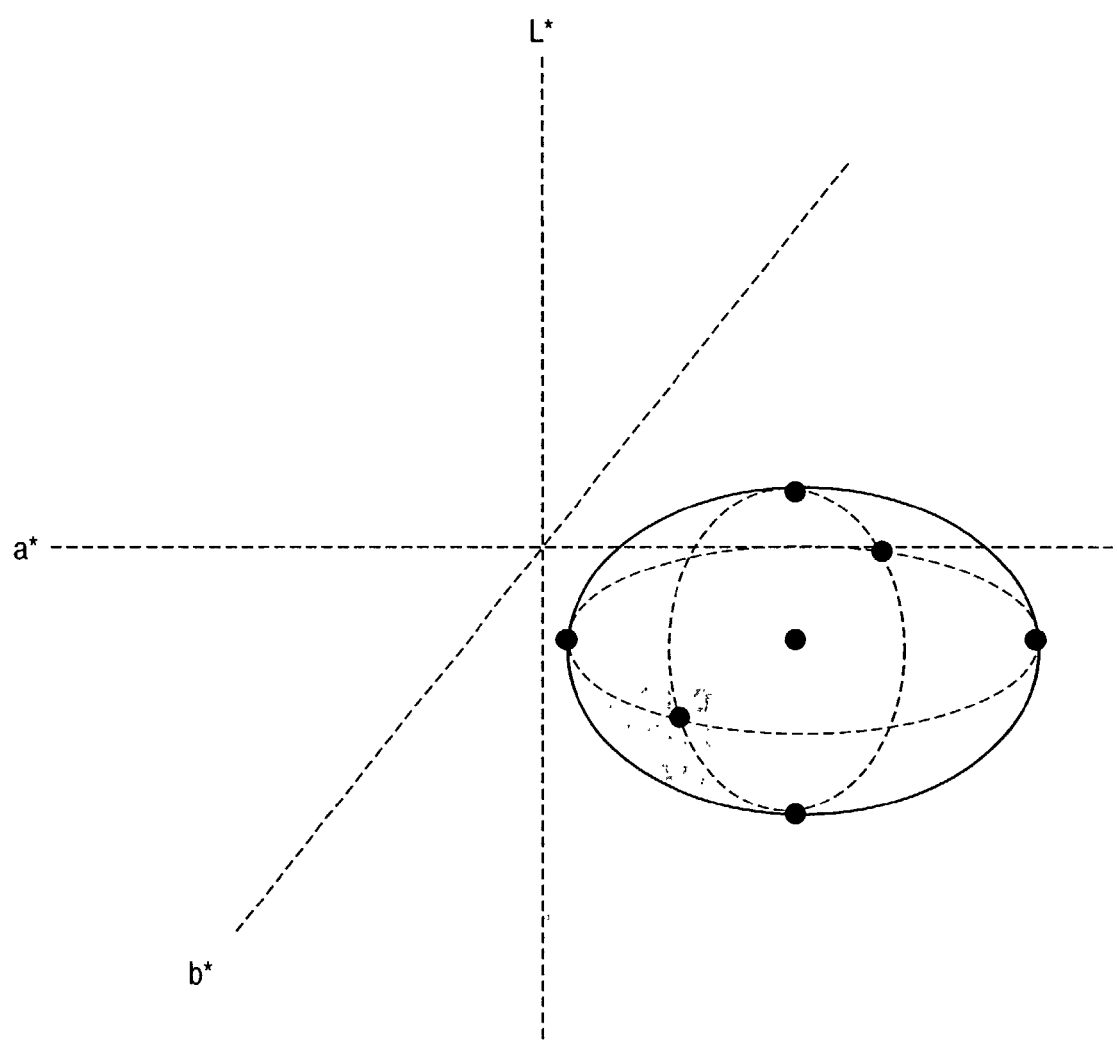
FIG. 60 shows another display example of a range display object.
Figure 61:
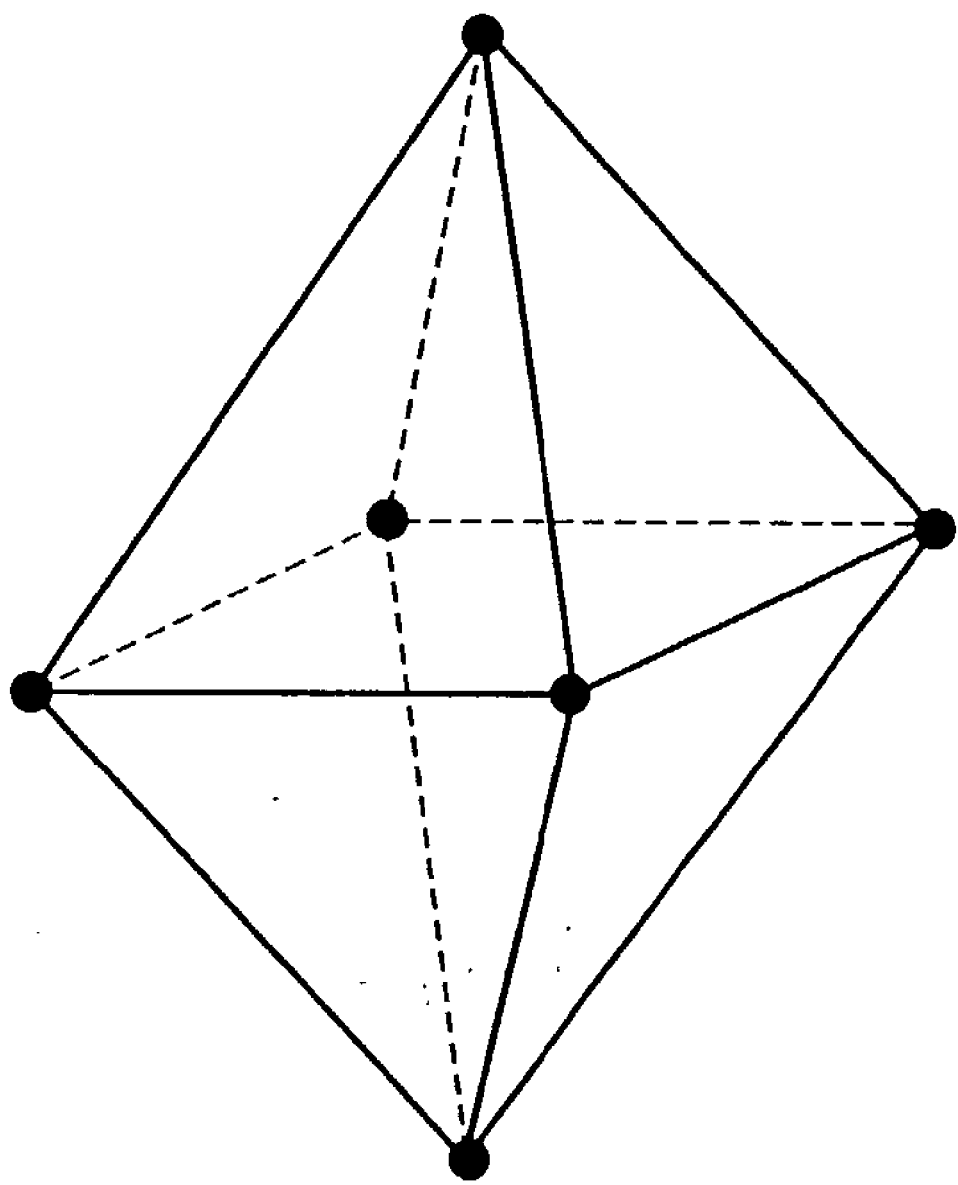
FIG. 61 shows still another display example of a range display object.

FIG. 59 shows a display example of the range display object when the L*, a*, and b* ranges are −10 to +10, −15 to +15, and −10 to +15, respectively. Note that a shape that represents the range display object is not limited to a combination of line segments show in FIG. 59, but may have an elliptic shape (or spherical shape) shown in FIG. 60 or a polyhedral shape shown in FIG. 61.

According to the fourth embodiment, since the display range of the range display object is specified as a value on the L*a*b* color space to be displayed actually upon constructing the image→color distribution link, the user can specify the display range more intuitively.

FIFTH EMBODIMENT

An image processing apparatus according to the fifth embodiment of the present invention will be described below. Note that the same reference numerals in the fifth embodiment denote the same parts as in the first to fourth embodiments, and a detailed description thereof will be omitted.

In the third and fourth embodiments, when an L*a*b* value to be linked is not located on the surface of the image based on the 3D object data upon displaying the image→color distribution link, the user must manipulate the display grid range so that the designated point corresponding to the L*a*b* value to be linked appears. In the fifth embodiment, the color analysis program changes the display range of the image based on the 3D object data so that the designated point is displayed.

In the fifth embodiment, when the user designates a point on the image using the mouse or the like, an arrow is displayed at the corresponding position, and message LINK_TO_DIST is sent to the color analysis program.

Upon detection of message LINK_TO_DIST, the color analysis program updates the range display object in the sequence shown in the flow chart of FIG. 52. Furthermore, the color analysis program changes the display grid range on the basis of the average RGB value (rave, gave, bave), which is calculated based on the point on the image selected by the user, and the reference area size information, so as to move/rotate the display grid range, thus displaying the range display object 161 on the surface of the image based on the 3D object data. More specifically, the display grid range is determined in the following sequence.

With reference to the steps of RGB values described in the color distribution information file, a minimum value $i_{min}$ of integers i that satisfy an R grid range [i, gridR$_{max}$−i], which does not contain rave in a corresponding R value, is acquired. Note that gridR$_{max}$ is a maximum grid point number on the R axis. Similarly, values $j_{min}$ and $k_{min}$ are acquired from a G grid range that does not contain gave in a corresponding G value, and a B grid range that does not contain bave in a corresponding B value.

After that, a minimum value int$_{min}$ of $i_{min}$, $j_{min}$, and $k_{min}$ is acquired, and [int$_{min}$, gridR$_{max}$−int$_{min}$], [int$_{min}$, gridG$_{max}$−int$_{min}$], and [int$_{min}$, gridB$_{max}$−int$_{min}$] are respectively set as R, G, and B display grid ranges. Note that gridG$_{max}$ and gridB$_{max}$ are maximum grid point numbers on the G and B axes, as in gridR$_{max}$.

Figure 62:
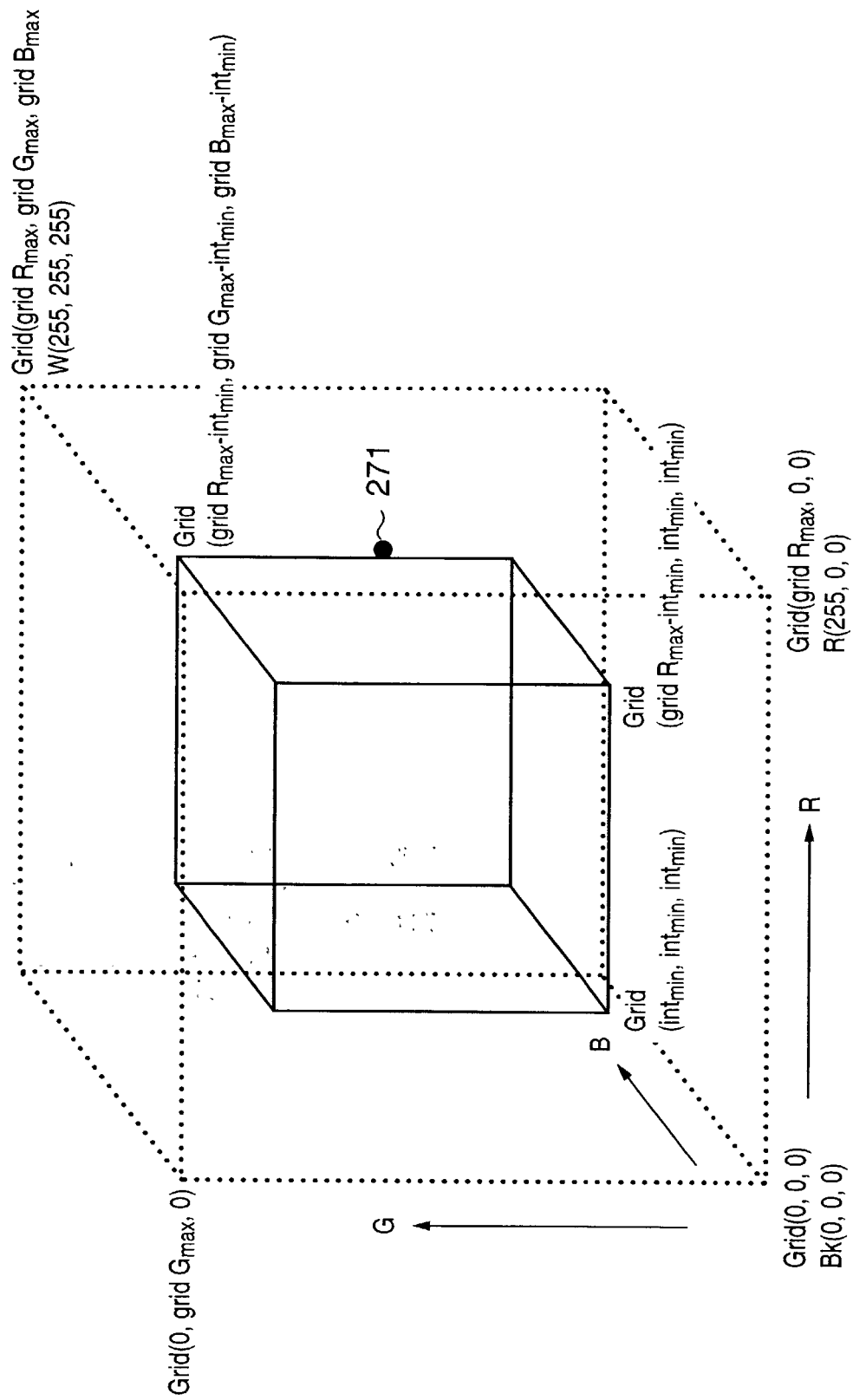
FIG. 62 shows a display grid range in the RGB color space.
Figure 63:
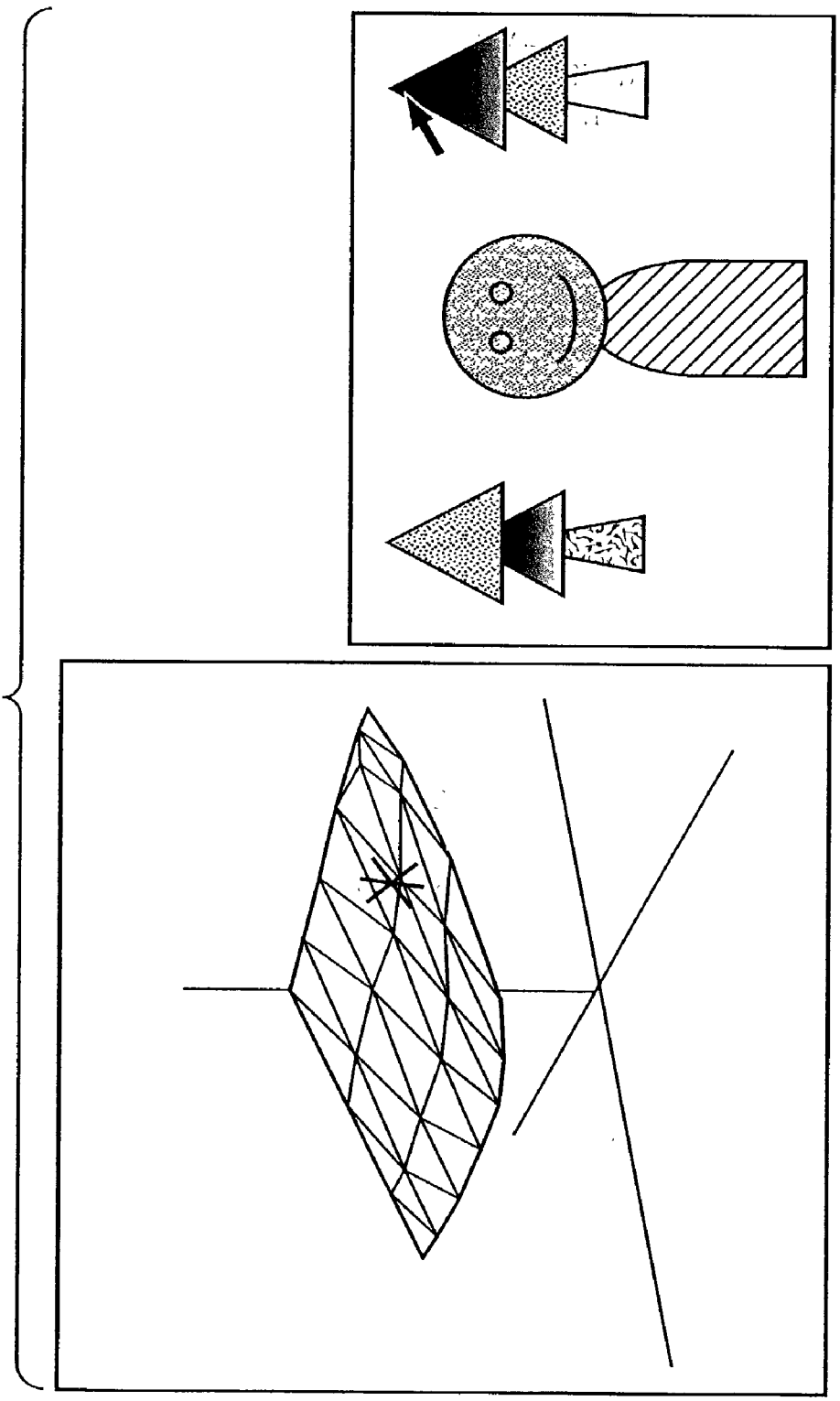
FIG. 63 shows a display example on a color monitor upon manipulating an image→color distribution link.

FIG. 62 shows the display grid range in the RGB color space. A range indicated by the dotted line indicates a maximum grid area, and a range indicated by the solid line indicates an actual display grid range. A point denoted by reference numeral 271 in FIG. 62 indicates the average RGB value (rave, gave, bave). FIG. 63 shows a display example on the color monitor upon manipulating the image→color distribution link.

In the aforementioned example, R, G, and B ranges that enter the same numbers of grids inwardly from the surface of the image based on the 3D object data are displayed. For example, a modification in which only the R display range may be changed to $[i_{min}, gridR_{max}-i_{min}]$, and G and B remain the same to display the surface of the image, is available.

According to the fifth embodiment, since the L*a*b* value to be linked can be automatically displayed on the surface of the image based on the 3D object data upon constructing the image→color distribution link, analysis of color distribution information in correspondence with image information can be made by simpler operations.

MODIFICATION OF EMBODIMENTS

Calculate RGB Value Which is to Undergo Image→Color Distribution Link Manipulation In each of the above embodiments, the average RGB value of the surrounding area, which has as the center the pixel on the image selected by the user is calculated, and the range display object is generated and displayed on the basis of this value. Furthermore, RGB values obtained by weighting those of the surrounding area and making convolution operations may be used. In this case, weights may use Gaussian filter coefficients, or may be designated by the user.

Display Mode of Color Distribution→Image Link Area

In each of the above embodiments, a corresponding area on the image flickers on the basis of the L*a*b* value on the 3D object designated by the user. Alternatively, the RGB values of the corresponding area may be highlighted.

L*a*b* Value Which is to Undergo Image→Color Distribution Link Manipulation

In each of the above embodiments, the user specifies one point on the 3D object, and an image→color distribution link is constructed on the basis of the L*a*b* value of the specified point. However, the user may designate a predetermined area on the 3D object, and an image→color distribution link may be constructed on the basis of the L*a*b* values within the designated area. In this case, the average value of the L*a*b* values within the area may be calculated and used, or L*a*b* values, which have been weighted and undergone convolution operations, may be used.

Colorimetric System

In each of the above embodiments, the RGB and L*a*b* colorimetric systems are used. Alternatively, the same processes can be made if other colorimetric systems such as Luv, CMY, XYZ, and the like are used.

Display Device

In each of the above embodiments, a display device is used as the monitor. Also, an image may be output to a printer, plotter, and the like.

According to the 3D distribution display of color information of the above embodiments, since color information (local/comprehensive information of a gamut mapping process) distributed in a 3D space is qualitatively/intuitively evaluated, and subjective evaluation of an image is associated with the 3D distribution of color information, the correspondence between the 3D distribution and color image, and the relation between the image and gamut mapping information (process) can be recognized. As a result, the evaluation result, the correspondence, and relation can be quickly reflected in the mapping process.

As many apparently widely different embodiments of the present invention can be made without departing from the spirit and scope thereof, it is to be understood that the invention is not limited to the specific embodiments thereof except as defined in the appended claims.

What is claimed is:

1. A color information processing apparatus comprising:
an acquisition section, arranged to acquire color image data, and color distribution information which indicates a relationship between sample point values in a first colorimetric system, and color coordinate values in a second colorimetric system;
a constructor, arranged to construct surface information of a first three-dimensional object, on the basis of the color distribution information;
a display section, arranged to display a first image based on the surface information, and a color image based on the input color image data;
an input section, arranged to input a user's designation which designates a part of the displayed color image; and
a generator, arranged to generate three-dimensional object data, representing a second three-dimensional object and based on color image data corresponding to the part of the color image designated by the user's designation,
wherein said display section displays a second image corresponding to the second three-dimensional object superimposed on the first three-dimensional object.

2. The apparatus according to claim 1, wherein said display section pseudo-three-dimensionally displays the synthetic image of the first and second images, and two-dimensionally displays the color image.

3. The apparatus according to claim 2, further comprising a controller arranged to control at least one of a viewpoint, line of sight, object position, object rotation, screen position, and screen angle associated with the pseudo-three-dimensional display.

4. The apparatus according to claim 1, wherein said acquisition section reads the color distribution information from a file, and reads the color image data from a file.

5. The apparatus according to claim 1, wherein the color image data used in the generation of the three-dimensional object data is color data of one point of the color image designated by the user's designation.

6. The apparatus according to claim 1, wherein the color image data used in the generation of the three-dimensional object data is calculated from color data included in an area of the color image designated by the user's designation.

7. The apparatus according to claim 6, wherein the color image data used in the generation of the three-dimensional object data is an average value of the color data.

8. The apparatus according to claim 6, wherein the color image data used in the generation of the three-dimensional object data is calculated by weighting color data included in the designated area.

9. The apparatus according to claim 1, further comprising a converter arranged to convert the color image data corresponding to the part of the color image designated by the user's designation into color data in the second colorimetric system.

10. The apparatus according to claim 1, wherein the three-dimensional object data is generated as geometric information which indicates a combination of line segments, an ellipse, a sphere, or a polyhedron, that has the color image data used in the generation of the three-dimensional object data as a center.

11. The apparatus according to claim 1, wherein the first colorimetric system is an RGB, CMY, XYZ, Luv, or Lab colorimetric system.

12. The apparatus according to claim 1, wherein the second colorimetric system is an RGB, CMY, XYZ, Luv, or Lab colorimetric system.

13. The apparatus according to claim 1, wherein said input section can input a user instruction that specifies display ranges for respective bases of three dimensions, and said constructor constructs the surface information by acquiring color coordinate values that sample points on an area surface in the first colorimetric system take in the second colorimetric system, on the basis of the specified display grid ranges.

14. The apparatus according to claim 1, wherein said constructor calculates display grid ranges for respective bases of three dimensions on the basis of color information acquired from the image information, and constructs the surface information by acquiring color coordinate values that sample points on an area surface in the first colorimetric system can assume in the second colorimetric system, on the basis of the calculated display grid ranges.

15. A color information processing method comprising the steps of:

acquiring color image data, and color distribution information which indicates a relationship between sample point values in a first colorimetric system, and color coordinate values in a second colorimetric system;

constructing surface information of a first three-dimensional object on the basis of the color distribution information;

displaying a first image based on the surface information, and a color image based on the input color image data;

inputting a user's designation which designates a part of the displayed color image; and generating three-dimensional object data, representing a second three-dimensional object and based on color image data corresponding to the part of the color image designated by the user's designation, wherein the displaying step includes displaying a second image corresponding to the second three-dimensional object superimposed on the first three-dimensional object.

16. A computer program stored in a computer-readable storage medium, for a color information processing method, comprising process procedure code for:

acquiring color image data, and color distribution information which indicates a relationship between sample point values in a first colorimetric system, and color coordinate values in a second colormetric system;

constructing surface information of a first three-dimensional object on the basis of the color distribution information;

displaying a first image based on the surface information, and a color image based on the input color image data;

inputting a user's designation which designates a part of the displayed color image; and generating three-dimensional object data, representing a second three-dimensional object and based on color image data corresponding to the part of the color image designated by the user's designation, wherein the displaying process includes displaying a second image corresponding to the second three-dimensional object superimposed on the first three-dimensional object.

* * * * *